(12) United States Patent
Teitelbaum

(10) Patent No.: US 8,571,882 B1
(45) Date of Patent: Oct. 29, 2013

(54) PEER TO PEER DATABASE

(76) Inventor: Ronald J. Teitelbaum, Westminster, MD (US)

( * ) Notice: Subject to any disclaimer, the term of this patent is extended or adjusted under 35 U.S.C. 154(b) by 1444 days.

(21) Appl. No.: 11/824,817

(22) Filed: Jul. 3, 2007

Related U.S. Application Data

(60) Provisional application No. 60/818,700, filed on Jul. 5, 2006.

(51) Int. Cl.
*G06Q 50/00* (2012.01)

(52) U.S. Cl.
USPC .............................................................. 705/2

(58) Field of Classification Search
USPC .......... 717/164, 168; 709/201, 222, 223, 232; 705/2, 3
See application file for complete search history.

(56) References Cited

U.S. PATENT DOCUMENTS

| | | | | |
|---|---|---|---|---|
| 5,444,851 | A * | 8/1995 | Woest | 709/222 |
| 5,842,173 | A * | 11/1998 | Strum et al. | 705/2 |
| 6,397,271 | B1 * | 5/2002 | Okada et al. | 710/36 |
| 7,385,924 | B1 * | 6/2008 | Riddle | 370/235 |
| 7,418,494 | B2 * | 8/2008 | Dahlin et al. | 709/224 |
| 7,596,625 | B2 * | 9/2009 | Manion et al. | 709/232 |
| 7,716,272 | B2 * | 5/2010 | Skwarek et al. | 709/201 |
| 7,870,549 | B2 * | 1/2011 | Acker et al. | 717/168 |
| 2003/0050834 | A1 * | 3/2003 | Caplan | 705/14 |
| 2006/0037011 | A1 * | 2/2006 | Shi et al. | 717/164 |
| 2007/0136314 | A1 * | 6/2007 | Bae et al. | 707/10 |
| 2009/0265454 | A1 * | 10/2009 | Bordewisch et al. | 709/223 |

* cited by examiner

*Primary Examiner* — Gerald J. O'Connor
*Assistant Examiner* — Edward Winston, III
(74) *Attorney, Agent, or Firm* — Brake Hughes Bellermann LLP

(57) ABSTRACT

A system for providing database functionality on a peer-to-peer network is described that provides a highly scalable, fault tolerant, highly available, secure distributed transactions and reporting environment for application development and deployment.

33 Claims, 44 Drawing Sheets

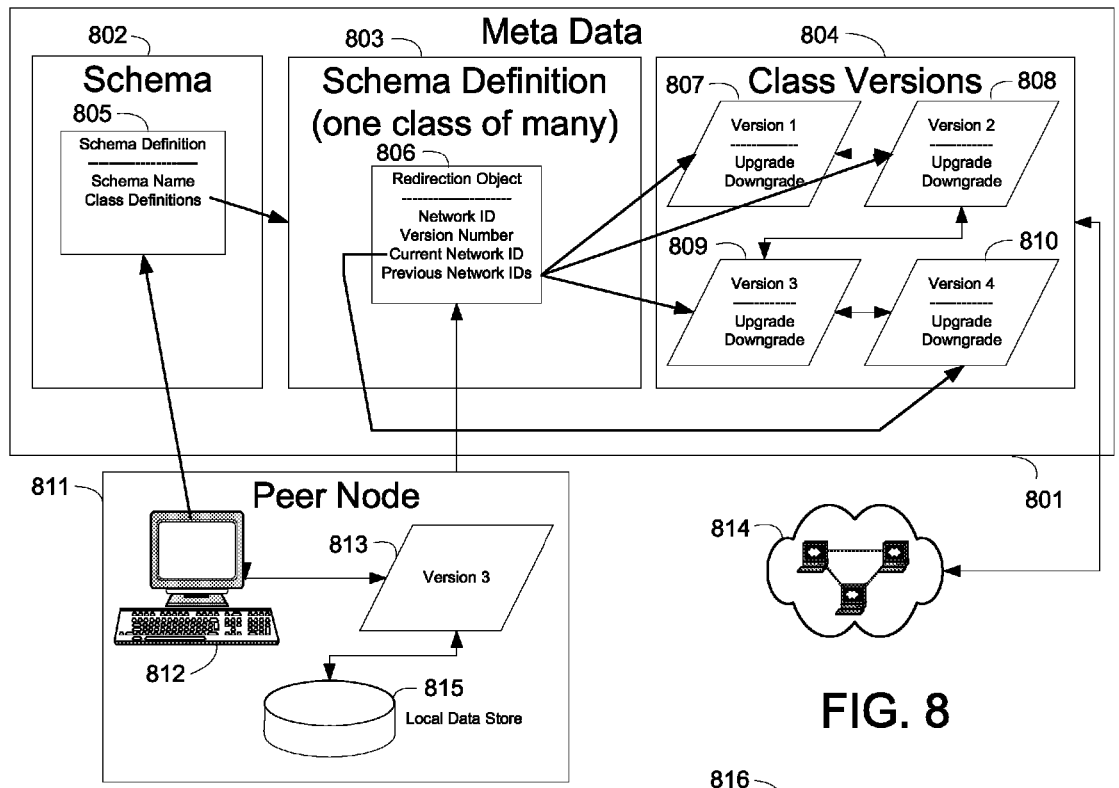
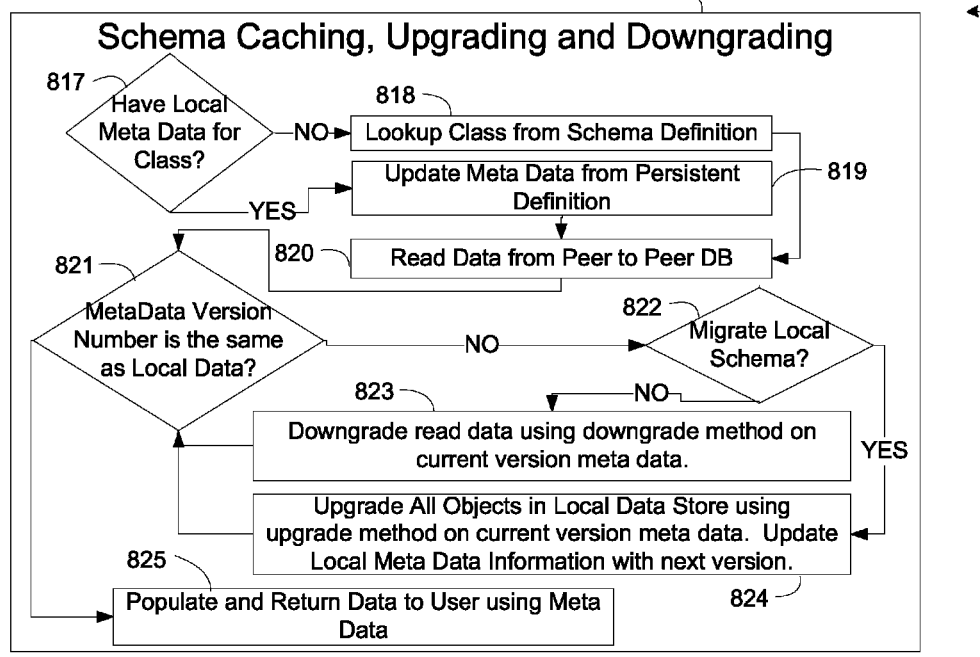
FIG. 8

Name: Hurting, Ima     Age: 38     Sex: F     Height: 5'4"  Weight: 172  Race: American Indian
Allergies: Codine (Emesis, Fever)
Medications: Avapro 75 QD, Pepcid 20mg QD or more, Flovent QD
Issues: Seviere Abdominal Pain, Hypertension 2800
2801
2803  Symptoms:
Current Medications: Flovent, pepcid, Avapro
2802
Pain: ○₁○₂○₃○₄○₅○₆○₇●₈○₉○₁₀  (Scale)
Location: Upper right abdomen, chest, back  (Point)
Duration: 30 - 60 minutes, over 3 month period, Increased Frequency in past few days
Temp: 101.2     Blood Pressure: 140 / 102
Emesis, Sweating, Jaundice 2806
2804  Possible Questions:
Have you lost weight lately? _ yes _ no  Fasting? _ yes _ no
Do you take birth control pills ? _ yes _ no
Does the pain come and go with food? _ yes _ no 2807
2805  Likely Diagnosis:
Biliary system
■ Cholelithiasis (Gallstones) (preliminary)
☐ Hiatal Hernia
☐ Pancreatitis
☐ Hepatitus
Cardiac
☐ Myocardial infarction (Heart Attack)
Digestive system
☐ Appendicitis
☐ Ulcers
☐ Irritable Bowel Syndrome Recommended Tests:                                      2809

2808  ■ Ultrasound STAT         $ <      D94%    P72%   R0%
■ Blood Tests
   Bilary Panel            $ <      D97%    P53%   R0%
   Full Blood Count  2810  $ <      D97%    P53%   R0%     2811
☐ Cholecystogram            $^*      D12%    P99%   R1% *-US Test
☐ ERCP                      $ <>*    D61%    P99%   R<.1%
2812
☐ CT Scan                   $ ^!     D94%    P85%   R0%
(TURN)
☐ Liver Biopsy              $ <*     *D12%*  P20%   R0.29% *PA (DONE)

US Medical Record Specialists        Patient: Hurting, Ima     Seviere Abdominal Pain

FIG. 28

PEER TO PEER DATABASE

CROSS-REFERENCE TO RELATED APPLICATION

This application claims priority under 35 U.S.C. §119(e) to provisional application 60/818,700, filed on Jul. 5, 2006 and titled PEER TO PEER DATABASE, the entire contents of which are incorporated herein by reference.

TECHNICAL FIELD

This description relates to deployment platforms for computer applications, peer-to-peer networking and database management.

BACKGROUND

Peer-to-peer networks have historically been used, for example, for connecting millions of users to allow the storage and downloading of terabytes of information internationally. In such cases, peer-to-peer platforms have been used for, and optimized for, downloading static files. In these and other settings, advances of peer-to-peer networks have made them much more reliable to loss of nodes. For example, peer-to-peer networks using Distributed Hash Tables have enabled peer-to-peer networks that may provide some level of consistency and performance in a fault-prone environment, without necessarily having to use coordinating servers.

A computer on such a server-less peer-to-peer network may generally be able to maintain only a limited number of connections, but may be able to locate every computer on the network with a provably high probability. This ability to locate computers on the network may reduce or remove the need to have a server (or groups of servers) to fulfill client requests. Further, this ability may be used to reduce or eliminate points of failure, and may increase a scalability and robustness of the network.

As referenced above, many peer-to-peer networks are optimized for downloading. As such, peer-to-peer networks can download files from multiple sources, and can even reconstruct a file from multiple partial files, even when the original complete file no longer exists on the network. This deconstruction and reconstruction from a deterministic algorithm allows, for example, for multiple peers to construct and reconcile portions of a file.

Some peer-to-peer networks allow for tag-based storage, which adds additional searching capabilities to help find a file or type of file for downloading. Some peer-to-peer networks allow for cryptographic storage and retrieval. Some peer-to-peer networks allow for redundant file storage. Some peer-to-peer networks require republishing of data periodically, and expire files after a period of time if they are not republished.

SUMMARY

According to one general aspect, a system includes a peer-to-peer database organized in a server-less environment. The system coordinates both node computers and database information, both data and Metadata, on a network address space of similar size. A random P2P Database addressor can be used to provide random addresses for both data and nodes, thus eliminating the need to use a coordinating server to assign addresses or to use a random numbering algorithm as a seed.

The peer to peer database may contain a concept of a redirection object to provide a single address for linking so that changes can be made to data without affecting the overall data structure store on the P2P database. A redirection object could also store current and historical versions, provide encryption, indexing, coordinate changes through a transaction locking manager, maintain consistent class definitions through a schema manager, control persistence locations, caching and manage data replication.

According to another general aspect, each node on a peer-to-peer database may use a local database management system to store and retrieve data efficiently.

According to another general aspect, an even dispersion of nodes across a network address space may be accomplished by using Universally Unique Identification numbers, which may reduce or eliminate the need to use a coordinating server to assign addresses or to use a random numbering algorithm as a seed.

According to another general aspect, information routing and caching can be accomplished by composite definitions used to store and retrieve blocks of data from a peer-to-peer database.

According to another general aspect, information caching and routing can be extended using a publish and subscribe mechanism on a peer-to-peer database.

According to another general aspect, data coordination of a peer-to-peer database could be accomplished using a peer-to-peer schema management system consisting of modifiable metadata with upgrade and downgrade methods and a peer-to-peer persistence framework which allows for a data commit mechanism and support for multiple locking models on a peer-to-peer database.

According to another general aspect, index creation, reporting and querying may be accomplished by persisting distributed modifiable index definitions used to aggregate data and create summary nodes which might be linked and/or index trees which may be used for querying and reporting on a peer-to-peer database.

Index definitions may be typed to coordinate and optimize data reporting. Examples may include "report if" and "execute at", string grouping, near locality, and numeric grouping type indexes organized in a linked list group and/or an index tree. The index lists or trees can be traversed to find relevant information for queries and/or reporting.

According to another general aspect, a security framework on a peer-to-peer database may allow for the separation of private and searchable information. For example, such a security framework may include encrypting searchable data at the local node so as to allow for index reporting of searchable data.

According to another general aspect, an encrypting mechanism called an "AND Encryption" or "AND Key" may be used, which allow(s) for the decryption of data only if both parties to the encryption allow the decryption.

According to another general aspect, an encrypting mechanism called an "Or Encryption" or "OR Key" may be used, which allow(s) for the encryption and decryption of data by either associated party of an "OR Key".

According to another general aspect, a software platform on a peer-to-peer database may be used to build and deploy software applications. Such a software platform may provide a wide range of connectivity without extensive networking, and may be highly available and fault tolerant, and may provide secure distributed transactions.

According to another general aspect, a software platform may provide translation services between existing or new business applications by storing data on a peer-to-peer database in a common format, and by allowing a single translation per business application to that common format.

According to another general aspect, a software platform may provide a national medical record system by providing secure distributed transactions on a highly scalable network, and/or may provide translation services to existing applications using a peer-to-peer database.

According to another general aspect, a peer-to-peer local area network data caching system may allow data stored locally within a local area network to be shared and looked up before searching of the peer-to-peer database, thereby allowing further benefits from publish and subscribe mechanisms.

According to another general aspect, usage and/or practice patterns of healthcare providers may be tracked. The usage and/or practice patterns may be presented during the process of caring for patients, based on that patients current medical information. The practice patterns may be allowed to be rated by physicians, so that, for example, best practice patterns can be prioritized and disseminated to improve health treatment.

According to another general aspect, a method of assigning a network address for a peer-to-peer database may include receiving a request for the network address, the network address associated with adding data or a node to the peer-to-peer database, applying a hashing algorithm to a universal unique identifier associated with the data or the node, and providing the network address, based on the applying.

According to another general aspect, a method of relationship mapping for data of a peer-to-peer database may include determining data to be persisted on the peer-to-peer database, the data having a data network address, associating a redirection object with the data, the redirection object including a network address and the data network address, and persisting the redirection object on the peer to peer database.

According to another general aspect, a method of organizing data on a peer-to-peer database may include creating an index definition for an index associated with data, determining an index address for storing the index on the peer-to-peer database, based on at least a source characteristic of the data, determining an index value for the index, based on the index definition and on at least one target characteristic of the data, and persisting the index to the peer-to-peer database, using the index address.

According to another general aspect, a method of persisting data on a peer-to-peer database may include determining at least one data element associated with a data transaction, each data element being associated with a network address on the peer-to-peer database, determining at least one storage node for each data element, determining a consistency of the at least one data element on a respective at least one storage node, and determining whether to write the at least one data element to the respective at least one storage node, based on the determining of the consistency.

According to another general aspect, a method of managing a schema definition for a class on a peer-to-peer database may include determining that a source schema definition for the class that is stored on the peer-to-peer database does not match a target schema definition for the class that is stored on the peer-to-peer database, determining a modification between the source schema definition and the target schema definition, and applying the modification to the class to obtain the target schema definition for the class.

According to another general aspect, a method of persisting composite elements on a peer-to-peer database may include determining a composite definition for at least one class on the peer-to-peer database, determining a data transaction including elements of the composite definition, assigning a composite network address to the elements, and storing the elements at the composite network address on the peer-to-peer database.

According to another general aspect, a method of optimizing data replication on a peer-to-peer database may include determining a first group of data on a first storage node of the peer-to-peer database, the first group of data having a data characteristic, providing the data characteristic and a first hash value for the first group of data to a second storage node of the peer-to-peer database, determining a second group of data on the second storage node, based on the data characteristic, determining a second hash value for the second group of data, and reconciling the first and second groups of data based on the first and second hash values.

According to another general aspect, a method of sharing data on a peer-to-peer database may include classifying data to be shared as sensitive information or non-sensitive information, encrypting the sensitive information on the peer-to-peer database using an author key available at least to an author of the data, encrypting the non-sensitive information using a storage key available to at least one storage node, and providing the non-sensitive information to a recipient, using the storage key, the non-sensitive information being provided separately from the sensitive information, unless the recipient has access to the author key.

According to another general aspect, a method of distributing data on a peer-to-peer database may include accessing data objects at a node of the peer-to-peer database, the data objects being stored at at least one other node of the peer-to-peer database, subscribing the node to the data objects by providing the network address of the node to the data objects for replication of the data objects back to the node, and receiving published updates to the data objects in response to an alteration of the data objects at the at least one other node.

According to another general aspect, a method of persisting data using segregated address spaces on a peer-to-peer database may include accessing data objects at a node of the peer-to-peer database, subscribing a local area network (LAN) of the node to the data objects, committing updates to the data objects on the LAN as a segregated address space, and committing the updates to the peer-to-peer database.

According to another general aspect, a user interface may include a portion configured to display a patient icon in which portions of the patient icon are visually alterable to provide medical information associated with each portion of the patient icon.

According to another general aspect, an electronic medical data record system may include a medical record application configured to persist medical records on a peer-to-peer database. The peer-to-peer database may be associated with a regional health information organization (RHIO), which may be connected to the National Health Information Network (NHIN).

According to another general aspect, a redirection object may include a network address used to store the redirection object on a peer to peer address space and a collection of addresses that represent versions of data stored on the same peer to peer address space. The redirection object address may stand in as a pointer for real data on the peer to peer database. Once retrieved from the peer to peer database the redirection object may allow the redirection object aware peer to peer application to resolve requests by redirecting and requesting the current version of the data which is then returned to the application. When data is changed new versions are reconciled by exchanging, modifying, reconciling and/or locking these small data constructs.

According to another general aspect, an encryption manager may use such a redirection object to securely store information on a Peer to Peer database. The redirection object encryption manager may include an encryption component and a random data (salt) generator that encrypts the data on the storage node of a peer to peer database. It also may have a decryption component that receives a request containing a secure token (like a password) from a requesting node. The encryption manager may retrieve the encrypted data and the random data (salt) that it has stored and use that information to decrypt the data and respond appropriately.

According to another general aspect, a component of a Peer-to-Peer database may include a P2P Index which consists of an address used to store the index on a Peer-to-Peer database calculated from properties of the data being indexed and a value and other index properties that are configurable by index type and definition. Used in conjunction with the redirection object described herein, the P2P index may provide a modifiable index on a peer to peer database that supports many different types of indexes which may include lookup, data aggregation, data sorting, data cursors, and more and may include different types of storage triggers.

According to another general aspect, a Peer-to-Peer database may be associated with a Transaction Locking Manager which may include a transaction wrapper which monitors the application for new objects. An object register may be used to collect changes of the objects that are managed. An object node refresher may be used to collect the nodes that are responsible for eventually storing and managing the data that is being managed. A locking module may be used for handling commit errors. A redirection object wrapper may be responsible wrapping all discrete data elements and replacing links with pointers to the new redirection object.

According to another general aspect, a Peer-to-Peer database may be associated with a Schema Manager which may include a schema definition which can define both data and behavior of each class stored on the peer to peer database, as well as schema rules that define when and how data and behavior should be migrated, and schema upgrade and downgrade methods used to transform the data and behavior on the local application.

According to another general aspect, a component of a Peer-to-Peer database may include a Persistence manager which includes a class persistence type definition to define how the data is stored and accessed by the application. The type definitions may include a local static data store, a local dynamic data store, a non-persistence definition, a composite storage type, or other data storage types. Persistent data can be stored using a Redirection Object as described herein. The composite data may include a group of discrete data elements stored in a single location at a separate composite ID.

According to another general aspect, a component of a Peer-to-Peer database may include a Data Replication Manager which includes a data monitor which monitors replicated data and replicates data that has not been replicated after a set period of time. A data grouper may collect and group data in buckets that can be duplicated on other nodes. The characteristics of the grouper can be changed to maximize the number of groups that have data that is not likely to change on the peer to peer database. A group hash algorithm may be used which takes the data contained in a group and calculates a hash or other identifier that can be sent to other nodes which can be used to compare groups to see if data has changed. A group verifier may be used to determines if a group's data has changed. A data replicator may be used to reconcile changes in a group and then manage transmission and reception of changes to be applied to each node so that both groups contain the appropriate data. A data replication time stamp may be updated when objects are replicated.

According to another general aspect, a component of a Peer to Peer database may include a Location Caching Manager that includes a local data cache. A publish and subscribe local cache which allows the Replication Manager described herein to include a node as an address to replicate data to. A publish and subscribe LAN cache may allow the transaction locking manager described herein to commit to a LAN as if it were an entire peer to peer network in addition to normal commit behavior committing object on the entire peer to peer database. A search path cache may allow the system to temporarily cache data outside the storage nodes along a search path. A data requestor may search the local data store first then the LAN peer to peer network and then the full peer to peer database. The caching scheme provides an optimization for rereading data by the local cache, for stand alone installation with publish and subscribe local caching, for sharing data within a LAN with LAN caching, and for frequently retrieved objects on the peer to peer database with search path caching.

According to another general aspect, a component of a Peer-to-Peer database may include a Redirection Object including a versions address holder. A transaction locking manager may receive either new data or modified data to persist on a peer to peer database. Each new data element may be wrapped with a redirection object. The transaction locking manager may break the links between each discrete data element and replace the links with a proxy to a redirection object. Redirection objects may be updated for modified data. A new address may be assigned to the data, and the previous address is placed in the address history, and the current address updated to the new data address.

According to another general aspect, a redirection object may be used as pointer to dynamic data on a peer to peer database. The transaction locking manager may break links to data during commit and replaces each pointer to a discrete data element with a pointer to the elements redirection object address. The application may request data from the peer to peer database using a data pointer to a redirection object. The application may receive back a redirection object, read the current data element address, and request the data at that address. The application may return the data back to the requestor.

A redirection object may be used to reconcile changes to data on a peer to peer database. The transaction locking manager may reconcile changes to objects by first committing each discrete data element version to a separate address. Links to the changed data may be updated on the redirection object by modifying, reconciling and/or locking multiple copies of the redirection object on the peer-to-peer database.

According to another general aspect, a component of a Peer-to-Peer database may include a redirection object that uses an encryption manager to securely store information on a Peer to Peer database. The encryption manager may receive data and a secure token from the application. The application may send data to a storage node where random data is added and persisted on the remote storage node. The secure token and the random data may be used to encrypt the data and store it on the remote storage node.

Such an encryption manager may be used to securely read information from a Peer-to-Peer database. The encryption manager may receive a request from the application to retrieve secure data. The request may contain the remote address of the data and a secure token to decrypt that data. The encryption manager may find and send the request to a remote storage node. The remote node encryption manager may retrieve the encrypted data and the random data used to encrypt it, then decrypt the data and respond appropriately to the requesting node.

According to another general aspect, a component of a Peer-to-Peer database may include a P2P Index which includes an address used to store the index on a Peer-to-Peer database and a value calculated from properties of the data being indexed. An index definition may be created for a class. Using the index definition the transaction locking manager may create a P2P Index object using the definition to determine the address for storing the index. Using the index definition the transaction locking manager may create a P2P Index value. The transaction locking manager may commit the P2P index to the peer-to-peer database.

Such a P2P index may be used with the redirection object described herein to provide a dynamic P2P index. The peer to peer index value can be recalculated using new data, and the new value may be persisted using the versioning of the Redirection object. The redirection objects can be reconciled. The index may be used as a lookup index. A lookup type index definition may be created for a class, and using the index definition the transaction locking manager may create a P2P Index, where the address of the Index may be set to the hash of data used find the data. For example, the hash of a persons first and last name and birth date may be used. The value of the Index may be set to a pointer to the object being indexed. To retrieve the object the application may provide the data used for addressing; for example, the first, last name and birth date of the person to be found. The application may hash the data according to the index definition. The application may use the index address to retrieve the index from the peer-to-peer database, and may retrieve the value from the index and use it to lookup the indexed data. The index may be used as a sorting index, a data aggregation index, a data cursor index, or a conditional data index.

According to another general aspect, a component of a Peer-to-Peer database may include a transaction locking manager that collects new and changed data and persists that data on a peer-to-peer database. The transaction locking manager may collect changes and newly created objects from an application. Refreshing of Peer-To-Peer storage nodes may be implemented at object creation or object read time. The transaction locking manager may receive a register object methods when objects are created or read from the peer-to-peer database. The transaction locking manager may search for the "N" closest nodes to the address of the new or read object to prepare for eventual commit. The transaction locking manager may checks the time elapsed against a configurable time out to determine if the storage nodes should be recalculated at commit time.

In a transaction locking manager, a locking model may be used to commit changes to a peer-to-peer database. The transaction locking manager may receive from the application a message to commit objects that were collected during the transaction. The locking model may define how objects are managed to ensure transaction ACID (Atomicity, Consistency, Isolation, and Durability) properties. Locking may be defined by the Locking model, as well as error handling. The transaction locking manager may receive from the application a message to commit objects that were collected during the transaction. The transaction locking manager may prepare the objects by wrapping all discrete objects with a Redirection Object. The transaction locking manager may replace all links to data on a discrete object with a proxy to the redirection object of that data.

A Transaction Locking Manager may provide a P2P index creator. The transaction locking manager may receive from the application a message to commit objects that were collected during the transaction. The transaction locking manager may retrieve an index definition for the class of the object being committed. The transaction locking manager may create a P2P Index for each index definition.

According to another general aspect, a component of a Peer-to-Peer database may include a Schema Manager which upgrades and downgrades objects data and/or behavior on a peer-to-peer database. The Schema Manager may retrieve the current schema definition from the peer-to-peer database, or a locally cached copy of that definition. The Schema Manager may compare the application version of the class to the current definition. The Schema Manager may look up the definition of the applications version of the class. The Schema Manager may then perform either upgrade or downgrade methods to class to transform the class to the required version The Schema Manager may use rules to determine when and if data and/or code should be migrated on a peer-to-peer database. The Schema Manager may retrieve the current schema definition from the peer-to-peer database, or a locally cached copy of that definition. The Schema Manager may read the rules off the current schema definition. The Schema Manager may apply those rules to determine when and if the data and/or behavior should be changed.

According to another general aspect, a component of a Peer-to-Peer database may include a Persistence manager which may include a class persistence type definition to define how the data is stored and accessed by the application. The Persistence Manager may receive a message from the application that an object of some class is going to be committed. The persistence manager may retrieve a persistence definition for that class. The persistence manager may prepare and/or write the data according to the persistence definition. When data is read back from the peer-to-peer database the persistence manager may retrieve the persistence definition for the class and then cause the application to retrieve the data from the appropriate data storage based on the persistence type. The Persistence manager may have a persistence type of Local static, Local dynamic, or regular P2P object.

The Persistence manager may have a persistence type of composite. The Persistence Manager may receive a message from the application that an object of some class is going to be committed. The Persistence Manager may find a composite persistence definition, and may find all objects that belong to the same composite definition and assigns them all a composite ID, and then may cause the data to be written as a group on the peer-to-peer database at the composite ID.

According to another general aspect, a component of a Peer-to-Peer database may include a Data Replication Manager which includes a data monitor which monitors storage node replicated data and replicates data that has not been replicated after a set period of time. The replication manager may retrieve data that has not been replicated since a configurable amount of time, contact the "N" closest nodes to object to be replicated and if needed it sends the data to the node for storage. The replication manger may update the replication time stamp of the object.

A Data Replication Manager may use a data grouper to determine groups of data that need replication. The Data Replication Manager may retrieve data that has not been replicated, and form data groups by collecting data stored into groups that can be replicated on other storage nodes. It may send the key and a hash of the group values, for example addresses, to determine if any replication is necessary. If replication is necessary it reconciles the changes and replicates between storage nodes.

According to another general aspect, a component of a Peer-to-Peer database may include a Location Caching Manager that optimizes data retrieval for a peer-to-peer database, e.g., caches data that is read locally. For example, when the application requests data from the Peer-to-Peer database the caching manager may make a local copy of the data for faster retrieval later. When the data is read subsequently a data time out may be checked to see if the data is stale and should be refreshed from the peer to peer database.

The Location Caching Manager may cache data locally and subscribe to future updates. The application may add the local node address to the list of addresses that data should be replicated to. The Replication Manager described herein may read the replication addresses and send updates to this class to the local data cache. When data is read subsequently the data may already be refreshed.

The Location Caching Manager may cache data on a LAN and subscribe to future updates. The application may add the LAN to the list of networks that the data should be committed to. The Transaction Locking Manager described herein may commit the data to the LAN as if it were a full peer-to-peer database, and may then commit the data as usual on the full peer to peer database. Subsequent reads of data may first check the local cache, then the LAN for data. If the data is not found a full search of the Peer-to-Peer database may be performed.

The details of one or more implementations are set forth in the accompanying drawings and the description below. Other features will be apparent from the description and drawings, and from the claims.

BRIEF DESCRIPTION OF THE DRAWINGS

FIG. 1-A is a block diagram illustrating a Random P2P-Database Addressor component used for assigning randomly dispersed addresses across the P2P Database address space.

FIG. 1-B is a block diagram illustrating a Random P2P-Database Addressor used to add a Peer to the Network.

FIG. 1-C is a block diagram illustrating a Random P2P-Database Addressor used to add Data to the Network.

FIG. 2-A is a diagram showing a Peer to Peer database component, the Redirection Object, and its relationship with other components of a Peer to Peer database.

FIG. 2-B is a diagram showing the read and write functionality of a Redirection object component of a Peer to Peer database.

FIG. 2-C is a diagram showing the Peer to Peer database component a Redirection Object which may contain a version holder to provide a consistent address to other objects linking to this data.

FIG. 2-D is a diagram showing the Peer to Peer database component a Redirection Object which may contain an Encryption Manager that is used to securely store data on a peer to peer database.

FIG. 2-E is a diagram showing the Peer to Peer database component a Redirection Object which may contain an Encryption Manager that is used to securely read data from a peer to peer database FIG. 2-F is a diagram showing the Peer to Peer database component a Redirection Object which may contain a P2P index. The Peer to Peer index can be used to store information that is aggregated, or it can be used to find objects on the database.

FIG. 2-G is a diagram showing the Peer to Peer database component a Redirection Object which may contain a P2P index. This diagram shows an example of using the P2P index component of a Redirection Object to write and retrieve a value, noted as a lookup index.

FIG. 2-H is a diagram showing the Peer to Peer database component a Redirection Object which main contain a Transaction Locking Manager. This diagram shows the creation of new objects, reading of existing objects, as well as the committing of the transaction and handling of data conflicts.

FIG. 2-J is a diagram showing the Peer to Peer database component a Redirection Object which can interact with a Schema Manager to provide the data necessary to manage changes in the Peer to Peer database schema. This diagram shows the upgrading and downgrading of objects both code and data using rules and previous schema definitions held by the current and historical versions attached to the Redirection Object.

FIG. 2-K is a diagram showing the Peer to Peer database component a Redirection Object which can interact with a Persistence Manager to provide the services needed to store and retrieve different types of persistent data types. This diagram includes Local data both Static and Dynamic, Non-Persistent data, regular P2P data and P2P composite data.

FIG. 2-M is a diagram showing the Peer to Peer database component a Redirection Object which may contain a Location Caching Manager to provide caching of data. Items that are requested frequently can be cached along the search path. Data that is used frequently from the same computer can be cached using a publish and subscribe model which provides updates to the author node computer. Data that is used within an organization on a LAN can be cached using the network address space of the LAN to provide a primary search space before checking the full P2P database.

FIG. 2-N is a diagram showing the Peer To Peer component a Data Replication Manager that provides the data replication needed to handle the adding and removing of nodes form the Peer to Peer database network. The Data Replication Manager handles replication of both regular Data and Redirection Objects.

FIG. 2-P is a diagram showing an example grouping algorithm used by the Data Replication manager. This example optimized the data replication by grouping data into buckets by a deterministic algorithm using both the closet network node address and the age of the data. Since older data is less likely to change, grouping older data together allows less reconciliation if nothing has changed since only the group and hash value needs to be transmitted to other nodes to be checked to determine if that data needs to be reconciled.

FIG. 8 is a group of diagrams illustrating a definition of data structures on a peer-to-peer database using meta data.

FIG. 28 is an example of a user interface detailing possible configurations showing multiple choice and manual text entry of symptoms organized around a pictographic patient representation showing current and past complaints graphically and the resulting suggestions of the system ranked by multiple indicators for example popularity, cost, diagnostic value, positive predictive value and or risk or other possible ranking values which allows for quick ordering and organizing of for example tests, results, treatments, and history.

DETAILED DESCRIPTION

Figure 1:
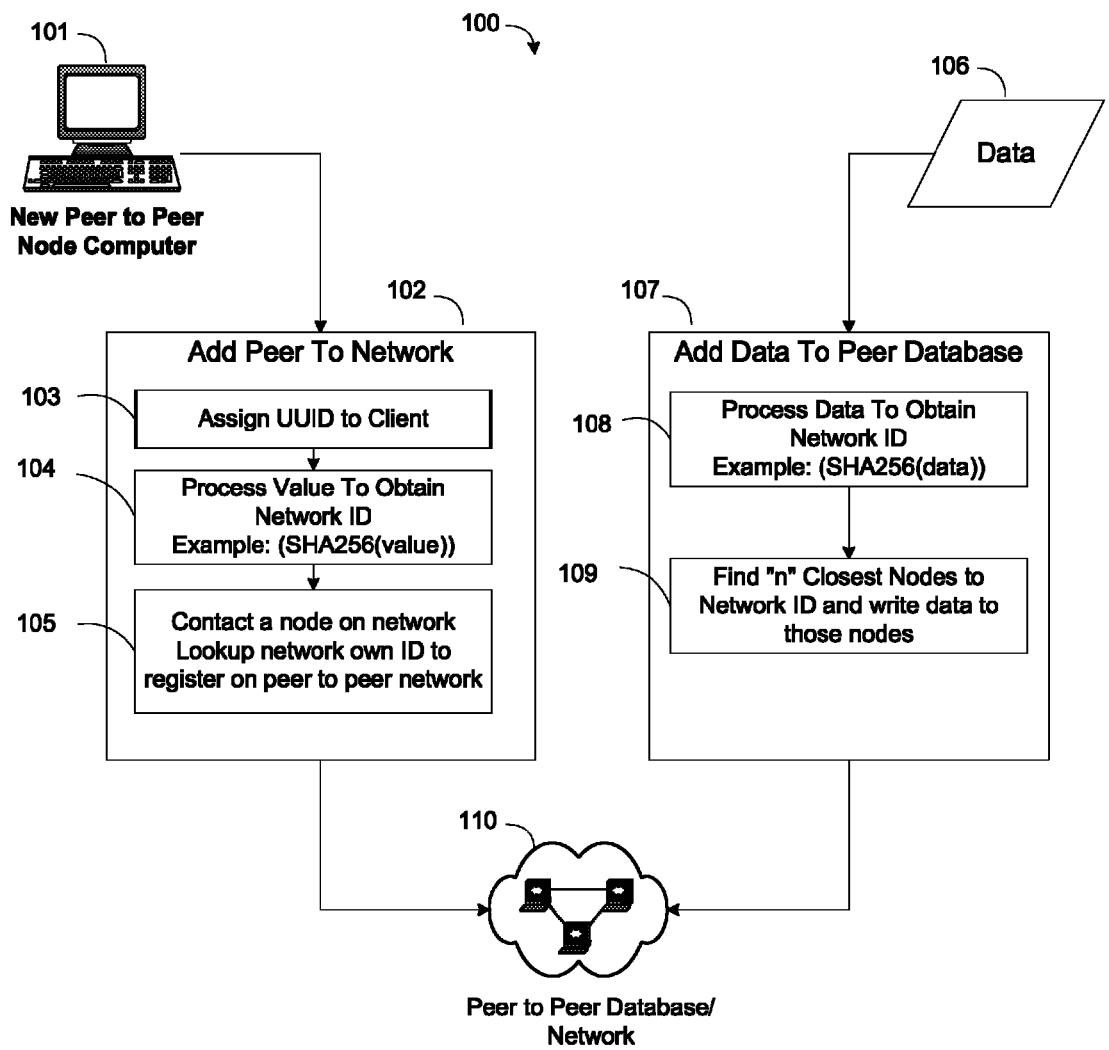
FIG. 1 is a block diagram of a system for a peer-to-peer database showing the addition of nodes and data to a network coordinated around a deterministic name space.
Figure 1A:
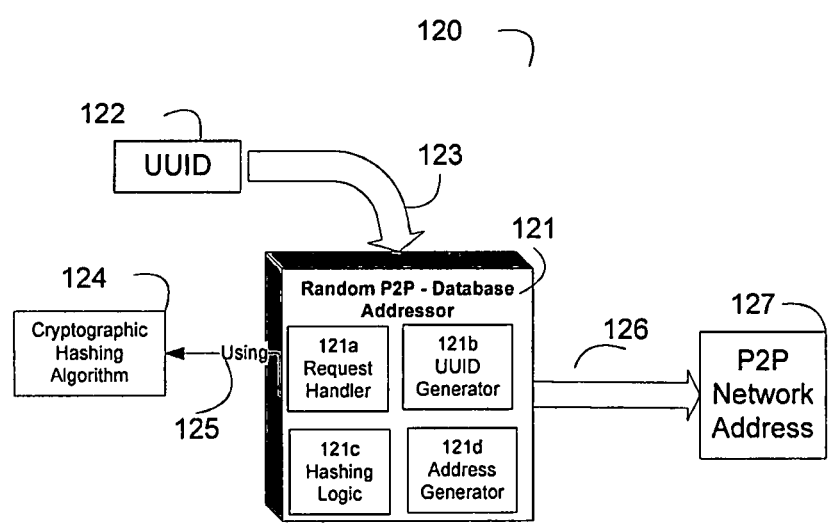
Figure 1B:
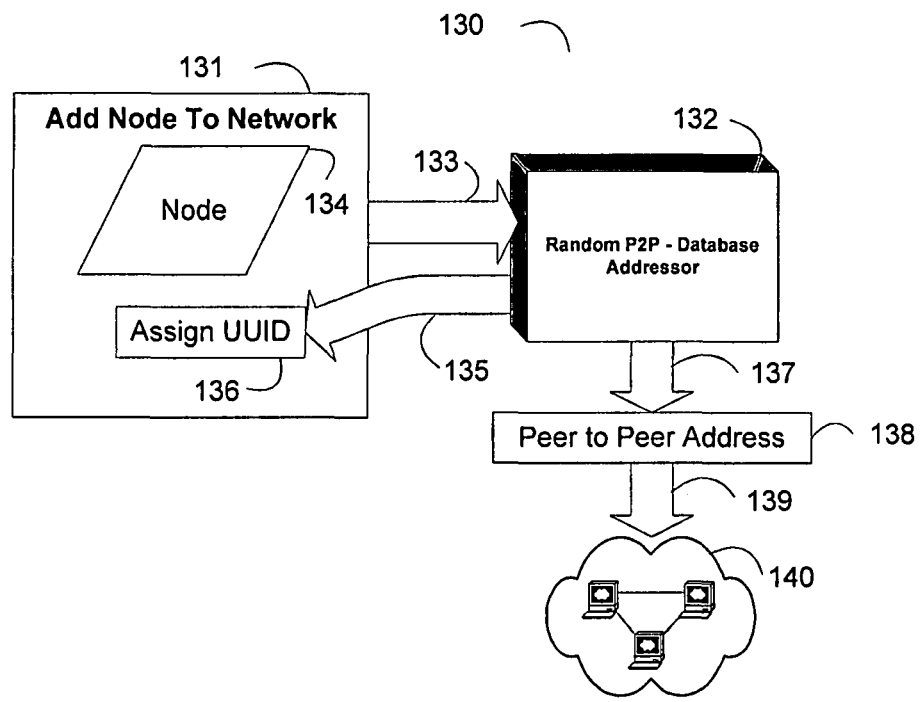

FIG. 1 is a block diagram of a system 100 of a peer to peer database 110 and shows the addition of both a node 101 and data 106 to a predetermined name space. System 100 shows the addition of nodes and data to the same name space using, for example, a Random P2P-Database Addressor (such as the addressor 121 of FIG. 1A, described in detail, below). The process of adding a node and data to a peer to peer network/database may be executed as follows. The node 101 in order to be added 102 to the peer to peer network 110 requests a network address from a Random P2P-Database Addressor (as shown in FIGS. 1A and 1B), which may include assigning of a universal unique identifier (UUID) 103 that is processed with a deterministic algorithm to obtain a network ID 104, as described below. The node then contacts at least one node that already exists on the network 105 and asks that node to look up its own network address (i.e., the new network address of the node 101 being added to the network 110). This process builds connections between the client node 101 and other nodes on the system.

Figure 1C:
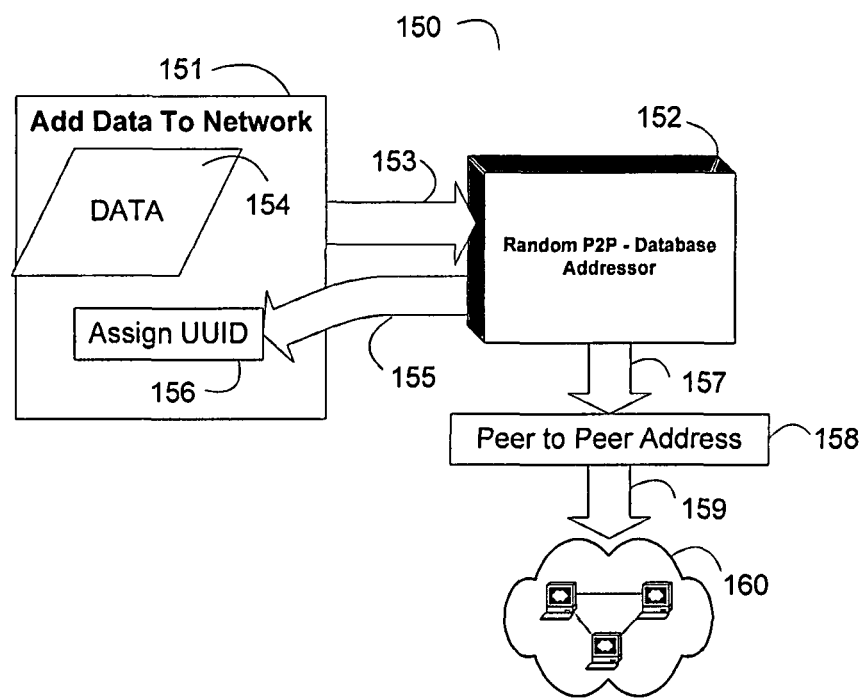

Once a network of nodes is established data can be added to the peer to peer database 107. For example, the data 106 may be processed using a deterministic algorithm to obtain a network ID 108, as described for the addition of the node 101. Then the data 106 may be persisted on nodes at addresses close to an address assigned to the data 109 using the Random P2P-Database Addressor (e.g., the addressor 152 of FIG. 1C). Once the address is assigned to the data 108 the data is stored on "N" nodes closest to the network ID of the data 110. The nodes and data on the same network namespace provide the framework for the peer to peer database 110.

FIG. 1-A is a diagram of a component 120 of a peer to peer database, a Random P2P-Database Addressor 121 which uses a Unique Universal ID 122 as the input 103 and then applies 125 a cryptographic hashing algorithm 124 to provide 126 a random address 127 on a set namespace of a P2P network. The diagram also shows how to use a UUID (Universally Unique Identifier) 122 as a network identifier and as a seed to place the node within the network namespace. This seed removes the need to coordinate additions of nodes using ether random seeds, or a coordinating server and provides an even random distribution of nodes on the network. In the example of FIG. 1A, the addressor 121 is illustrated as including a request handler 121a that may receive a request for a network address, e.g., from a node to be added or for data to be added to the peer-to-peer database. The UUID 122 may be generated by a UUI generator 121b, and hashing logic 121c may be implemented using the UUID 122, as referenced above, with regard to algorithm 124, to thereby provide the peer to peer network address 127 for the node or data, e.g., using a network address generator 121d.

FIG. 1-B is a diagram of a component 130 of a peer to peer database a Random P2P-Database Addressor 132 which can be used to add a peer or node to the peer to peer database network 131. The new client node 134 requests 133 an address from the Random P2P-Database Addressor 132. The Random P2P-Database Addressor 132 returns 135 a UUID 136 and also returns 137 an address 138 that can be used to add 139 the node at a random location within the address space of the peer to peer database network 140.

FIG. 1-C is a diagram of a component 150 of a peer to peer database a Random P2P-Database Addressor 152 which can be used to add a Data to the peer to peer database network 151. The new client node uses Data 154 as the input and requests 153 an address from the Random P2P-Database Addressor 152. The Random P2P-Database Addressor 152 returns 155 a UUID 156 and also returns 157 an address 158 that can be used to add 159 the node at a random location within the address space of the peer to peer database network 160.

Figure 2:
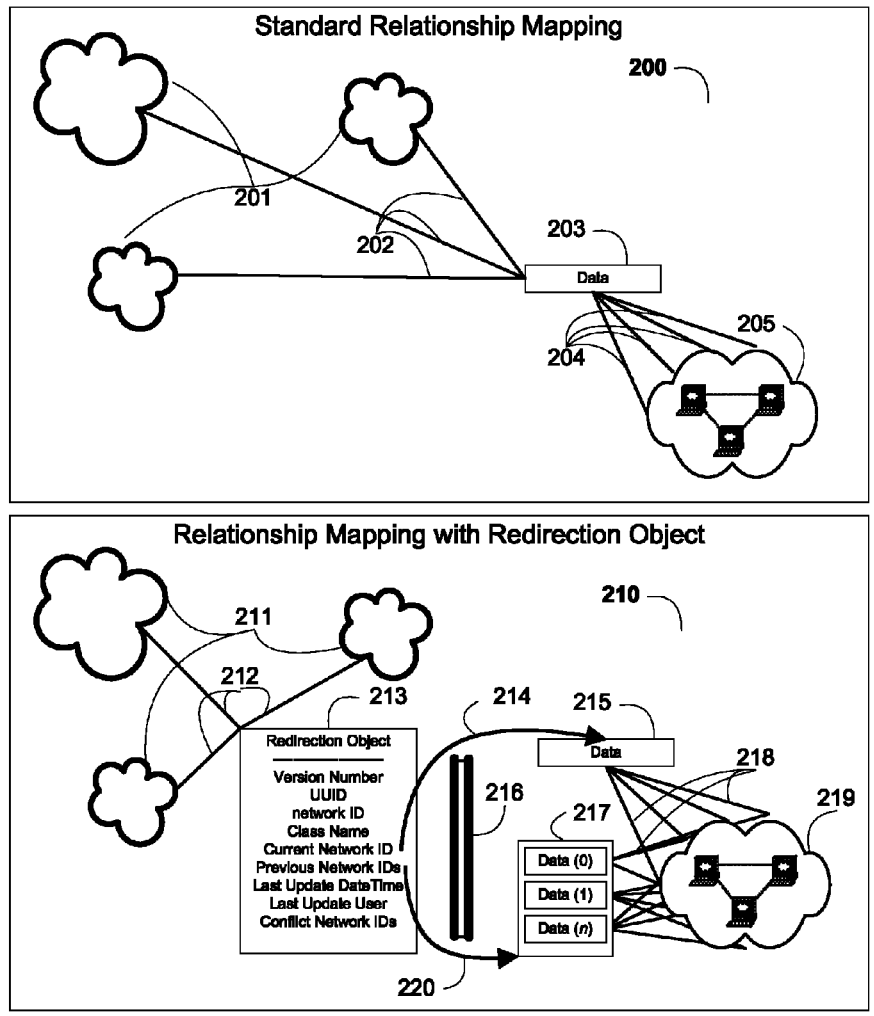
FIG. 2 is a block diagram illustrating an example of data being mapped within a peer-to-peer database, perhaps using a redirection object.
Figure 2A:
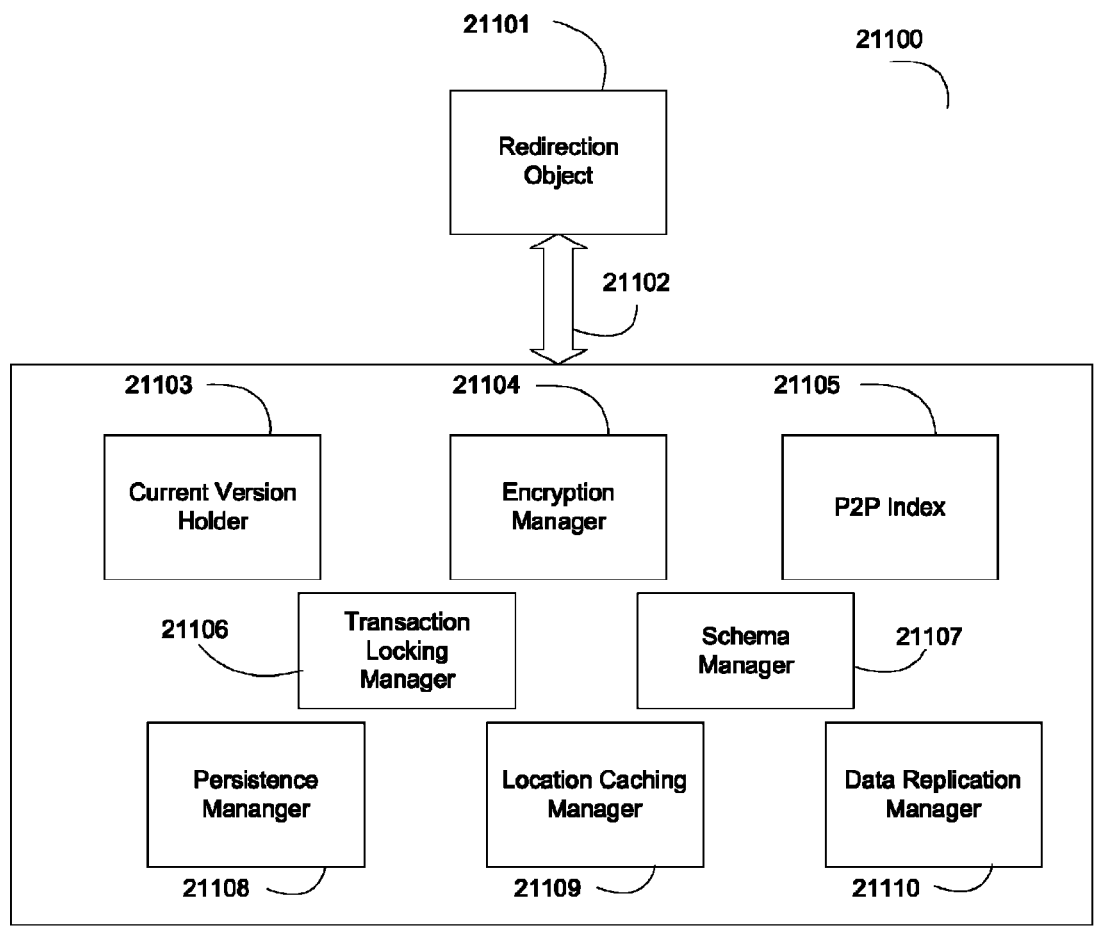
Figure 2B:
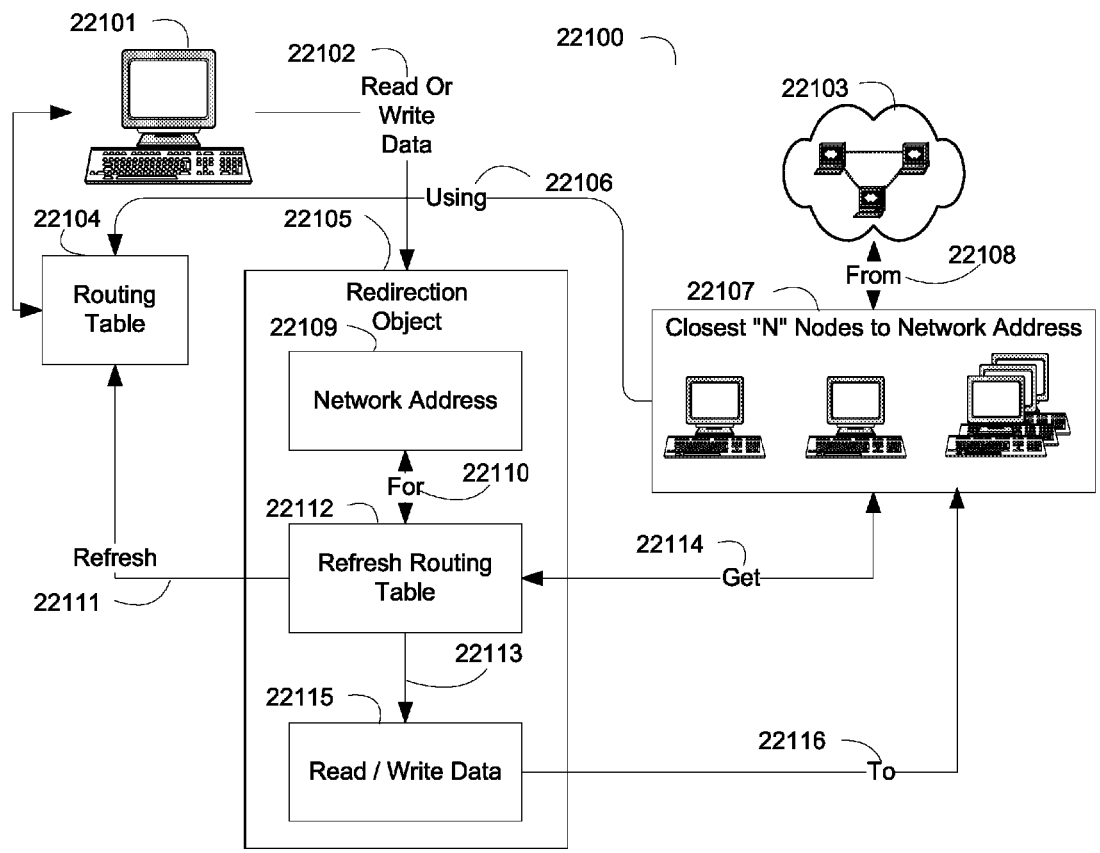
Figure 2C:
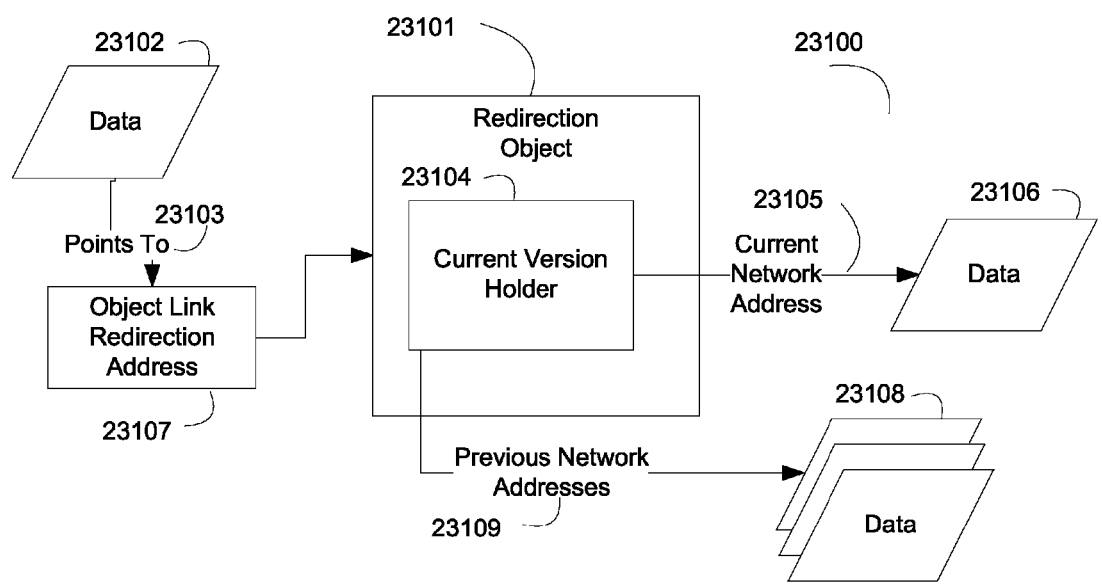
Figure 2D:
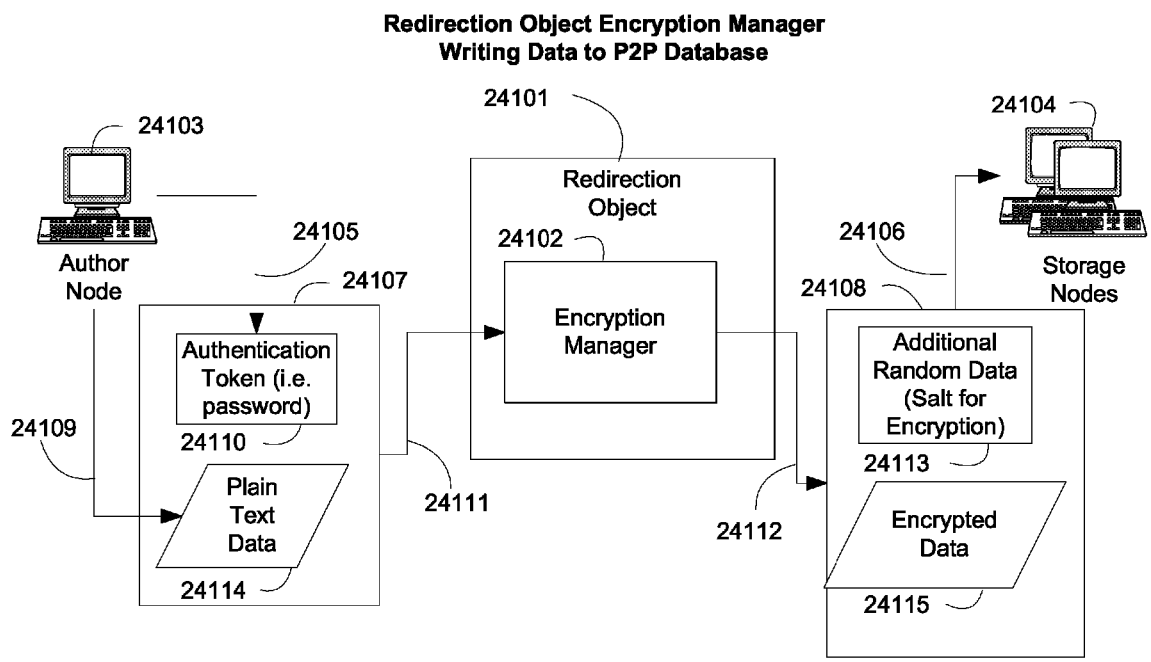
Figure 2E:
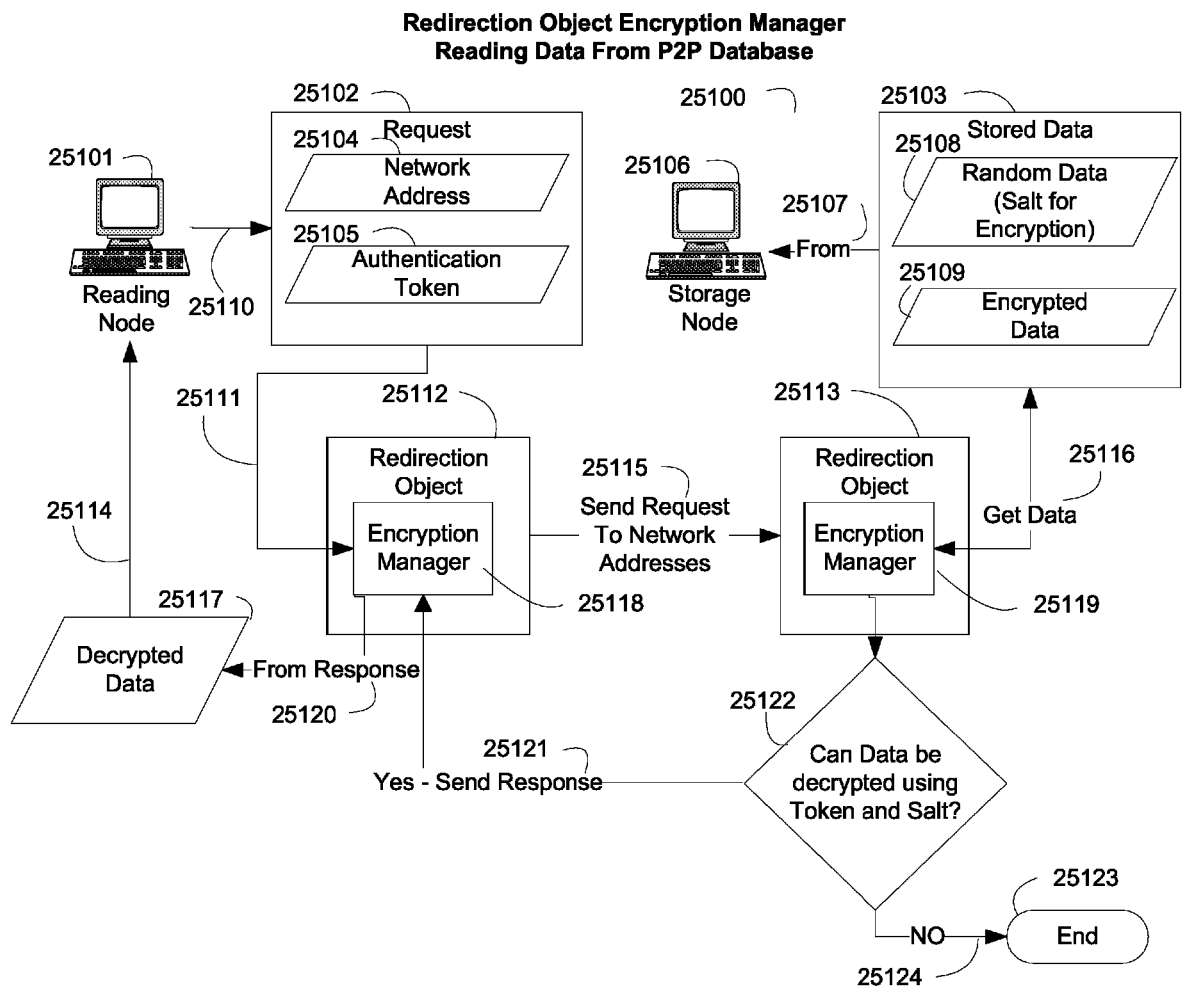
Figure 2F:
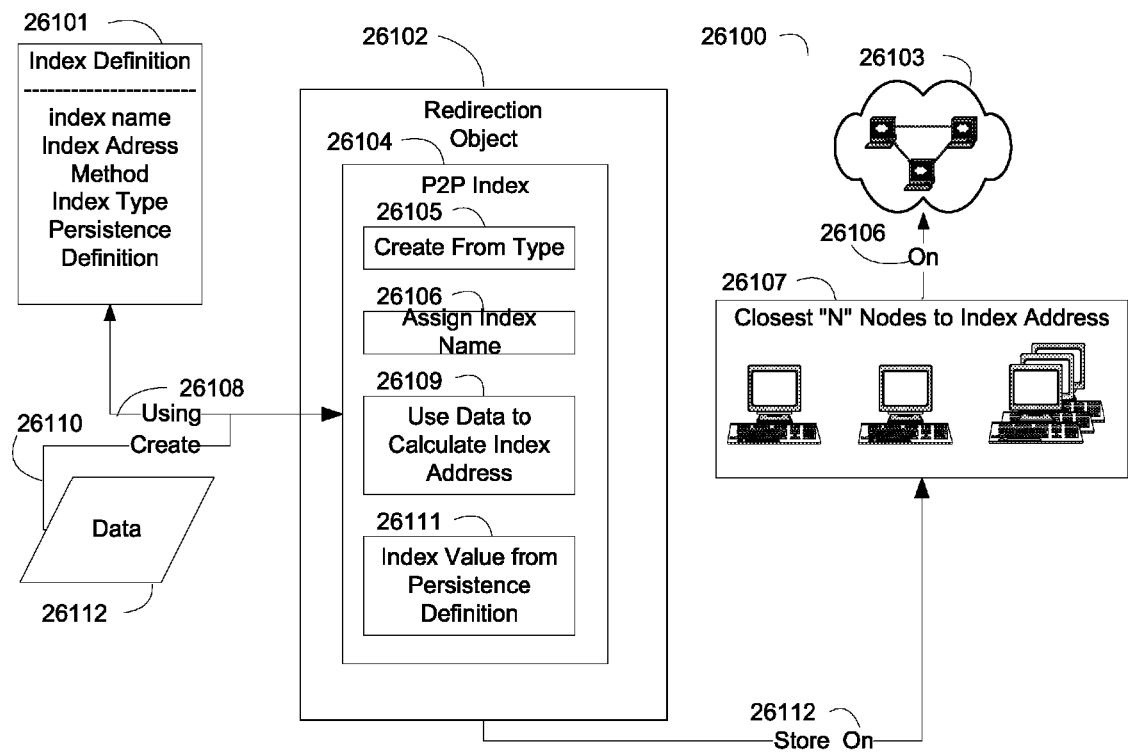
Figure 2G:
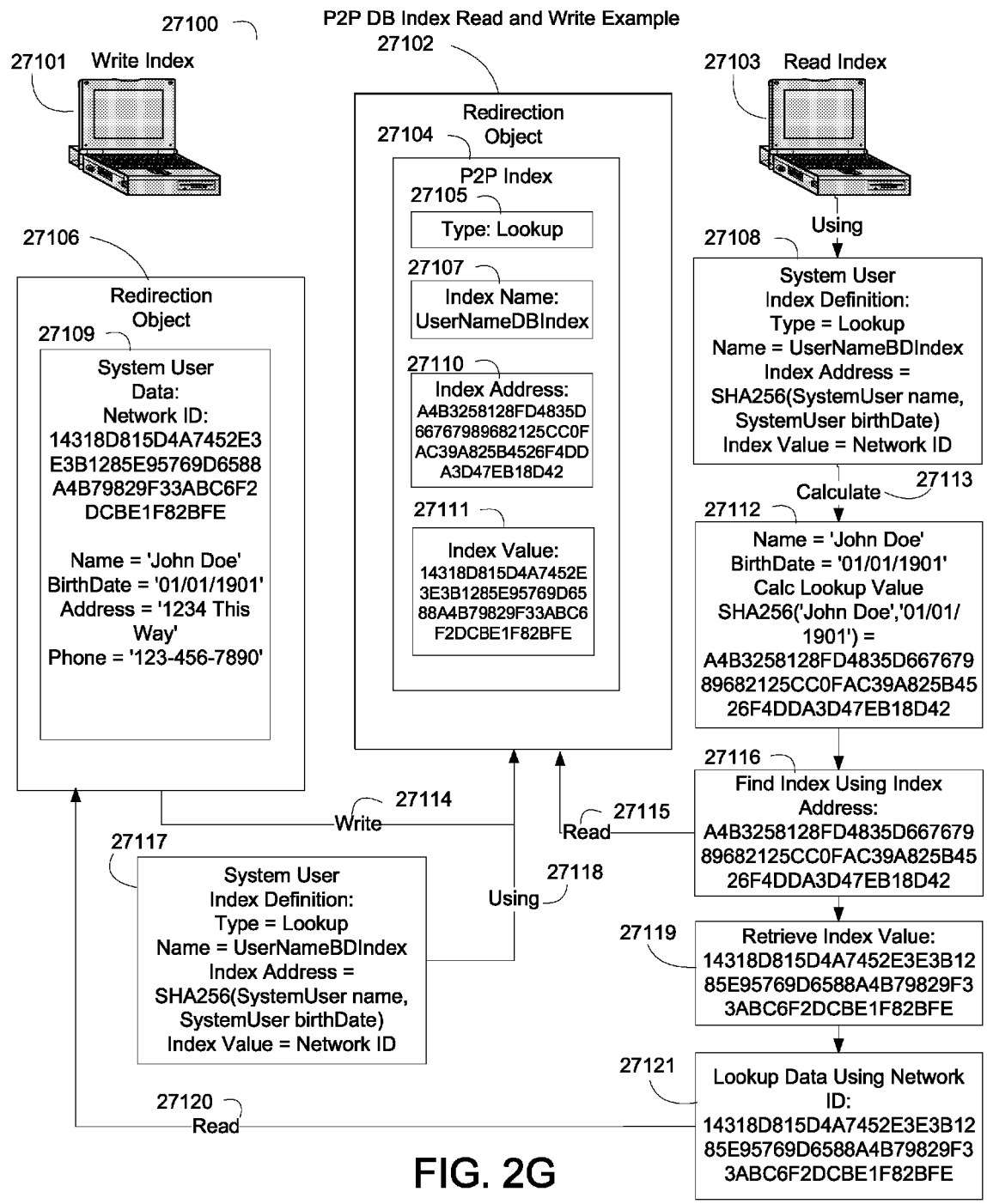
Figure 2H:
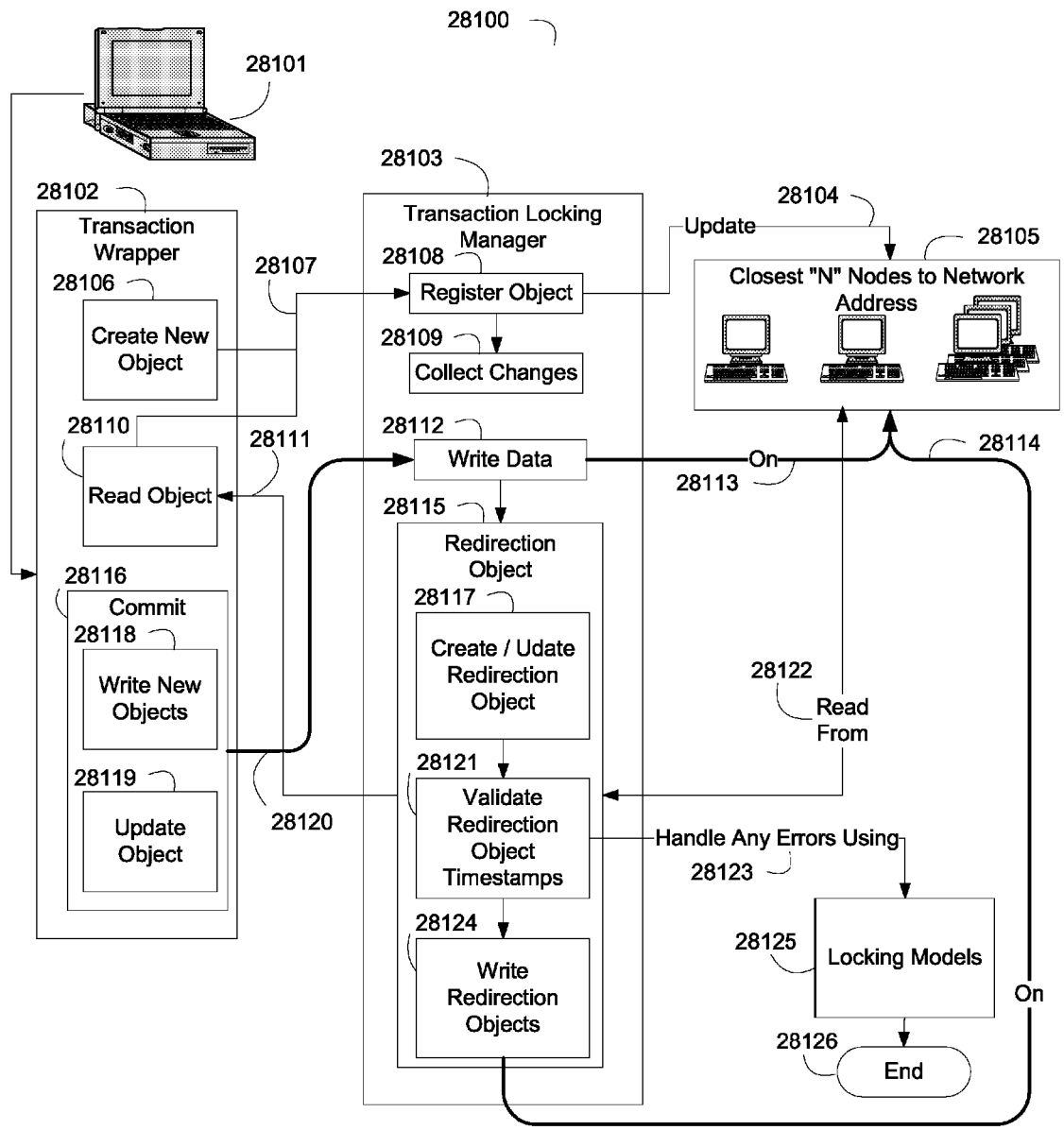
Figure 2J:
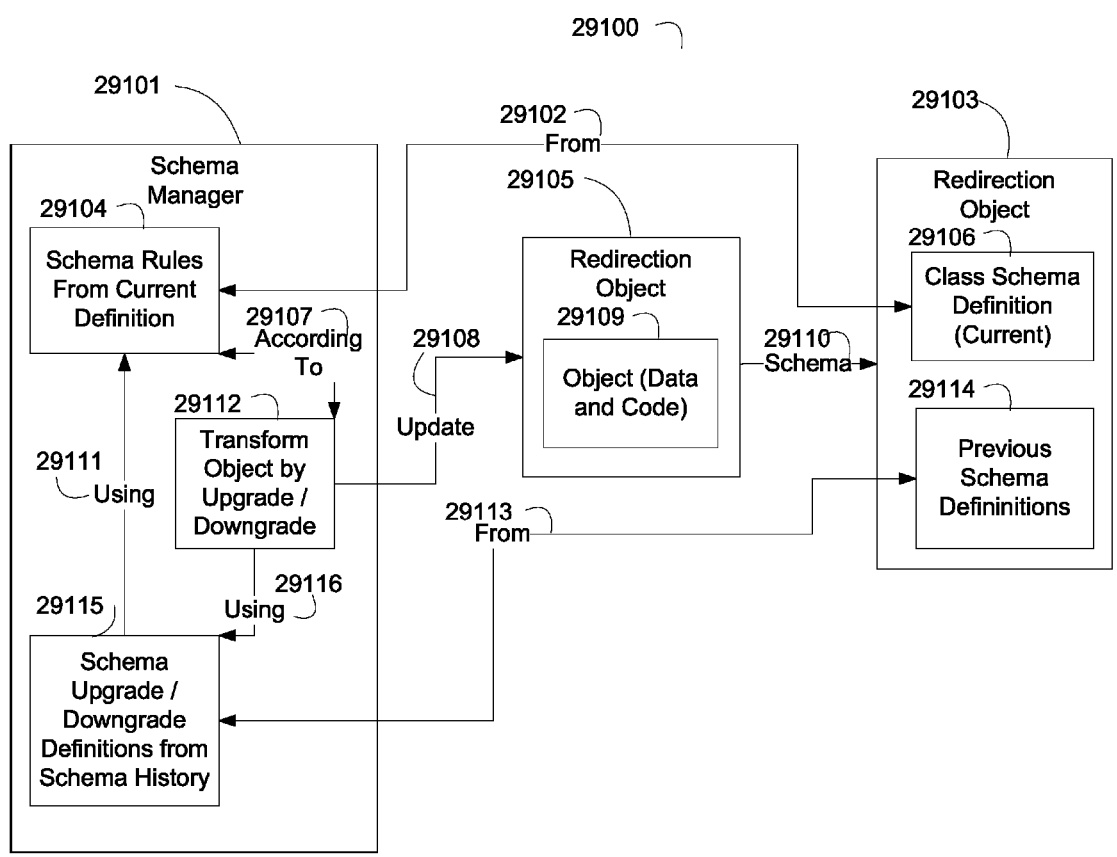
Figure 2K:
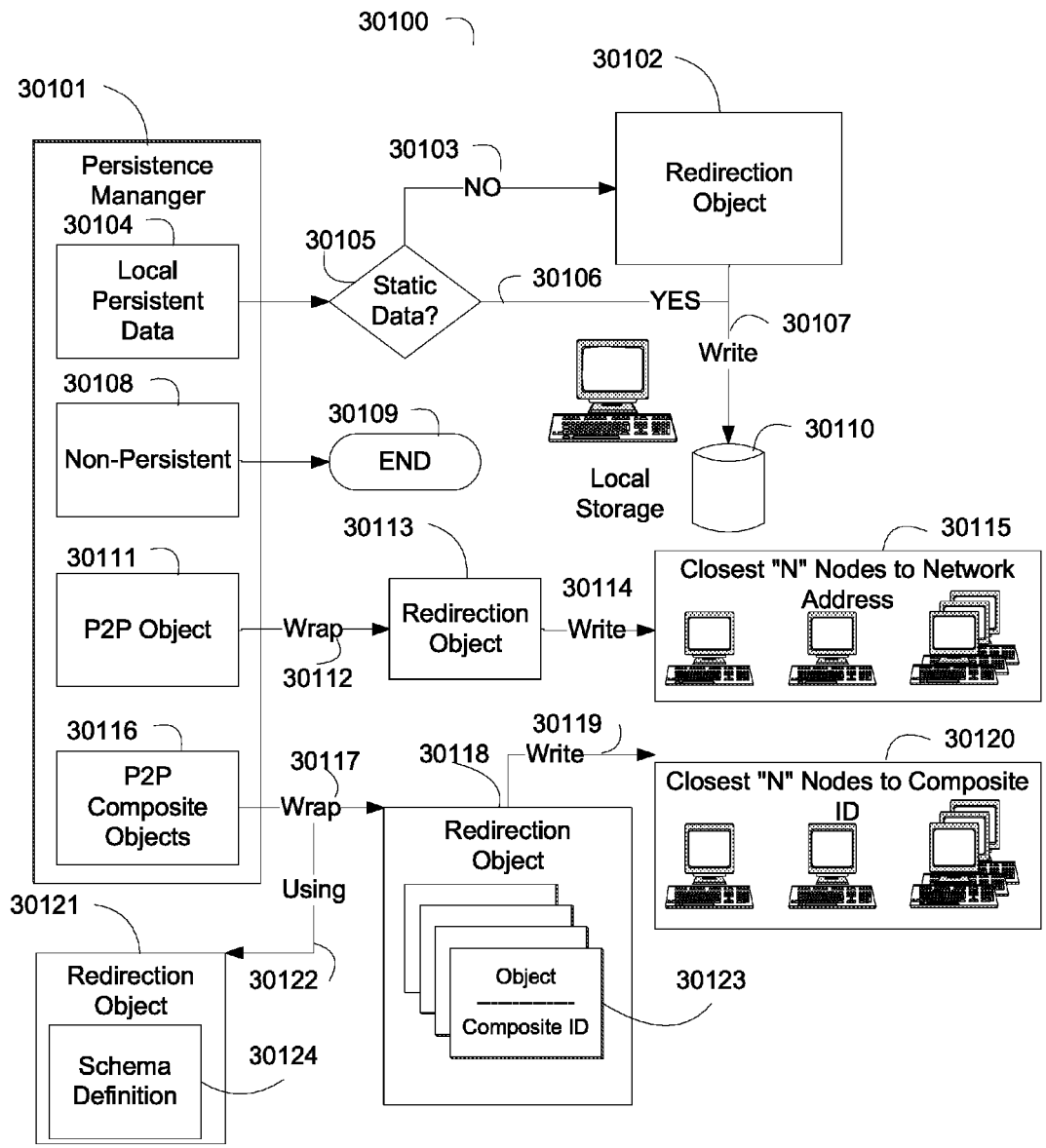
Figure 2M:
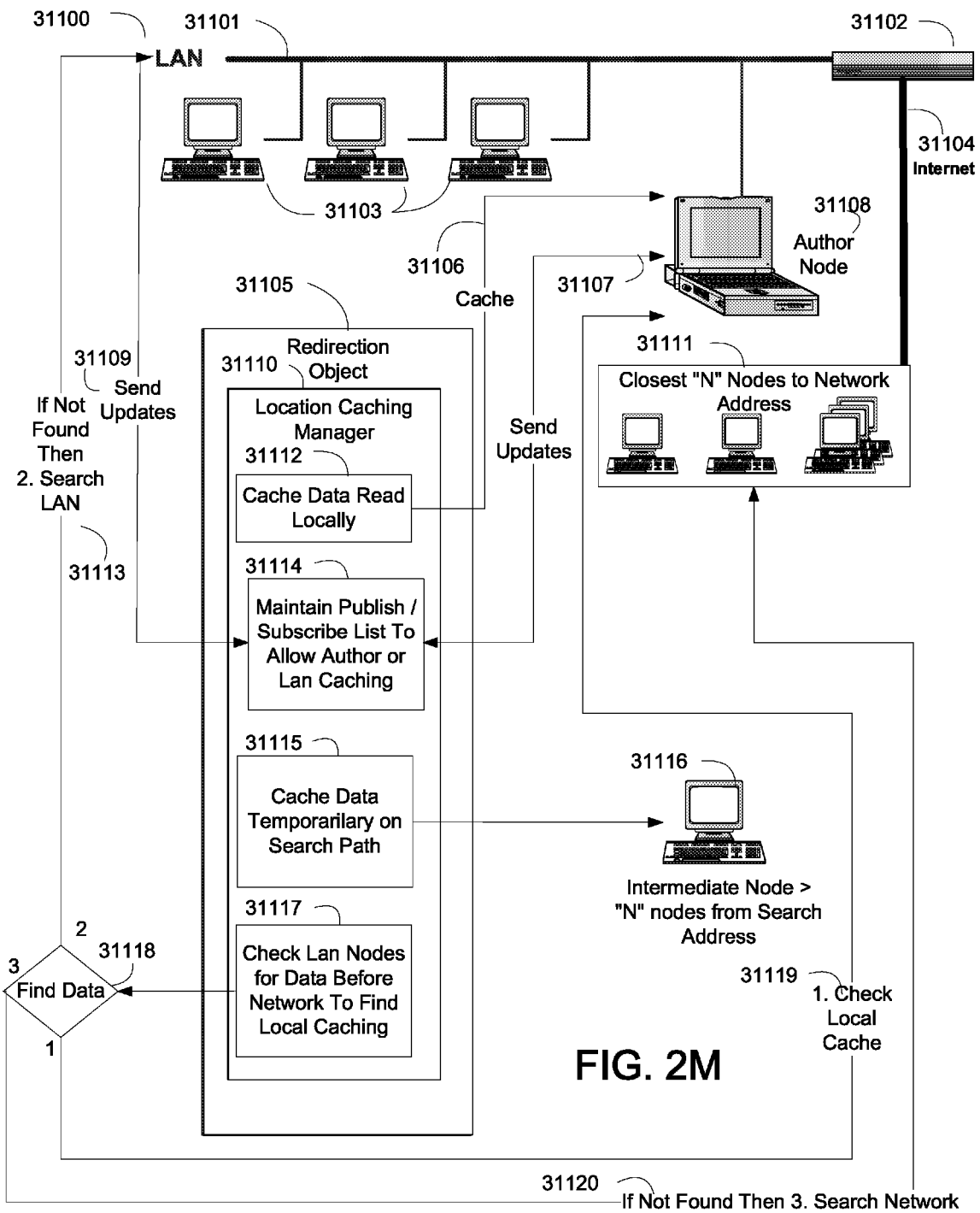
Figure 2N:
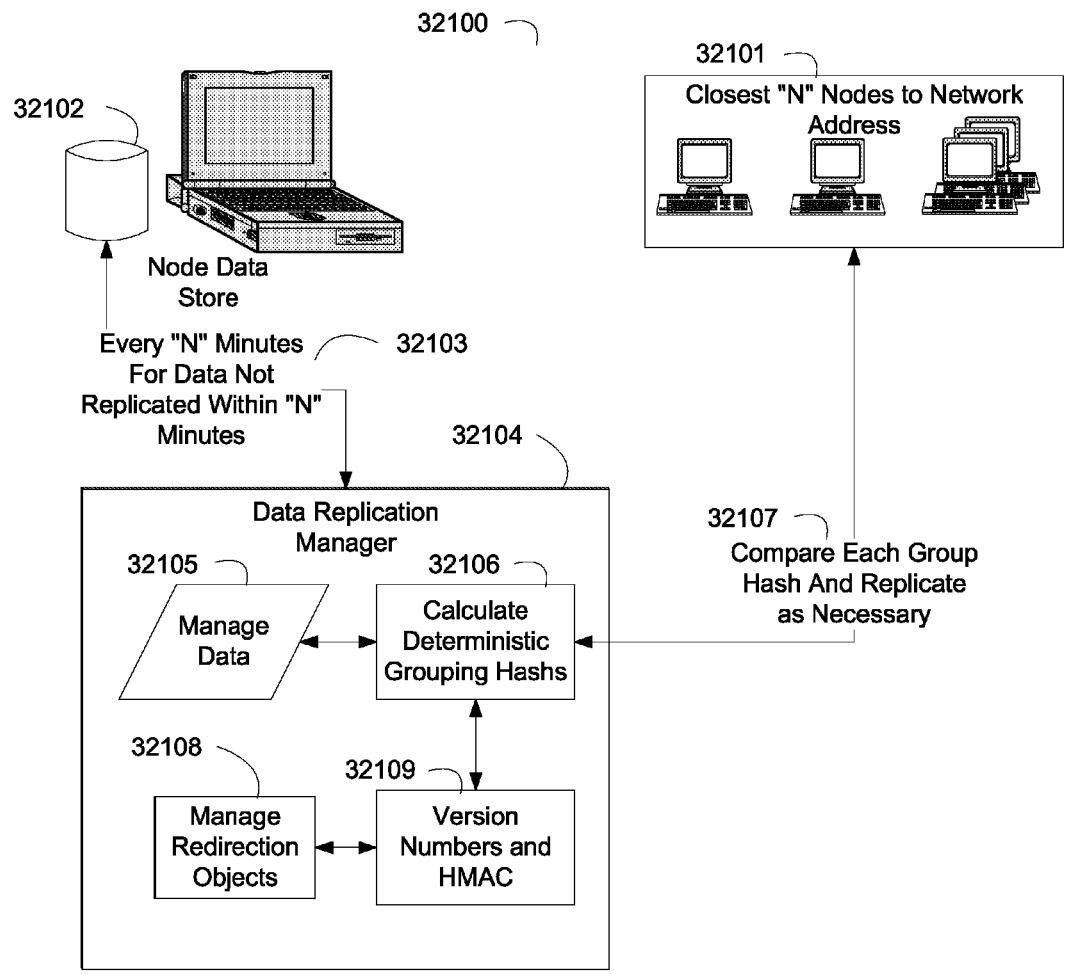
Figure 2P:
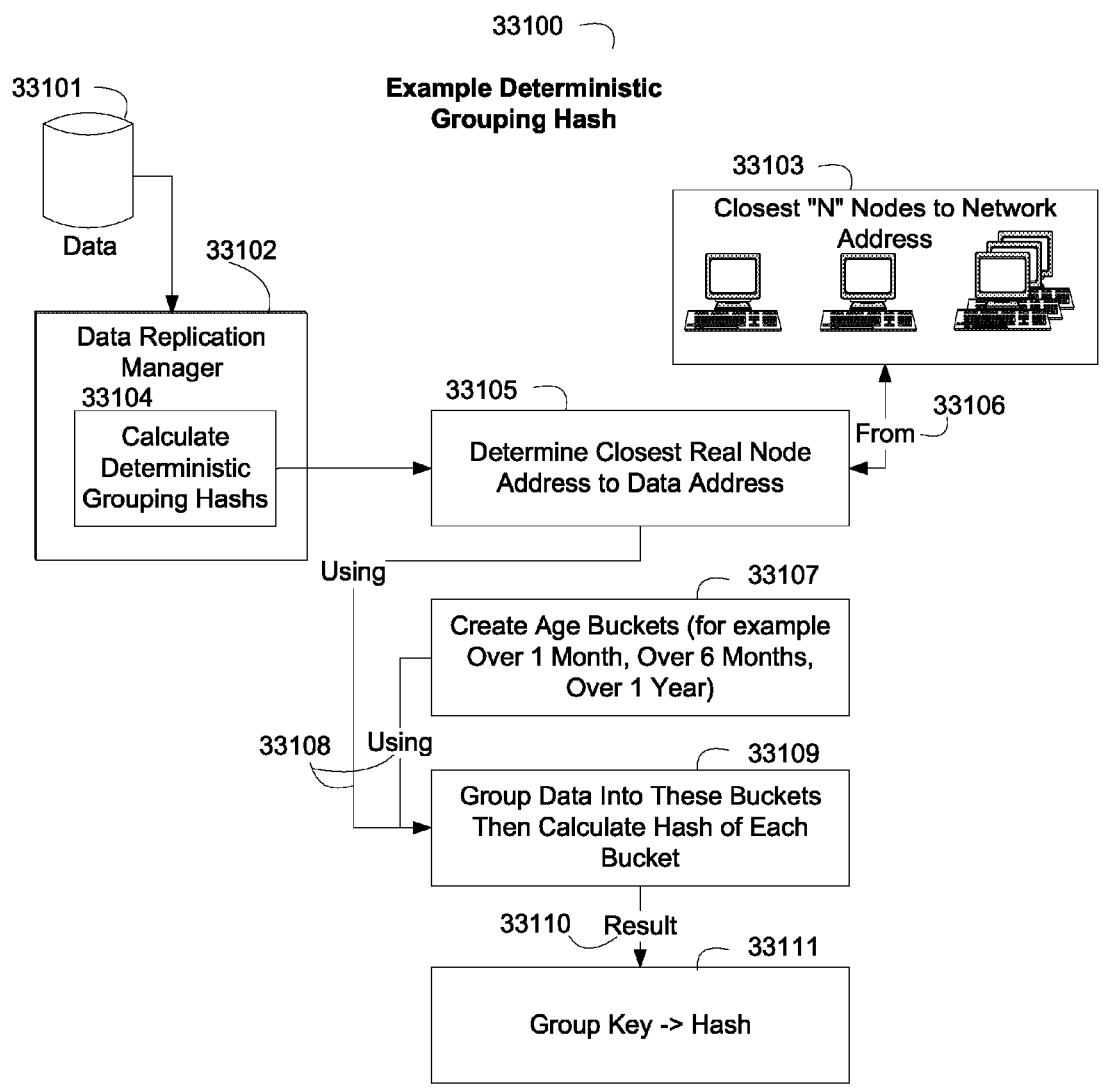

FIG. 2 includes a block diagram 200 of an example relationship mapping of elements within a peer-to-peer database. Multiple references to data 201 are connected using connection 202 to a data element 203, where the data element 203 exists on multiple nodes 204 of the peer-to-peer database 205. This standard relationship mapping diagram 200 shows the N to N connectivity that may exist in a peer-to-peer database.

FIG. 2 also includes a block diagram 210 that shows an example technique to organize and control that N to N connectivity using a Redirection Object 213. The data still has multiple references 211 that are connected, but instead of being directly connected to the data 215 they are connected 212 instead to the redirection object 213. The redirection object 213 includes data that may be persisted in multiple locations, similarly to the connections 204 of the relationship mapping block diagram 200. The redirection object 213 can contain, for example, a version number, a UUID, a network ID, a class name, the current network ID (e.g., a pointer 214 to the current data 215 which is persisted at multiple locations 218 on the peer-to-peer database 219), a listing of previous network IDs (e.g., a pointer 220 to a list of network ids 217 which are pointers to data that are persisted at multiple locations on the peer-to-peer database 219), and possibly a last update date time, last update user, and conflict network IDs (e.g., references to nodes that persisted data at the same time and created a conflict on the database). One benefit of this approach is that it may simplify the connections 212 from external objects 211, because the connection of those objects 212 may be maintained as pointing to the same redirection object 213, and are separated by that object 216 from the data, which is allowed to change dynamically and is represented by data contained within the redirection object 213. This redirection object 213 allows for changes to data without having to update or know about the links that are pointed to the redirection object 213, making the storage of the data substantially independent from its relationships.

FIG. 2-A is a summary diagram 21100 of the possible components of a P2P database. The components 21103 to 21110 could be related 21102 to the Redirection object 21101 by either being a component of the object itself or being used in conjunction with the Redirection object 21101. The related components are, the Current Version Holder 21103, the Encryption Manager 21104, the P2P index 21105, the Transaction Locking Manager 21106, the Schema Manager 21107, the Persistence Manager 21108, the Location Caching Manager 21109, and the Data Replication Manager 21110.

FIG. 2-B is a diagram of a component 22100 of a peer to peer database a Redirection Object 22105 which can be used to store objects at the "N" closest nodes 22107 of a peer to peer database 22108. When the client 22101 reads or writes data 22102, the redirection object 22105 first refreshes 22111 the routing table 22104 of the client node 22101 using 22106 the closest known nodes 22107 to refresh the routing table 22112 and get 22114 the "N" closest Nodes 22107 for 22110 the network address 22109 of the object. After the nodes are found the system can proceed 22113 to read and write data 22115 to 22116 the "N" closest nodes 22107 from 22108 the Peer to Peer database 22103.

FIG. 2-C is a diagram of a component 23100 of the peer to peer database a Redirection Object 23101 which may contain a Current Version Holder 23104. The Redirection Object 23101 provides a consistent address so that other data 23102 that points to 23103 the data 23106 uses an object link to the redirection address 23107. The data 23106 is wrapped by the Redirection Object 23101 so that the same address can point to multiple versions of the data. The Current Version Holder 23104 holds the current network address 23105 which can be used to retrieve the actual data 23106. The Current Version Holder 23104 also holds onto previous network addresses 23109 which can be used to retrieve a full history of changes of this object 23108.

FIG. 2-D is a diagram of a component 24100 of a peer to peer database a Redirection Object 24101 which may contain an encryption Manager 24102 that provides encryption and decryption of data stored on the network. To write encrypted data on the peer to peer database storage nodes 24104, the author node 24103 provides 24105 an authentication token 24110, for example, a password, along with the plain text 24114 to be encrypted as input 24107 to 24111 the Encryption Manager 24102. The Encryption manager then adds random data 24113 as salt for encryption, then encrypts the data 24115 and stores the result 24108 on 24106 the storage nodes 24104. The password belongs to the user or author node 24104 and the salt is stored on the storage nodes 24104. Both are needed to decrypt which means any one computer can not decrypt the data stored on the storage node 24104.

FIG. 2-E is a diagram of a component 25100 of the peer to peer database a Redirection Object 25112, 25113 which may contain an Encryption Manager 25118, 25119, which could be used to read encrypted data from a peer to peer network. The Reading node 25101 creates 25110 a request 25102 that contains the Network Address 25104 and the authentication token for example a password 25104 and provides 25111 it to the encryption manager 25118. The encryption manager 25118 sends the request 2511 to a remote encryption manager by way of the Redirection Object 25112. The receiving Redirection Object 25113 Encryption Manager 25119 retrieves 25116 the stored data 25103 from 25107 the Storage Node 25106. The stored data contains the random salt 25108 and the encrypted data 25109. If the data can be decrypted 25112 a response is sent back to the requesting Encryption Manager 25118 which delivers 25120 the decrypted data 25117 to 25114 the reading node 25101. If the data can not be decrypted 25124 then the process ends and the node does not respond 25123.

FIG. 2-F is a diagram of a component 26100 of a peer to peer database a Redirection object 26102 which may contain a P2P Index 26104 that allow the peer to peer data base to aggregate data or provide other indexing services. A P2P index 26104 is created from an Index Definition 26101. The Definition may contain data that includes a Name, a method to calculate the storage address, an Index type which defines what the index stores and how it works and a persistence definition which tells the index what values to store. An Index is created 26110 from Data 26112 using 26108 the index definition for the data object. The index is created from the index type 26105 the name is added 26106 and the address is calculated 26109 using the data 26112 and index definition 26101 address method. Then the value of the index 26111 is written using the data 26112 and the index definition 26101 persistence method. The index is then stored on 26112 the "N" closest nodes to the Index Address 26107 on 26106 the Peer to Peer Database 26103.

FIG. 2-G is a diagram of a component 27100 of a peer to peer database a Redirection object 27102 that may contain a P2P Index 27104. This diagram is an example of a process to read and write a P2P lookup type index 27105. The creating node 27101 writes the index by creating a P2P index from local data 27109 which is wrapped by a Redirection Object 27106. The data includes a network id, a name and birth date and other data 27109. The creating node 27101 creates the P2P index 27104 by using the Index Definition 27117 for the data object. In our case 27117 says the type is Lookup 27105, the Name is UserNameBDIndex 27107, the address is defined as SHA256 of the concatenation of the user name and birth date 27110 and the value is the address of the data itself 27111. The creating node 27101 writes 27114 the P2P index 27104 using 27118 the Index Definition 27117. The reading node 27103 can find the actual data 27109 by using the P2P Lookup Index 27104. The Reading Node 27103 uses the Index definition 27108 to calculate 27113 the data needed as an input to lookup the data 27109. In our example the name, and birth date is all that is needed. The Reading node 27103 calculates the address of the index 27112 and then looks up the index using that address 27116 to read the index 27115. Once the reading node 27103 has the index it can retrieve the value 27121 which is the address that can be used to read 27120 the actual data 27109 from the redirection object 27106. The value method of the index in this case points to an address of the data not the redirection object, but a current value can be obtained by traversing to the Redirection object 27106 and getting the current value. A persistence value method could instead point to the address of the redirection object depending on the needs of the index.

FIG. 2-H is a diagram of a component 28100 of a peer to peer database a Transaction Locking Manager 28103 which works with a Redirection Object 28115 to provide transaction support for reading, creating, updating, and removing information from a peer to peer database. The Client 28101 can use a transaction wrapper 28102 which monitors the users' access to the peer to peer database. When the user creates a new object 28106 the wrapper notifies 28107 the transaction manager 28103 to register the object 28108 on the transaction locking manager 28103. This tells the system to prepare for a commit later by updating 28104 the listing of "N" closest nodes to the new network address 28105, and then collecting changes 28109 for later commit. If the user reads an object 28110 from the peer to peer database 28122 an redirection object is reified and maintained by the transaction locking manager 28103 and returned to the User 28101. The Transaction Wrapper 28102 then sends the 28107 information so that it can register this object 28108, update 28104 the "N" closest nodes 28105 and collect changes 28109 for later commit. When the user commits the changes the system can write new objects 28118 by writing the data itself on 28113 the peer to peer network 28112. This is different from writing the Redirection Object 28115, which maintains the linking of objects. For a new object the system creates a new redirection object 28117 then it validates timestamps 28121 which for a new object does nothing, and then it writes the Redirection Objects 28124n 28114 the "N" closest nodes 28105. When an object is updated 28119 the wrapper sends 28120 a signal to the Transaction Manager 28103. If the object has changes then the transaction manager 28103 writes the new data 28112 on 28113 the peer to peer network, then updates the redirection object 28117 with a new address and other information 28117 including moving the current address to the history of addresses and changing the version number. It then validates Timestamps 28121 by checking the "N" closest nodes for changes that were not present during the read 28112. If an error is detected 28123 then the system handles the error by using the rules from the locking models 28125. These rules may include an instruction to End 28126 processing. After errors are handled 28123 if there were no errors or if no end was encountered, the system then writes the redirection objects 28124n 28114 the Peer to Peer Database 28105.

FIG. 2-J is a diagram of the component 29100 of a peer to peer database a Schema Manager 29101 which interacts with Redirection Objects 29105, 29103 to provide the functionality needed to maintain consistent versions of objects on the peer to peer database. An object 29109 is wrapped by a Redirection Object 29105 which maintains a link to the Schema 29110 of the class. The Schema is wrapped in a Redirection Object 29103 which points to the current Schema Definition 29106. The Schema Manager 29101 reads that definition 29106 to determine Schema Rules 29104 which can limit when and how schema changes should be handled. If a change is detected, the system is running a version of the class that is different from the current definition, then the Schema Manager 29101 then collects upgrade/downgrade definitions 29115 from 29113 the Previous Schema Definitions 29114 of the Redirection Object 29103 which wraps the Schema Definition of the class 29103. The Schema Manager 29101 Then transforms the objects 29112 according to 29107 the rules 29104 using 29116 the upgrade and down grade definitions 29115 to update 29108 the class to the necessary schema version.

FIG. 2-K is a diagram of a component 30100 of a Peer to Peer Database a Persistence Manager 30101 which may interact with Redirection objects 30102, 30113, 30118 to provide the functionality to write data in different ways to the peer to peer database. A peer to peer database may use static 30105→30106 local persistent data 30104 which may be used for looking up information for applications for example a zip code. Having access to this data stored locally enables the system to quickly respond to queries for data. The data can also be changed without maintaining a history of previous values, so wrapping with a Redirection object is not necessary. The static data 30106 can then be written 30107 directly to the client local storage 30110. The data can be stored in various formats including using a local DBMS for data management or files etc. If the local persistent data 30104 is not static 30105→30103 then the data can be wrapped using a redirection object 30102 and is written 30107 to the local storage 30110. If the data is non-persistent 30108 then the persistence manager 30101 instructs the system to do noting 30109, this allow the system to create temporary objects that do not get stored on the peer to peer network. For regular P2P Object 30111 the system instructs the system to wrap 30112 all persistent objects with a redirection object 30113 and write those 30114 on the peer to peer network 30115. This may be managed by a Transaction Locking Manager see FIG. 2-H. The Persistence Manager can also determine from 30122 the schema definition 30124 which objects 30123 should be grouped together wrapped 30117 with a redirection object 30118 and stored 30119 as a composite an the "N" nodes closest to the composite address 30120. This allows groups of objects that are usually read together to be stored and read as a group.

FIG. 2-M is a diagram of a component 31100 of a peer to peer database a Redirection Object 31105 which may contain a Location Caching Manager 31110 that provides the functionality needed to cache data in locations that improve the peer to peer database performance. When a node reads data 31112 from the peer to peer database that data is cached 31106 locally so that subsequent reads for the current session can be done locally 31119. When an author node 31108 creates new objects those objects can be registered through a publish and subscribe list 31114 which might be on the Redirection Object 31105. This list allows changes to be sent 31107 to the author node 31108. The Author node does not participate in the "N" closest node 31111 persistence but can be updated during replication management See FIG. 2-N.

Author caching can be beneficial when the data is created and then read on the same computer. When multiple computers within an organization are participating to create and read data for the organization, there are significant benefits to using the organizations LAN for caching since the speed of the LAN is orders of magnitude faster then external communication. The LAN Caching list can be used to cache the data 31109 on the users LAN using the nodes of the LAN 31103 as a separate network address space. These addresses are used for caching only and these computers are not used for "N" closest node 31111 persistence but can be updated during replication management See FIG. 2-N. When data is requested frequently along a search path the system can cache 31115 the data along that search path 31116 to make it easier for nodes to find the data. When a node is attempting to find data 31118 the system would first check the local cache 31119 then check the LAN Nodes 31113 for the data, and then search 31120 the network "N" closest nodes to the network address 31111. The system would benefit from local 31112, and author caching 31114 in the first step, LAN caching 31114 in the second step and potentially search path caching 31115 in the third.

FIG. 2-N is a diagram of a component 32100 of a peer to peer database a Data Replication Manager 32104 which maintains "N" copies of data 32105 and Redirection Objects 32108 on "N" closest nodes 32101 to the network address. The Replication Manager 32104 is responsible for coordinating data that is stored on this node 32102 every "N" minutes that was not already replicated within "N" minutes 32103. The Replication Manager 32104 uses the data 32105 or version numbers and HMAC 32109 of Redirection Objects 32108 to calculate a deterministic grouping hash 32106. The result of this operation must be the same as other nodes considering the same data and groups. The results of these calculations are shared with the "N" closest nodes 32101 so that they can be compared 32107 and then only if there are changes detected those changes are replicated to or from other nodes 32107.

FIG. 2-P is a diagram of a component 33100 of a peer to peer database a Data Replication Manager 33102. The diagram has an example of a component of the Replication Manager 33102 a Deterministic Grouping Hash Algorithm 33104. The system starts by considering the Data 33101 and then it using that data it retrieves the closest real network node to the data's network address 33105. This is used 33108 as a component of the grouping key 33109. The system then ages the data. This is valuable because data the older the data is the less likely it is to change. Segregating data into buckets that haven't changed and representing them by a hash that is simple to calculate and compare reduces the amount of reconciliation needed to replicate the data when nodes leave and join the network. Once the age is calculated 33107 it is used 33108 as a component of the group key for the bucket 33109 the hash of the contents of the bucket is then calculated. This results 33110 in a group key and hash value 33111 that can be shared with other nodes to ensure the contents are replicated consistently. If the group hash does not match then the data needs to be replicated to or from the other nodes.

Figure 3:
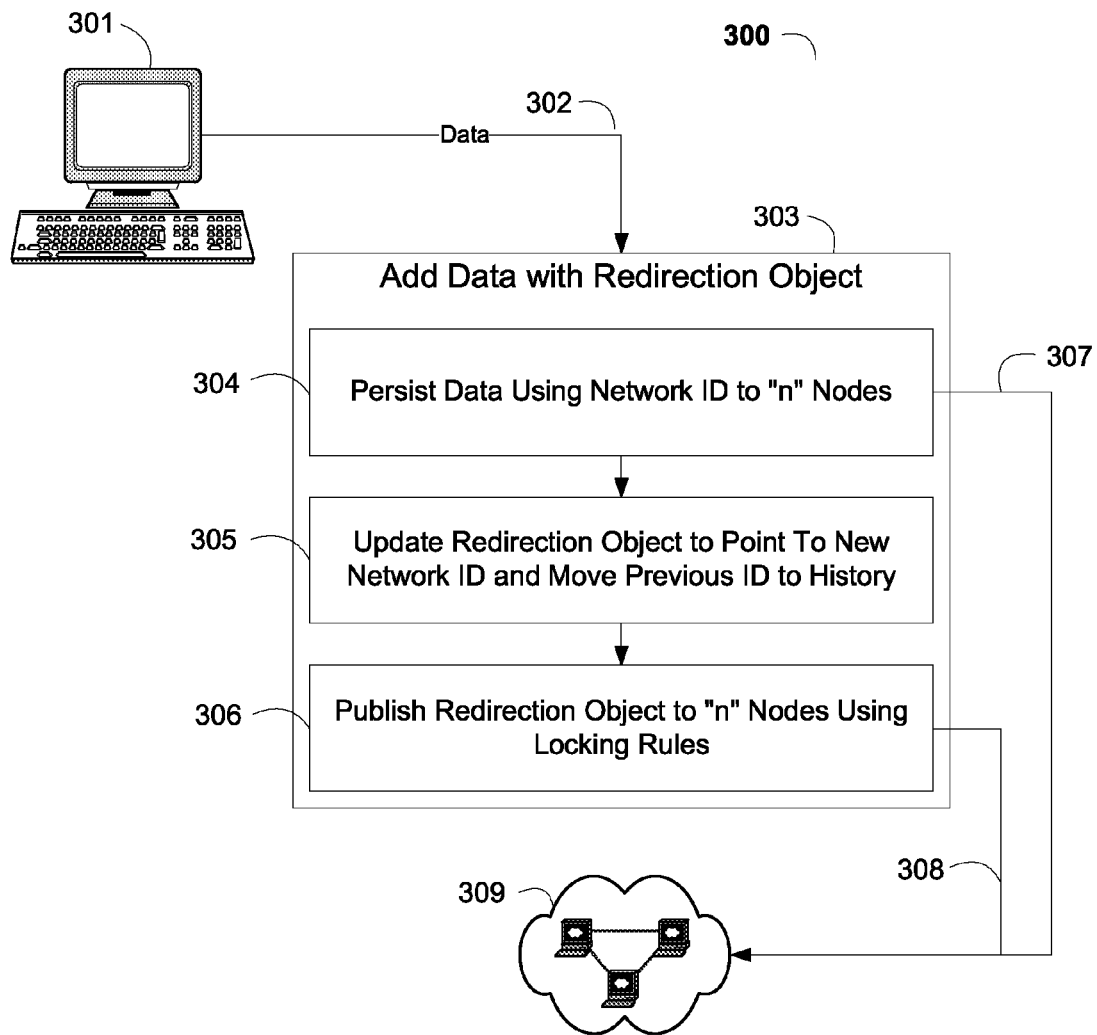
FIG. 3 is a block diagram illustrating examples of how to persist data and update a redirection object representing a mapping to that data, using a peer-to-peer database.

FIG. 3 is a block diagram 300 showing the process 303 of adding data 302 from a peer node 301 to the peer-to-peer database 309. The process 303 of persisting data with a redirection object starts with persisting the data 304 using a network id assigned by using a deterministic algorithm (for example SHA256) on the data and storing 307 that data at "n" nodes that share that network id. Then the node 301 finds or creates a redirection object and updates 305 that object to point to the new network id that was just persisted 304 at "n" locations 307 and moves the previous ID into the history list. The node then publishes the redirection object 306 to "n" nodes 308 closest to the network id of the redirection object using locking rules, such as, for example, read and write locking, optimistic locking, or no lock.

Figure 4:
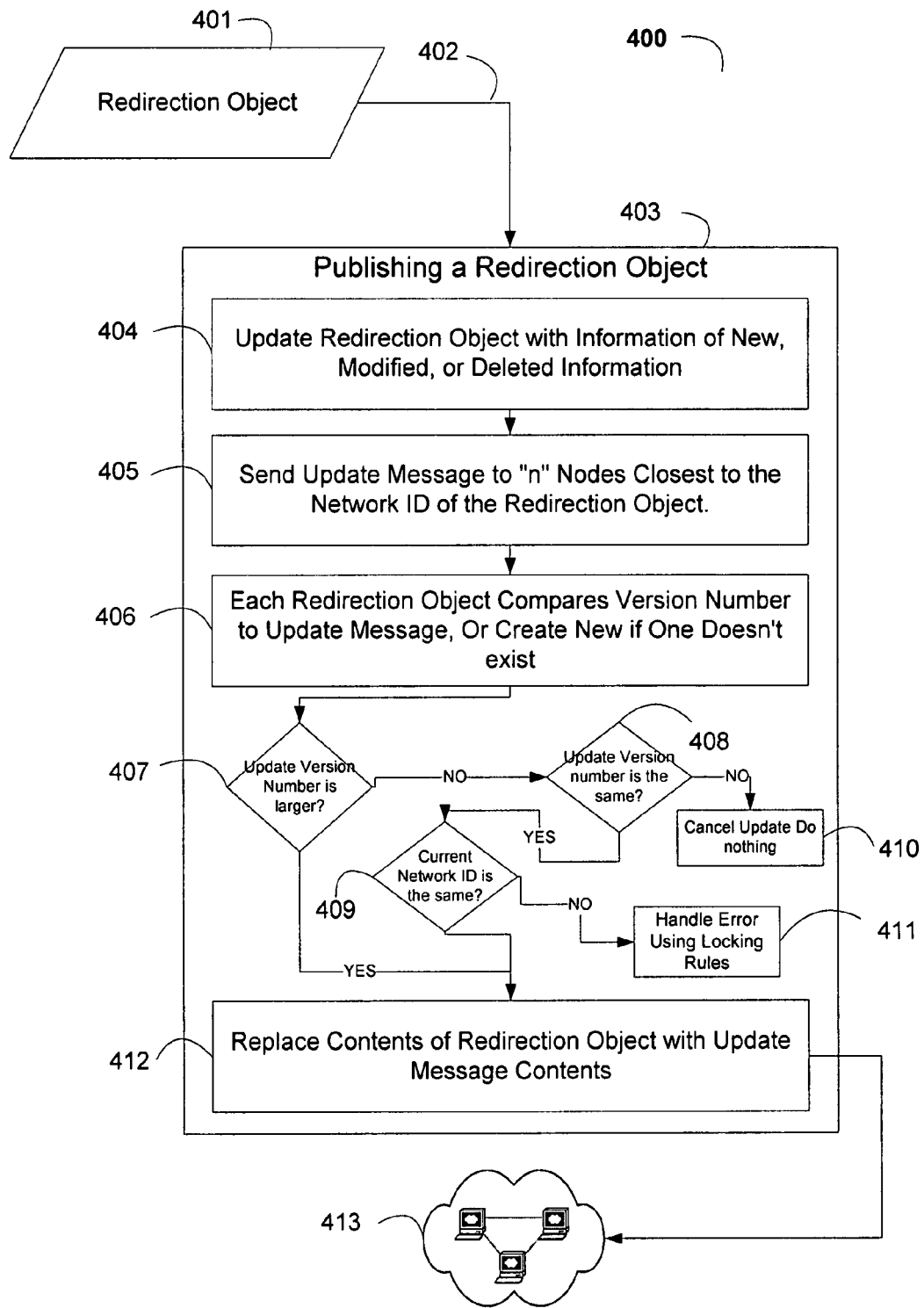
FIG. 4 is a block diagram illustrating a publishing of a redirection object on a peer-to-peer database.

FIG. 4 is a block diagram 400 which shows the process to publish 403 a redirection object 401 on a peer-to-peer database 413. After some data on a peer-to-peer database is updated the client finds or creates a redirection object 401 which initiates the process 402 of publishing 403. First the redirection object updates itself with new, modified or deleted information 404. This update includes increasing its version number by one (1). There are multiple persistent copies of the redirection object stored at "n" nodes throughout the peer-to-peer database 413. The update 404 may start 402 from a single copy of the redirection object 401. The updating or creating client then sends 405 an update message to "n" nodes closest to the network ID of the redirection object.

If a redirection object does not exist at one of the "n" closest nodes, then the nodes creates 406 one with the information provided in the update message, and the process completes. If a node does exist then the version number of the update message and the existing persistent redirection object is compared 406. If the version number of the update message is larger then the version number of the persistent redirection object 407 then the persistent redirection object replaces its contents with the update message contents 412 on the peer-to-peer database 413. If the version numbers are the same 408 then if the current ID of the persistent redirection object matches the current id of the update message 409, then the persistent redirection object replaces its contents with the update message contents 412 on the peer-to-peer database 413. If the version number(s) is greater than the update message 408 then the update is canceled and no further action is taken 410. If the version number are the same 408 but the current network ids are different 409 then conflict may be handled using defined locking rules 411.

Figure 5:
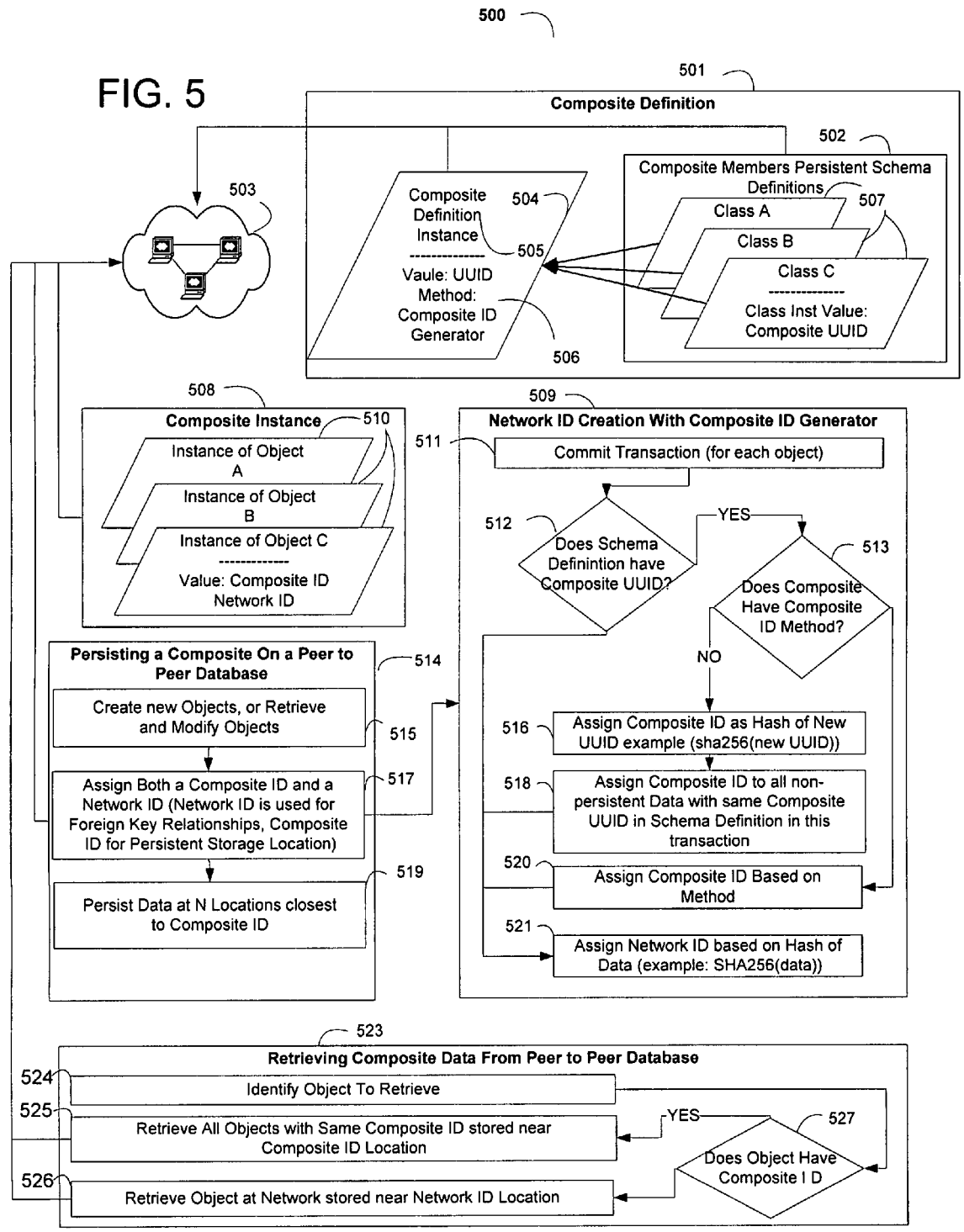
FIG. 5 is a block diagram illustrating an implementation of a data consolidation strategy using a composite data structure.

FIG. 5 is a block diagram 500 which shows a method for grouping information using a composite definition 501 to be stored in a single location. In the example of FIG. 5, a composite definition 504 is attached to each of the components 507 meta data 502. The composite instance 505 contains a UUID and a method for generating composite ids 506 when composites are created from this definition. The composite definition 504 is stored on the peer-to-peer database 503.

A composite instance 508 allows the peer-to-peer database 503 to store multiple instances or multiple classes 510 in a single composite instance 508. In order to persist a composite on a peer-to-peer database 514 the client creates, retrieves or modifies objects 515. The client then assigns a composite ID and a network id 517 and then persists the data at "n" locations closest to the composite ID 519. The network id may be used to maintain relationships, and the composite id may be used to determine where to store the contents of the composite 510 within the composite instance 508.

In order to assign a network ID for the composite 509 during a transaction commit 511 the client iterates through each object. If the schema Meta data for the class 507 has a composite definition UUID defined 512 then the client checks to see if there is a composite ID generator method 506. Having a defined Composite ID Generator 506 allows, for example, for a deterministic definition to be assigned consistently to all members of a composite. This also may allow for a composite to assign a consistent network address from multiple transactions, grouping the composite consistently from multiple clients or commits.

This Composite ID Generator 506 is optional and if there is no Composite ID method 513 then a network ID for the composite instance 508 can be assigned during the commit 516, as an example assigning a new UUID and taking the hash of that UUID for example sha256 (new UUID). This composite ID is assigned 518 to all non-persistent data that has the same composite UUID 504. This allows the system to group items of a single commit into a composite 508 on the peer-to-peer database 503. A new Composite Network ID should be used for each unique instance of a Composite definition 504 found within the transaction.

If 513 the composite definition 504 does have a Composite ID Generator 506 then the client may assign a composite ID based on the composite ID generator method 520. For example, in some implementations, all phone numbers for a patient may be stored in the same composite at the same location, no matter which client adds the phone number or at what time it is added. Accordingly, when a phone number for a patient is retrieved, all the phone numbers may be provided substantially at the same time.

In order to make sure that all additional phone numbers that are added or deleted no matter when are stored in the same location, a composite id generator may be used that returns the same composite network id for phone numbers. That ID is then converted into a network ID within the peer-to-peer database 503 namespace, for example (sha256 (Composite ID)). An example of a composite id generator method might be to take the word "phone number", and concatenate it with a unique identifier for the patient. For example in Smalltalk: ["phone number", aPhoneNumber owner patient uuid] would return a unique id if the phone number were attached to an owner which had a patient role which had a uuid. The client would then create a network id 521 for each component 510 of the composite 508 which can be used as relationship mapping foreign key. For each instance of a class within the commit 511 that does not have 512 a composite UUID on the meta data 507, the system may assign a network id 521, e.g., by skipping the composite ID steps 516, 518 or 520.

In order for a client to retrieve items that may be part of a composite 523 the client may identify the objects to be retrieved 524. To do this a client may be traversing from some known object following a foreign key to retrieve the next object by traversal. The client first checks its own memory for the network ID of the objects to be retrieved. The client will need to search the peer-to-peer database for those objects if those objects are not found in local memory. If the foreign key includes a composite ID 527 then the client will retrieve the composite and all components of that composite from the same network location 525, otherwise 526 the client will retrieve the objects one at a time from the network ID foreign key alone. The client benefits from the retrieval of all objects of a composite when composites are defined to retrieve groups of objects that are likely to be retrieved in subsequent traversals. Since these objects may now be stored in local memory the client will not have to search the peer-to-peer database 503 for them when they are retrieved.

Figure 6:
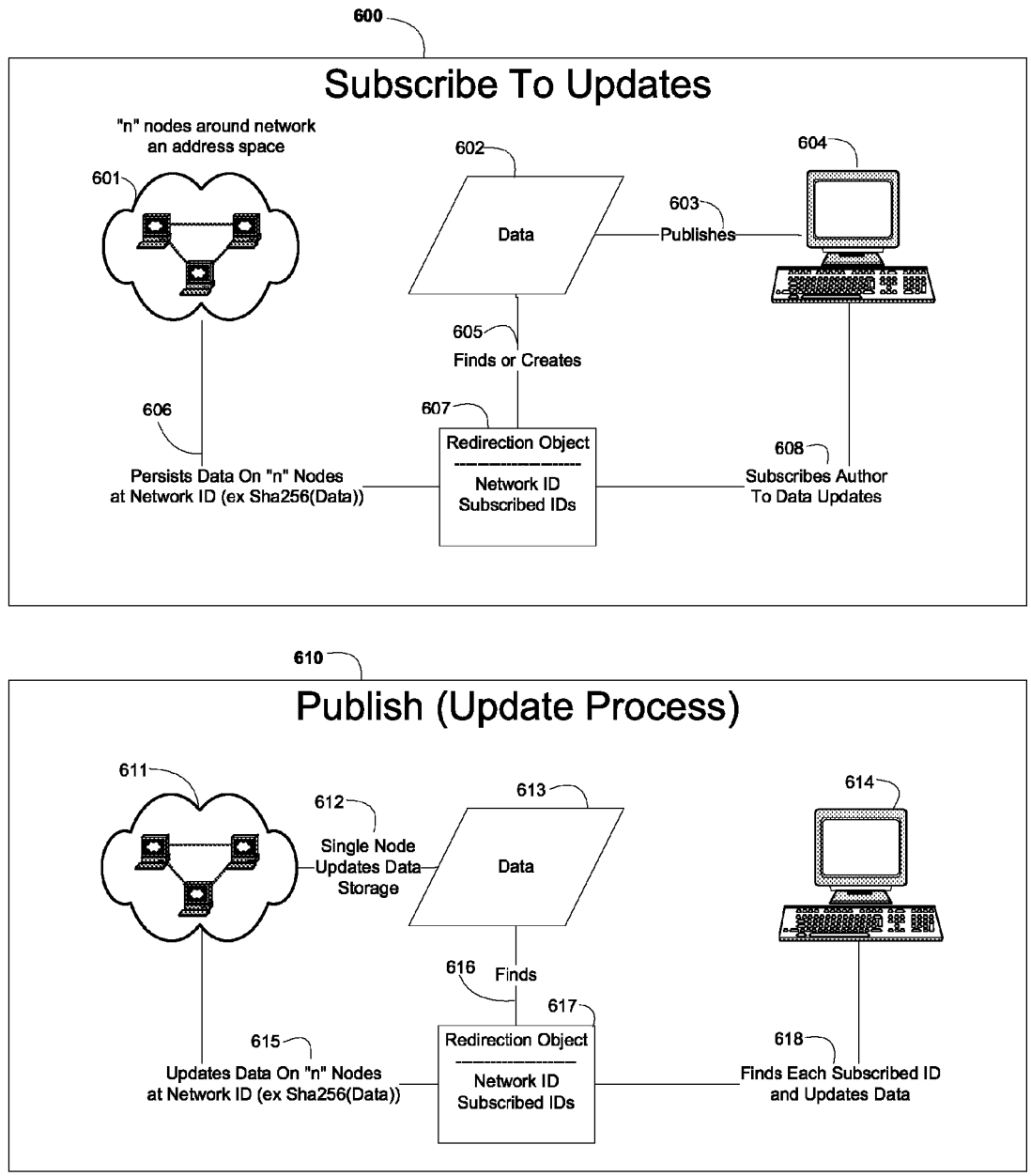
FIG. 6 is a pair of block diagrams depicting a publish and subscribe mechanism for data on a peer-to-peer database.

FIG. 6 is a pair of block diagrams that show how to subscribe to updates 600 and how to publish updates 610. In order for the data to be made available at "n" locations (nodes) closest to a network ID the peer-to-peer database may publish changes and manage its network namespace. Since the network is updating nodes to maintain this data availability at "n" nodes closest to a network ID by extending this process to additional node network IDs a publish and subscribe mechanism may be used. The client node may benefit from this local storage because each node may check its local memory first for data before searching the peer-to-peer database. This subscription can be maintained as needed and/or removed since, for example, removing instances from the client node may only cause a peer-to-peer database search for information.

As an example; if patient information is stored by a doctor on a peer-to-peer database, the doctor may want to have all updates for that patient for a period of time forwarded to this node, so that data can be local to the internal network for quicker retrieval in the future. In order to accomplish this, the peer-to-peer database may determine what additional network IDs to publish to. This could be accomplished, for example, by extending a redirection object 607 to maintain a listing of subscribed ids. Thus, when a client 604 publishes 603 data 602 it will find or create 605 a redirection object 607. At that point the client can subscribe the author 608 to data updates by adding the network id of the client to the list of subscribed IDs 607.

The redirection then is persisted at "n" nodes 606 around the network ID on the peer-to-peer database address space 601. The update process begins when a node decides to update data. This could happen as new nodes are added or removed, or as data is changed, or periodically. If a node receives an update it should assume that all of the "n" nodes in the address space around the network id of the data were also updated so that there is no need for this node to update other nodes. When a single node 612 of a peer-to-peer database 611 updates data 613 it finds 616 the redirection object 617, it may then publish that redirection object at "n" nodes 615 closest to the network ID on the peer-to-peer database 611, letting other updates expire and become invalid (nodes that are >n nodes away from the network ID) or writing to new nodes if there are <"n" that currently store the information. During the process of updating the information, the redirection object 617 also may update the nodes listing in the subscribed IDs 618 and may update those nodes also. To cancel the subscription, a node may remove itself from the subscribed IDs list, publish the redirection object and remove the cached data from its local memory.

Figure 7:
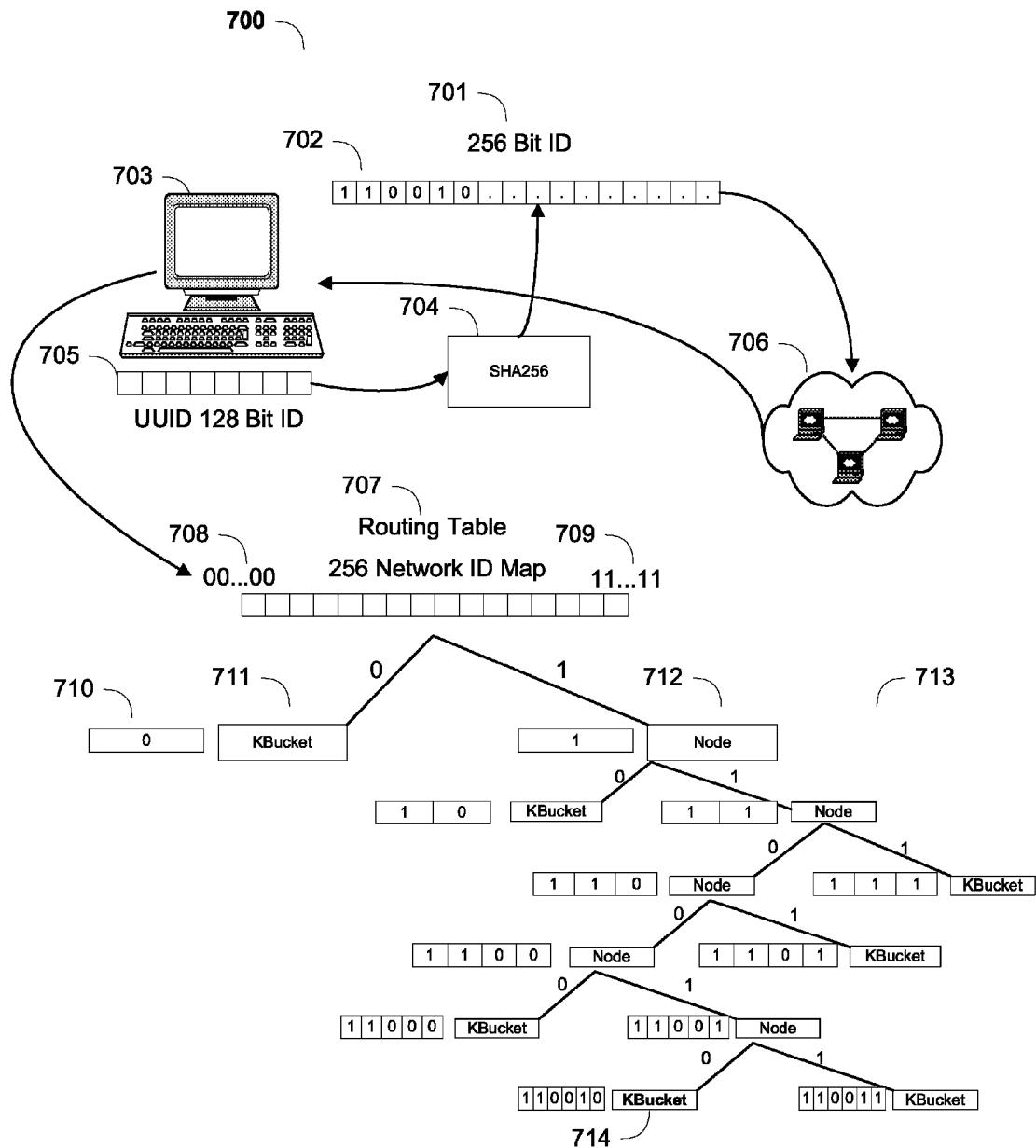
FIG. 7 is a block diagram illustrating a mechanism to organize a peer-to-peer database namespace and shows an example of how to achieve randomness within nodes.

FIG. 7 is a block diagram 700 of the routing information used to find data on a peer-to-peer database 706. The diagram also includes a method for adding a node 703 to the peer-to-peer database 706 using a UUID 705 as the seed for a deterministic algorithm 704 (sha256 for example) to construct a network ID 702 of a fixed length 701, such as described above with regard to FIG. 1. This seed may reduce or eliminate a need to use random data or a coordinating server to accomplish an even distribution of nodes on the network namespace.

In the example of FIG. 7, this network ID address space of fixed length is shared by the nodes and the data to make the accessing of nodes and data possible. To find data, a node may determine the network ID of the data needed by either traversing from a foreign key or from a query using the network id calculated from the data needed itself, for example sha256 (data) and would look for a node that has stored that data. To find nodes closest to the network id each node builds a routing table 707 of the nodes that it knows about. This routing table spans all the possible network address within the name space between 00 . . . 00 708 and 11 . . . 11 709. The routing table may be biased towards the nodes actual network ID 714 and may contain at the "n" nodes closest to it. The routing table contains both kBuckets 711 and Nodes 712 which build a tree 713 of the nodes that this node knows how to contact. Each bit 710 or groups of bits of the network namespace may be used to build the tree structure 713 with kBuckets 711 being the leaves and Nodes 812 being the branches.

FIG. 8 is a block diagram 800 and a block diagram 816 which shows an example definition of a modifiable schema definition for a peer-to-peer database 814. The Meta Data 801 consists of a Schema 802 which is an instance 805 that includes a name and a list of class schema definitions 803. Each class definition can include a history of class version 804 which might be coordinated using a redirection object 806. The class versions are arranged in linked list 807,808, 809,810 with an upgrade and downgrade method on each class. These methods are used to allow each peer node 811, 812 to modify the data that it holds if the current definition 810 is different from the version 813 that is currently cached on the system local data store 815. The system may also require that an older version of a class be used. In this case the data retrieved would be downgraded until the matching version is reached so that the current system could use the data.

The block diagram Schema Caching, Upgrading and Downgrading 816 show the process of using this meta data 801 to manage the modifiable schema on a peer-to-peer database 814. In the example of FIG. 8, before reading an instance of a class, or multiple instances from a class, the system checks to see if it has cached the schema meta data for that class 817, if it has not it looks up the definition 818, if it does it updates that definition 819 in memory. The system then retrieves data 820 for that class and checks to see if the local store 815 meta data version number of the data is the same as the version number of the schema 821. If the version numbers are not the same the system checks to see if it is allowed to migrate 822 its data to the current schema definition (for example 810).

If the current system does not allow for upgrading because, for example, this version of the data is not supported by the running system, the system downgrades 823 the retrieved data using downgrade definition on the retrieved data meta data. It then repeats the process 821 of checking the version number and downgrading until the version number of the data matches the number of the local cached data 815.

If the system does allow for data upgrades to the current version now in memory 819 then the system may upgrade 824 all of its stored instances using the upgrade method on the currently stored meta data and updates the local meta data information to the next version and then repeats the process of checking the version number 821 until the current version number (for example 810) is reached. Once the version numbers of the schema and the local cache schema match, the system populates and returns the data to the user which matches the meta data needed 825. This metadata may allow the systems to consistently store and manipulate and process data.

Figure 9:
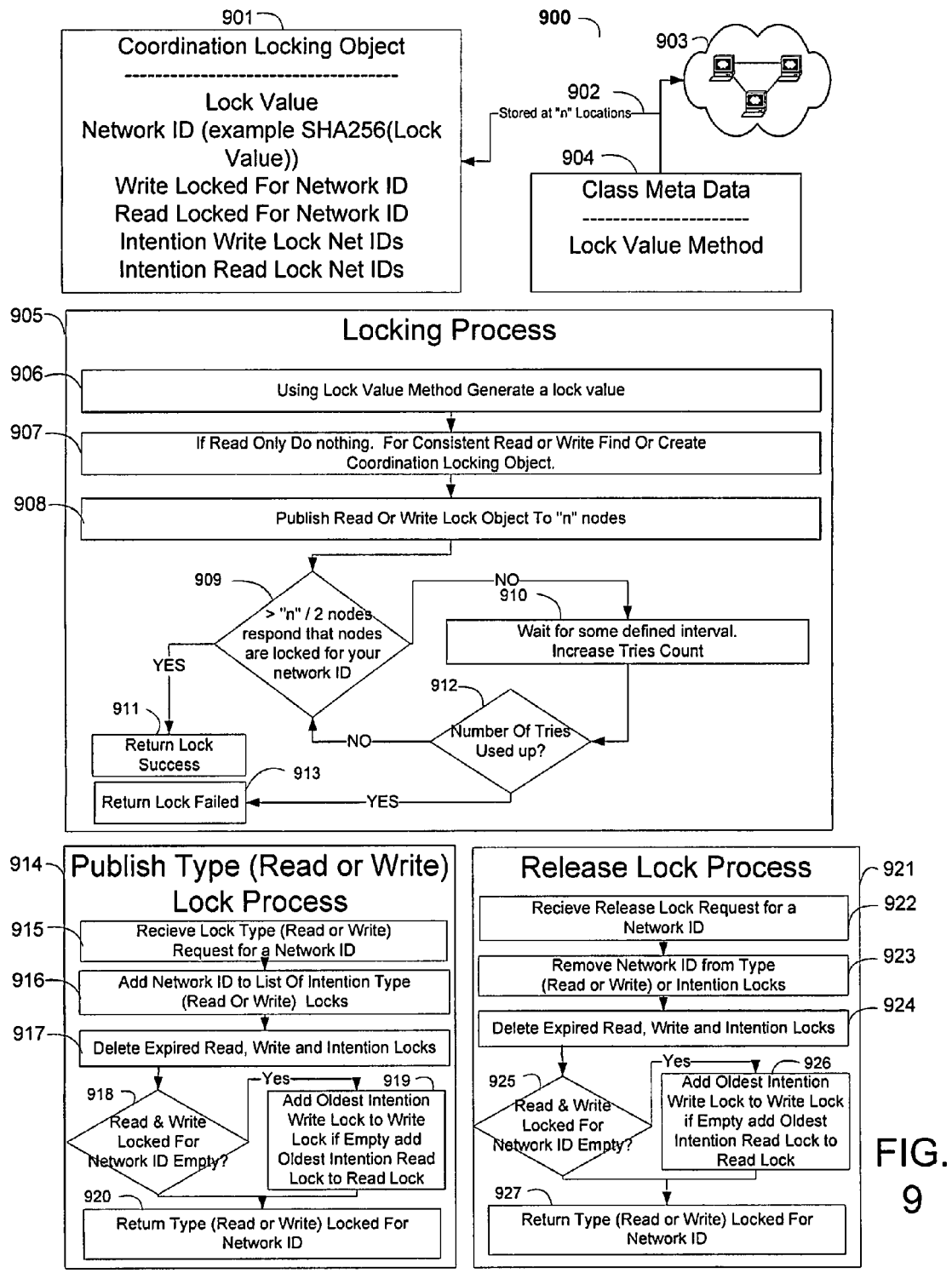
FIG. 9 is a block diagram showing a locking and coordination process used for updating data on a peer-to-peer database.

FIG. 9 is a block diagram 900 which shows a locking model for consistent read and writes on a peer-to-peer database 903. A lock value method on the class schema definition meta data 904 is used to build a coordination locking object 901. The lock value method can be used, for example, to specify the extent of locking used. For example, if the method were to return the class name (or something analogous), then the coordination locking object 901 would lock all instances of a class in the entire peer-to-peer database. If, on the other hand, the lock value method for example returned a composite of objects such as the class name and a reference like a UUID of a person stored on the database which is derived from the objects being locked, then the coordination locking object 901 would lock all instances of a class for that person on the peer-to-peer database 903.

Any unique value that can be derived from the data being locked can be used as a locking value. If the method returns multiple values from the data to be locked then the system may use one coordination locking object 901 for each unique lock value returned. The coordination locking model is data on the peer-to-peer database like every other object and is stored at "n" locations closest to the network id of the coordination locking object 902. The system considers a successful lock to be the crossing of a value of ½ of all locks. The value of ½ is chosen because two processes locking the same lock value may not successfully update more then ½ of the coordination locking objects 901 at the same time.

The locking process 905 may include evaluating the instances of the class to be locked to generate a lock value using the lock value method 906 (this process is not needed for read-only). If the request is read-only then no coordination locking object is needed and the process finishes 907. If the system needs either a consistent read lock or a write lock, it may find or create a locking coordination 907 object and publish a read or write lock request to "n" nodes 908 closest to the network ID of the coordination locking object. Each request for a read or write lock may have an expiration time to prevent deadlocks. If >"n"/2 nodes respond with a read or write lock 909, then the lock is considered successful and a success is returned 911, if not the system waits 910 increases the "tries" count, and if the number of tries are used up 912 returns a lock failed 913, otherwise it checks again 909.

In order to publish a read or write lock 914 the system that contains the coordination locking object 901 which exists at "n" nodes receives a request to lock 915. The system adds the requestor's network id to the list of intention read or intention write locks 916 (depending on type of lock requested). The node that stores the coordination locking object 901 may then delete expired read write or intention locks 917. If both the read and the write lock of the coordination locking object 901 are empty, then the system may promotes an intention write lock to write lock 919 and returns a write lock and the network ID of the system that received a write lock 920 to all systems with unexpired pending locks (write, read, intention write, intention read).

For a system to check and see if a lock has been received, the system may compare the network id of the lock with its own network ID. If the read and write locks are empty and there are no intention write locks 919, then the system may promote an intention read lock to read lock and return the read lock and network id to all requestors 920. This has the effect of not allowing changes while a system is requesting a consistent read and has received that lock (read lock) until the read lock is released. It also favors pending changes, intention write locks, and over consistent reads, promoting intention write locks first even if the request was received after read lock requests.

The deletion of an expired lock request may include notification to the requestor of the deletion. The system can include two expiration times, one for the request, which may coordinate the amount of time the requestor waits for a lock, and one for a successful lock. For example the requestor may try for 10 seconds to obtain a read lock, which, if granted, would be expired after 2 mins and 10 seconds. This allows the system to receive a read lock and to read data that can not be changed for 2 min and 10 seconds.

The expiration helps to clear locks not cleared by direction communication with a node that stores the coordination locking object 901. The release lock process 921 includes a request from the node to release 922 the lock for that network id. The system that stores the lock may remove the read write or intention locks for that network ID 923. Such a system may delete expired read, write or intention locks 924. If both the read and write locks are empty 925, the system may then promote a write lock. If there is no write lock it promotes a read lock 926 and returns the lock (read or write) with the network ID of the lock to all requestors 927.

The locks may be used to enclose either a consistent read of data, which make is so that no writes can be performed while the lock exists, or to prevent collisions in updates. The process of updating information would be to obtain a write lock, update the information, then release the write lock. The system might also allow successful upgrades of read locks to write lock if, for example, the requestor of the write lock matches the current read lock. A consistent read lock that fails means that the data returned can not be guaranteed not to change, and write lock that fails means that the requestor may not be allowed to modify data if only this locking model is used.

Figure 10:
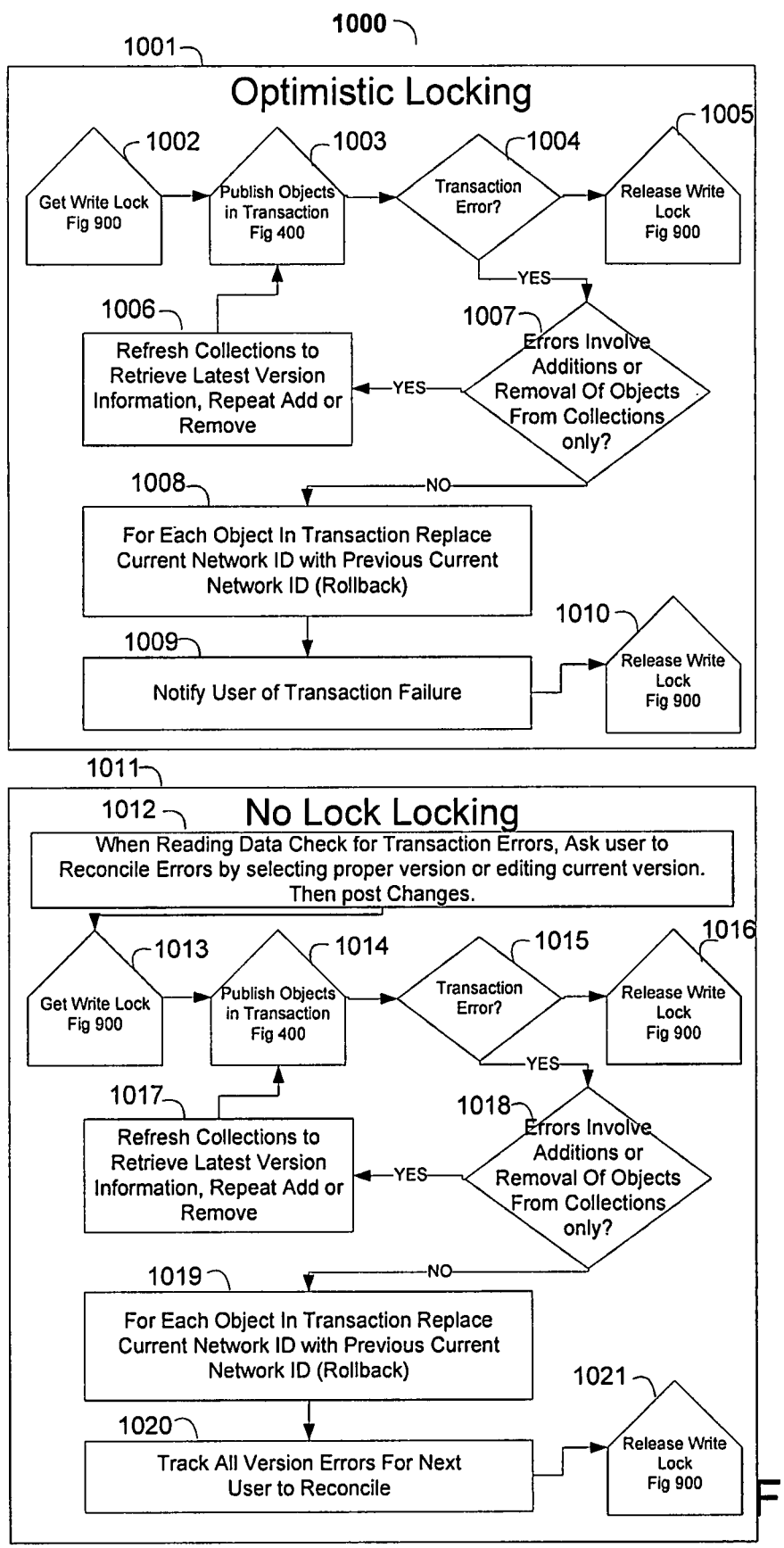
FIG. 10 is a pair of block diagrams showing an optimistic locking method, and a no lock method for updating data on a peer-to-peer database.

FIG. 10 is block diagram 1000 that contains a set of block diagrams 1001 and 1010 that define locking methods for Optimistic Locking and No Lock respectively. Optimistic locking may include a process that removes the need to do consistent read locking before changing data. A consistent read can lock multiple people out of records waiting for that read lock to be obtained.

For example, a concert stadium ticketing application may be selling tickets to individual seats. In order for that application to sell one seat, it may obtain a consistent read on all seats before deciding on what seat to sell and placing a sell request on an individual seat. Having the requirement that all seats be locked means that only one person at a time can be deciding where to sit. This would not work for an application like the ticketing application since possibly thousands of seats are being sold at the same time.

Instead the system may use an optimistic locking without a consistent read. In such examples, the user may view a snapshot of available seats, select a seat, and try to purchase i. If successful, then the next read of a user will show that seat sold.

If someone else tries to buy the same seat, they will receive an optimistic locking error and will be required to buy another seat. Although the locking is optimistic, which, for example, assumes the modification will succeed, so no read lock is necessary, the locking still may use locking to prevent multiple people from changing a record at the same time and creating a deadlock.

A side effect of this locking may include collection handling. For example, the stadium may contain a table that includes the list of available seats. Each person that buys a seat removes that seat from this table. If two systems buy different seats at the same time, the modification of that table by removing a seat is not an optimistic locking error. In that case the User A removes a seat from the table, User B then has a snapshot of the table that is not updated. A request from User B to remove a seat from the table that is not updated should not result it an error. User B would instead get a new copy of the table, remove the seat again (User B's seat), and update the table. This allows multiple people to remove (or add) items to a collection without having to roll back the transaction and redo the work.

The process of an optimistic lock 1001 commit process begins with getting a write lock on the objects to be committed (see FIG. 9—900) 1002. The objects of the commit are published (see FIG. 4—400) 1003. If there is a transaction error 1004 then the process may look to see if the error is an addition or removal from a collection 1007. Those errors may be handled, for example, by refreshing the collection and repeating the add or remove 1006. At that point the objects are published again 1003. If there is no error the update succeeds and the write lock is released (See FIG. 9—900) 1005. If there are errors that do not involve collections only 1007 then the transaction fails. The objects that were published are rolled back 1008 to remove the changes and the user is notified of the transaction failure 1009. At that point the write lock is released (See FIG. 9—900).

The process of locking with no lock is similar to optimistic locking except that error handling may be delayed. Instead of a transaction failing, all transactions may succeed but conflicts in data are collected future users of that data are required to settle the conflict. Even though the method is called no lock it may use a write lock to make sure that two people do not make changes at the same time and that updates and conflicts are captured without losing any information.

The process of no locking may begin when retrieving data to be read. Any previous transaction errors may be identified and presented to the user, either, for example, to select the proper version or to edit the information to combine the versions and create a new version 1012. At that point the system acquires a write lock 1013 (see FIG. 9—900) and then publishes the objects of the commit 1014. If there is a transaction error 1015 and the transactions involve collection errors only 1018 the collections may be refreshed and the adds and removes repeated 1017 and the transaction may be published again 1014. If there is no transaction error 1015 then the lock is released 1016 (See FIG. 9—900). If there is a transaction error that involves more than collection errors, for each object in transaction rollback the update 1019 and record all errors for the next user to reconcile 1020. At that point the write lock may be released 1021 (See FIG. 9—900).

Figure 11:
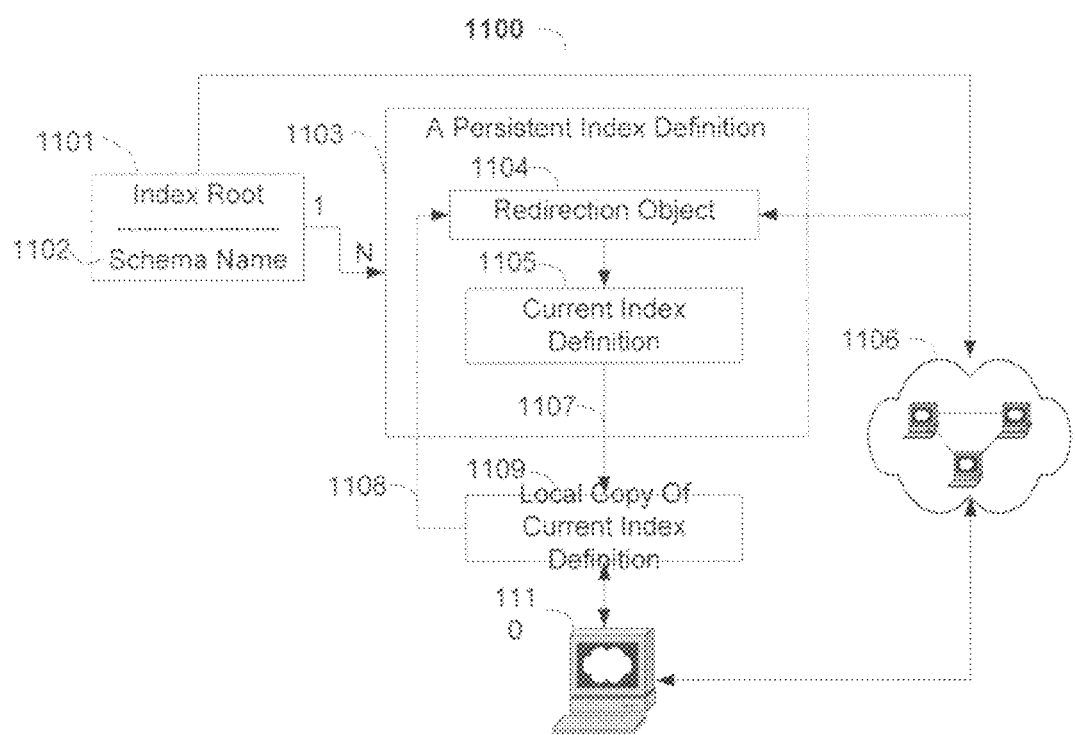
FIG. 11 is a block diagram showing a persistent modifiable index definition for a peer-to-peer database.

FIG. 11 is a block diagram 1100 that shows an updateable persistent index definition 1103. The index is referenced from the index root 1101, which may be looked up by using the schema name of the running system 1102. The schema name of peer-to-peer database in both the schema definition and the index root may be used to allow the peer-to-peer database to support multiple schemas for multiple applications. The index root contains a collection of all the index definitions. Each index definition can be made modifiable by using a redirection object 1104 to maintain the current index definition 1005 as well as the history. Each node 1110 of the peer-to-peer database 1106 can cache the index definition by reading 1107 the current definition and creating a local copy of the current index definition 1109 on the nodes local data store. To update the local copy the system may read 1108 the redirection object 1104 to retrieve the current index definition 1105.

Figure 12:
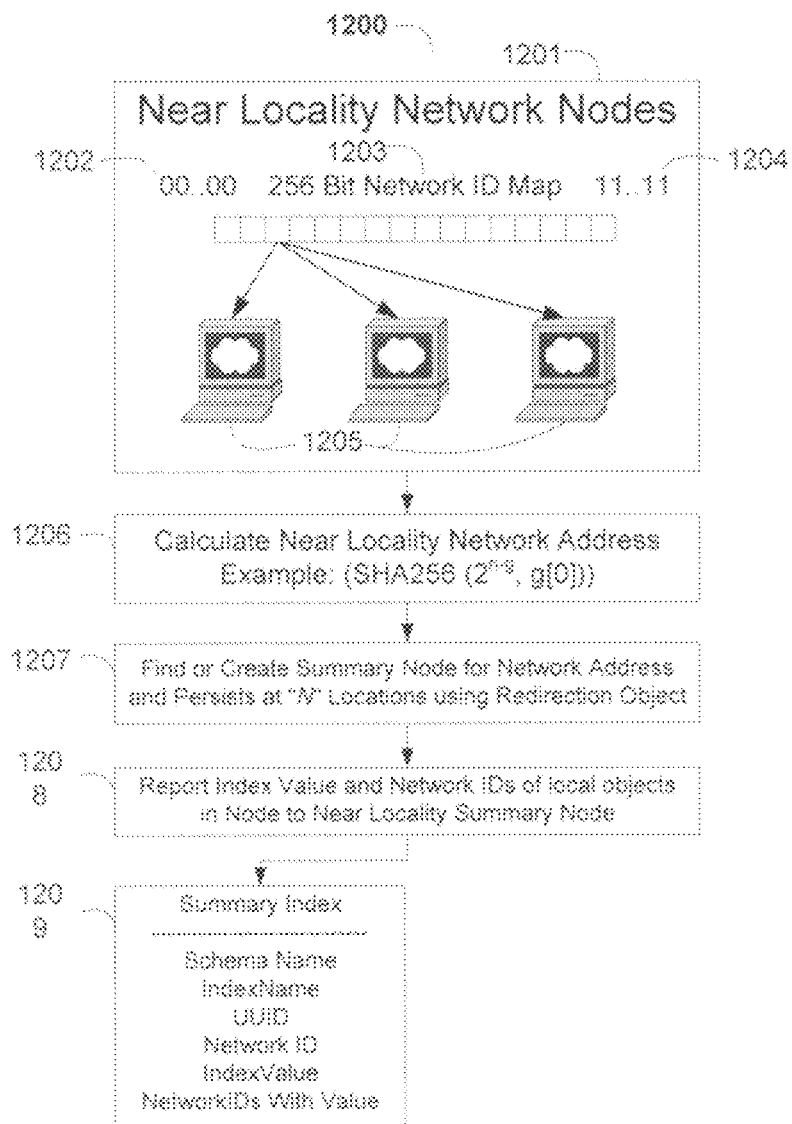
FIG. 12 is a block diagram showing a near locality summary node used to consolidate index data and remove duplicate index values.

FIG. 12 is a block diagram 1200 which defines a possible summary node as a near locality network node 1201. Locality may be include nearness to a network address in a network address space 1203; for example, a 256 bit network ID map created by using a deterministic hashing algorithm such as sha256 (data). The address space spans all network addresses from 00 . . . 00 [256 bits all zeros] 1202 to 11 . . . 11 [256 bits all ones] 1204. Near locality may include being close to a network address space 1205.

In order to eliminate duplicate entries and/or to help summarize index values, summary nodes may be used. Since all values are stored at "n" nodes around an index value, summarizing every node may essentially duplicate values. These duplications may be removed, since each value contains a unique UUID and network ID, by reporting all index values to an assigned network address. The address for reporting index values (besides holding index values locally) can be defined as a near locality network address. An example of a near locality address is the first "n" bits of the reporting nodes network address with all subsequent bits replaced with zeros 1206. For example, a summary node of length g=2 using the formula of possible values [1,2] of length $2^{n-g}$, g[0] means take the network address of size 254 and add two zeros at the end. This means that addresses that share the first 254 bits of a network address may report the index values at the same near locality address. But this address is only a seed for a new network address by calculating the network address using this seed and performing a deterministic algorithm such as SHA256 (seed) and then finding or creating a summary node for that new network address and persisting that summary node at "n" locations 1207.

The values of the index may be reported along with the network address of the object that is stored on the node that is reporting 1208. This allows the summary node to eliminate duplicates that are stored around a network address, and this elimination may become more efficient as the generalization variable exponent g becomes greater then the number variable "n" which define(s) the number of nodes used to persist values. These values are reported to a summary index 1209 which could contain the schema name, the indexName, the summary index UUID, its network ID, the index value, the network IDs of the instances that were used to report the value to this summary node 1209. Since there may be multiple copies of each value having the network address of the instance that was used to report the value eliminates duplicates, and allows the summary node to find each value by looking up a single instance around the network address.

Figure 13:
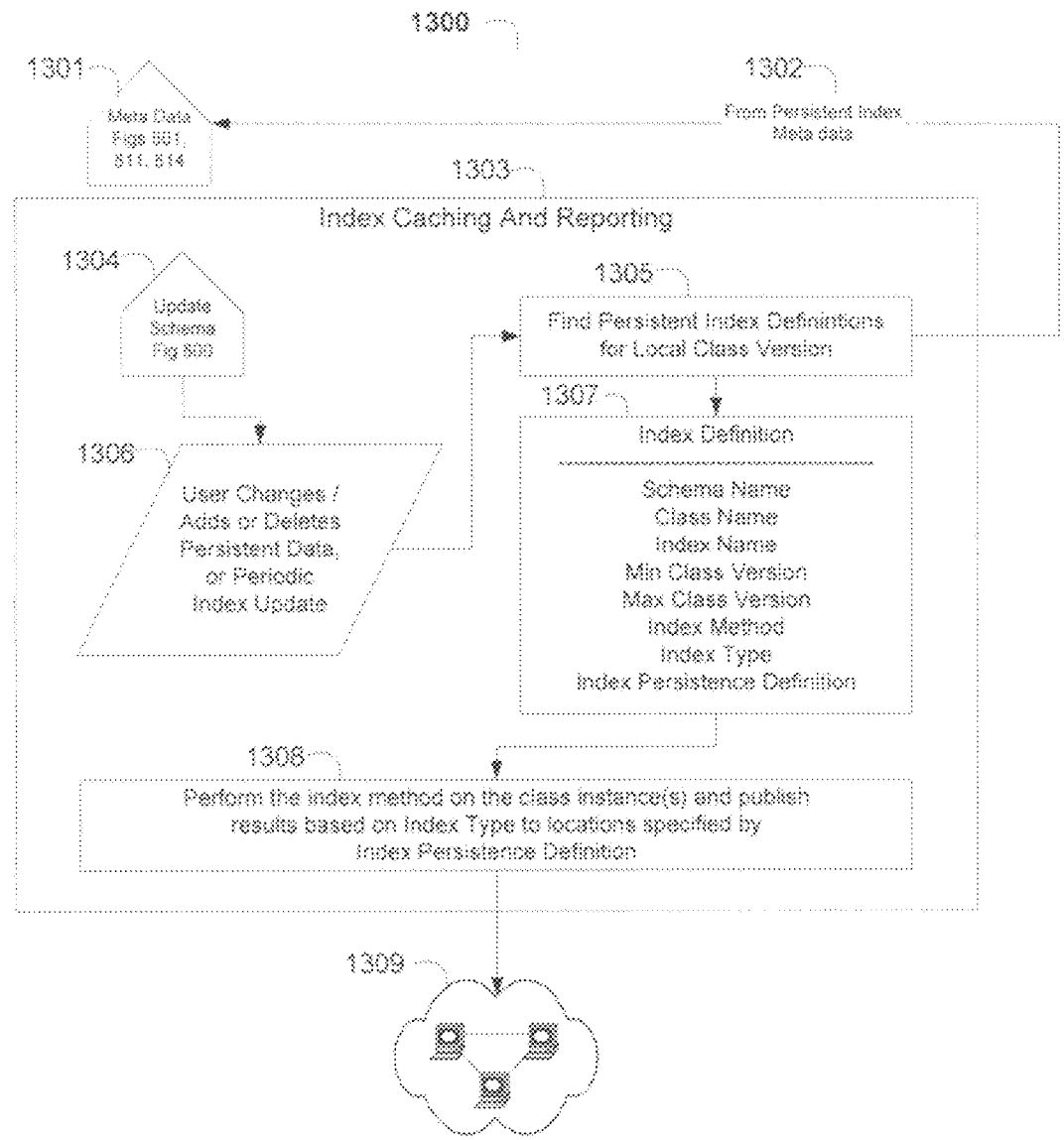
FIG. 13 is a block diagram of index caching and reporting on a peer-to-peer database.

FIG. 13 is a block diagram 1300 illustrating a method for Index Caching and reporting 1303 on and from a node of a peer-to-peer database 1309. The node caches the index definition by reading the Meta data 1301 (See FIG. 8 801, 811, 814) from the peer-to-peer database persistent index definition Meta data 1302. Before reading data the system periodically updates the Schema of the peer-to-peer table definition 1304 (see, e.g., FIG. 8—800).

The system then reports the index value when a user changes, adds or deletes a value that is persistent 1036 on the peer-to-peer database 1309, or during a periodic update of the indexes. The node first finds persistent index definitions 1305 and then updates that definition locally. The index definitions 1307 may contain, for example, the schema name, the class name, the index name, the minimum class version, the maximum class version, the index method used to obtain the index value, the index type, and a pointer to the index persistence definition.

The min and max index class version may be used to report the index values and/or may be used to determine what index values are used for what class versions. If no min class version is present then an index definition is valid for all class versions, if a min class version is present then the system does not report values for this index definition if the class version used by the system is less then the min class version. If no max class version is present then an index definition is valid for all subsequent class versions, if a max class version is present then the system does not report values for this index definition if the class version used by the system is greater then the max class version. In order to make an index work for only one class version, the min and max may be set to the same version number.

The persistence definition allows the index to specify where index values may be reported. In many cases the index will report to multiple locations which might include but are not limited too locally, at summary nodes, to index trees, or linked lists, or at other specified locations. The type of index allows for further definition of where to report values. Types might include but are not limited to: time to live (e.g., temporary indexes), "report if" definitions (e.g., data elements only have a reported value within an index if a certain condition exists), "execute at" definitions (e.g., report only if your locations is asked to report, then if information is found spread to more nodes, this is a technique that might be used in genetic algorithms or pattern matching algorithms), or other indexing types. Once the index method is run publish the results based on Index Type to locations specified by the index persistence definition 1308 to the peer-to-peer database 1309.

Figure 14:
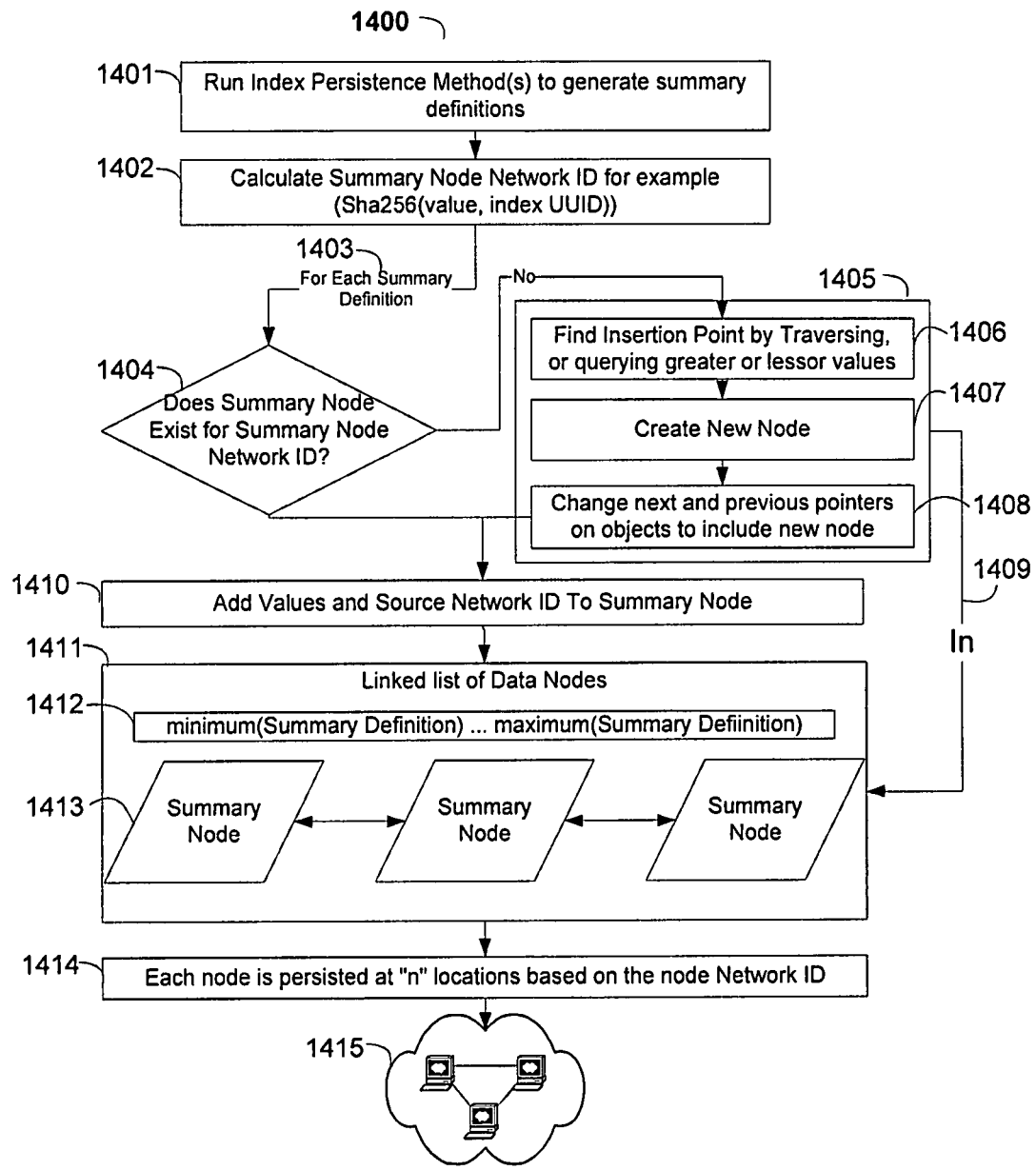
FIG. 14 is a block diagram which shows how to build and maintain a grouping linked list of index summary nodes on a peer-to-peer database.
Figure 15:
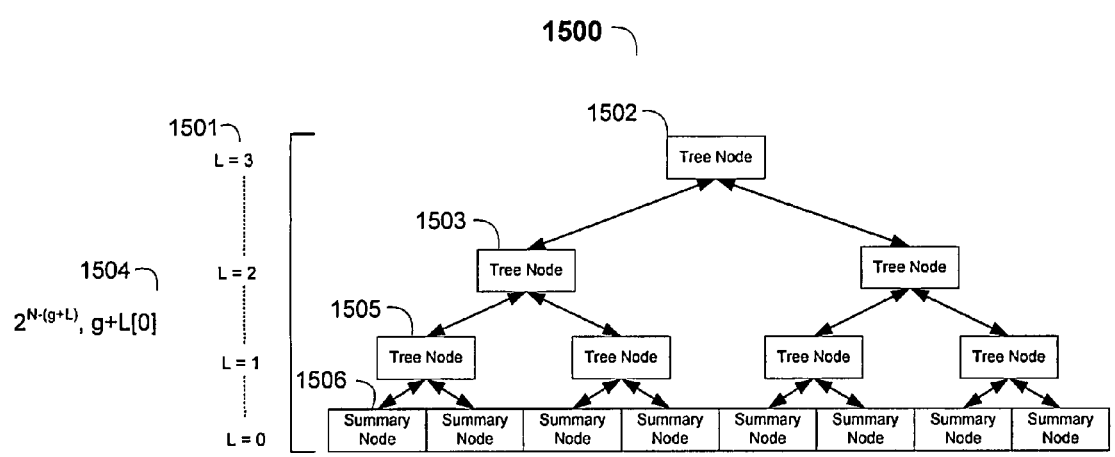
FIG. 15 is a block diagram showing an implementation of an index summary node tree grouped on a deterministic peer-to-peer namespace.

FIG. 14 is a block diagram 1400 which shows the creation of and maintenance of a linked list of index summary nodes. To report to summary nodes the node runs the index persistence methods to generate summary definitions. These definitions along with the type help to define what is reported and where. Once the values and the summary nodes definitions are known, the system calculates the position of each value summary node by some deterministic algorithm, for example, sha256 (value, index MID) 1403.

In the example of FIG. 14, in order to create a linked listing of summary nodes the system determines for each summary definition 1403 does the summary node exists for the specified network ID. 1404 if it does not the system creates one 1405. To do that the system needs to find an insertion point by either traversing from the nodes and/or querying greater or lesser values 1406. Once the insertion point is found the system creates a new node 1407 and changes 1408 the next and previous pointers on the object after the insertion point and the object before the insertion point in the linked list of data nodes 1409 in order to insert this node into the linked list 1411.

Once the node is found or created the systems adds values and source network id (the network id of the instance used as the source for the index value) to the summary node 1410. The linked list is a listing of summary nodes 1413 that starts at some minimum value and ends at some maximum value 1412 each nodes starting from the minimum value is linked to the next node by a pointer (the network id of the next node) and each next node is liked to this node by a pointer. Each summary node in the list is persisted at "n" locations around the nodes network id 1414 on the peer-to-peer database 1415. As an example the system could store summary information at the hash the value of the first N bits of the node network ID. This would create $2^n$ summary nodes. The value of N could be adjusted to size the summary node appropriately for its size depending on the number of expected index values.

FIG. 15, FIG. 16, FIG. 17 and FIG. 18 are block diagrams 1500, 1600, 1700, and 1800 which represent possible tree structures of summary nodes. 1500 represents a near locality tree node definition where a generality parameter is increased define fewer and fewer nodes per network ID 1504. By increasing the number of 0 at the end of the network address at increasing levels 1501 and using that new address as the seed for a new network ID the index definition can build a system of summary nodes 1506 and tree nodes 1505 were each successive level will define fewer and fewer nodes. The Tree node may point to leaf summary nodes 1503 or to other branch tree nodes 1503, and might be a root node 1502. Each tree node contains pointers to lower nodes and may include the definition used for the level, and its min and max values that it points too for each node that it points too. The root node can be used to traverse down tree nodes to find values of a summary node. This formation might be useful to help find nodes to create linked lists, to process information in a systematic way, to eliminate duplicate information that is reported at "n" locations, and may have other possible benefits.

Figure 16:
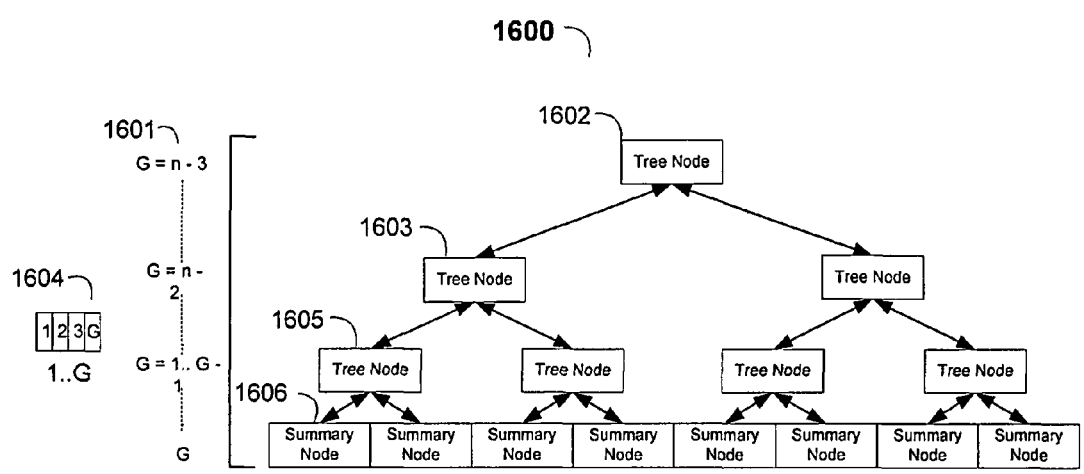
FIG. 16 is a block diagram showing an implementation of an index summary node tree on a peer-to-peer database grouped by a grouping algorithm which returns a source grouping string and is generalized on successive levels by decreasing the grouping source size.

1600 in FIG. 16 represents a possible grouping summary node tree. The grouping algorithm 1604 consists of a value of strings of fixed size. These strings are successively shorted at different grouping levels 1601 to create fewer and fewer grouping tree nodes. As an example the string could be eventually shortened to a single letter resulting in 28 highest level nodes. String grouping values could be decreased to even smaller values using for example A . . . F, F . . . Z. For example if the grouping algorithm for a string is the first 3 characters. Summary nodes could be created for {AAA, AAB, AAC . . . ZZX, ZZY ZZZ}. The next level up summary nodes would contain the network IDs for all nodes that include {AA, AB, AC . . . ZX, ZY, ZZ}, and the top level would be {A, B, C . . . X, Y, Z}. The summary nodes 1606 might be linked. Tree nodes might point to leaf summary nodes 1605 or other branch tree nodes 1603 or might be a root node 1602 used as the starting point to traverse the tree.

Figure 17:
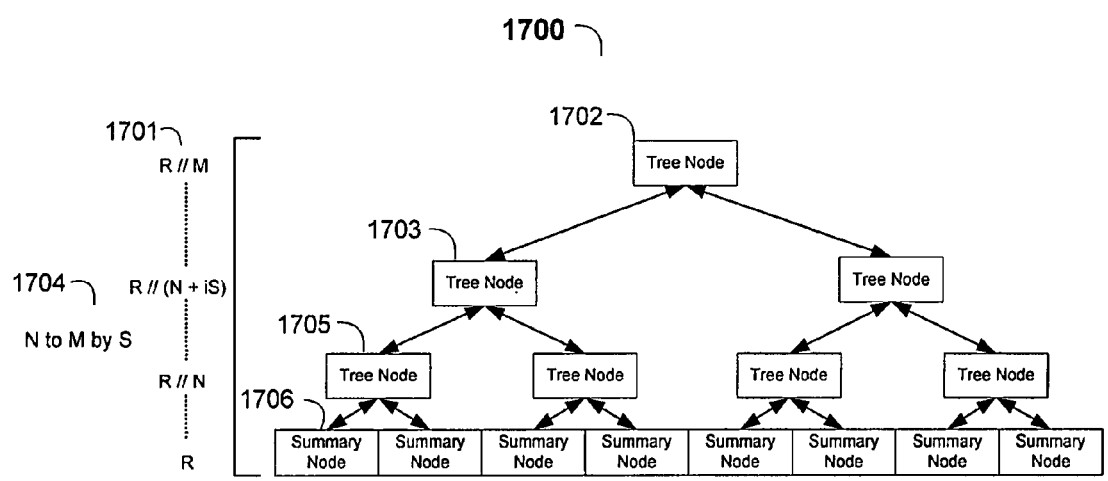
FIG. 17 is a block diagram showing an implementation of an index summary node tree on a peer-to-peer database grouped by a grouping algorithm which returns a numeric value and is generalized on successive levels by increasing integer division operations.

1700 in FIG. 17 represents a possible numeric grouping summary tree definition. The grouping algorithm includes a starting integer division Number a Maximum integer division definition and a Stepping used to created levels 1701. The formula for each level is N to M by S 1704. The summary node level 1706 reports the on the numeric value as reported by the index definition grouped by the source network id (which eliminates duplicates), the next level up 1705 is the result//the starting Number (//=integer division). This effectively divides the result into fewer nodes one for each group within the N range 1705, 1703, 1702. For example if the results are values from 0 to 9 and N=2, then the resulting set of nodes would be 0 to 4 each node containing the group that falls within the integer division calculation (result, {included values}). 0{0,1} 1{2,3}, 2{4,5}, 3{6,7}, 4{8,9}. The next level would move to the next step in the calculation adding S to N, if S=2 for example then the resulting set of nodes are values from 0 to 2, 0{0, 1, 2, 3}, 1{4, 5, 6, 7}, 2{8,9}, then each successive level i would add another S (iS) 1703. For example level 2 (i=2) would have a formula R//(N+iS) where R=1 . . . 9, N=2, i=2, S=2. or R//(2+(2*2)) or R//6. This would result in the summary node values of 0 and 1, 0{0, 1, 2, 3, 4, 5}, 1{6, 7, 8, 9}. The last level M for example 10 once reached would stop the tree node creation. This may or may not result in a single root node, and having multiple root nodes be linked may be utilized to group highest level nodes. In one example M=10 and the next level iS where i=3, S=2, N=2 gives us (2+(3*2)) or 10 of the final formula R//10. Since M is the highest value and the result of the calculation equals M the node level is created, if the result was greater then M it would not. In our example our nodes level 3 (i=3) 1702 results in a single root node 0, 0{1, 2, 3, 4, 5, 6, 7, 8, 9}.

Figure 18:
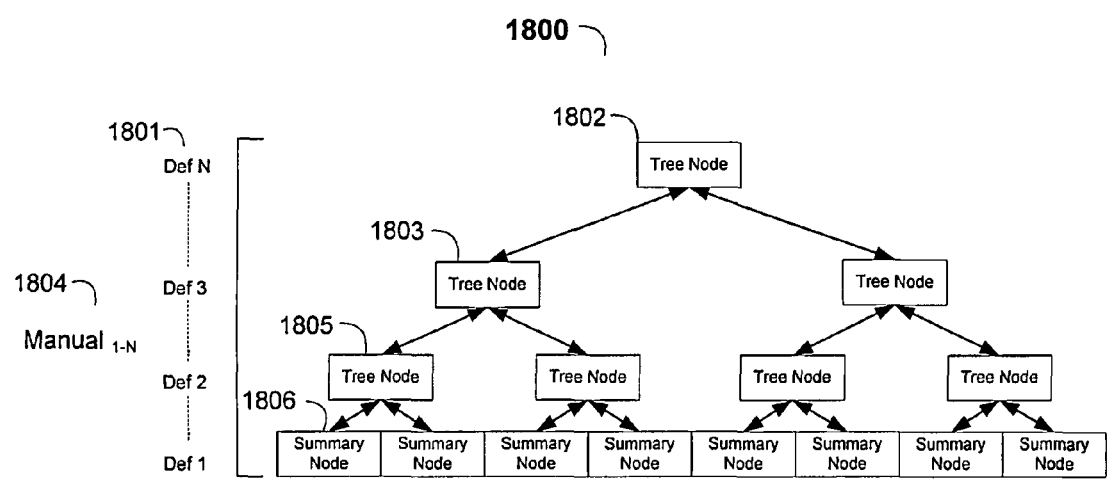
FIG. 18 is a block diagram showing an implementation of an index summary node tree on a peer-to-peer database grouped by a grouping algorithm that is manually defined and is generalized on successive levels by additional manual definitions.

1800 of FIG. 18 represents a summary node tree in which the definitions of each successive level are manually defined 1804. Each successive definition 1801 should result in fewer and fewer nodes 1806, 1805, 1803 and 1802 and may or may not result in a singular root node.

Figure 19:
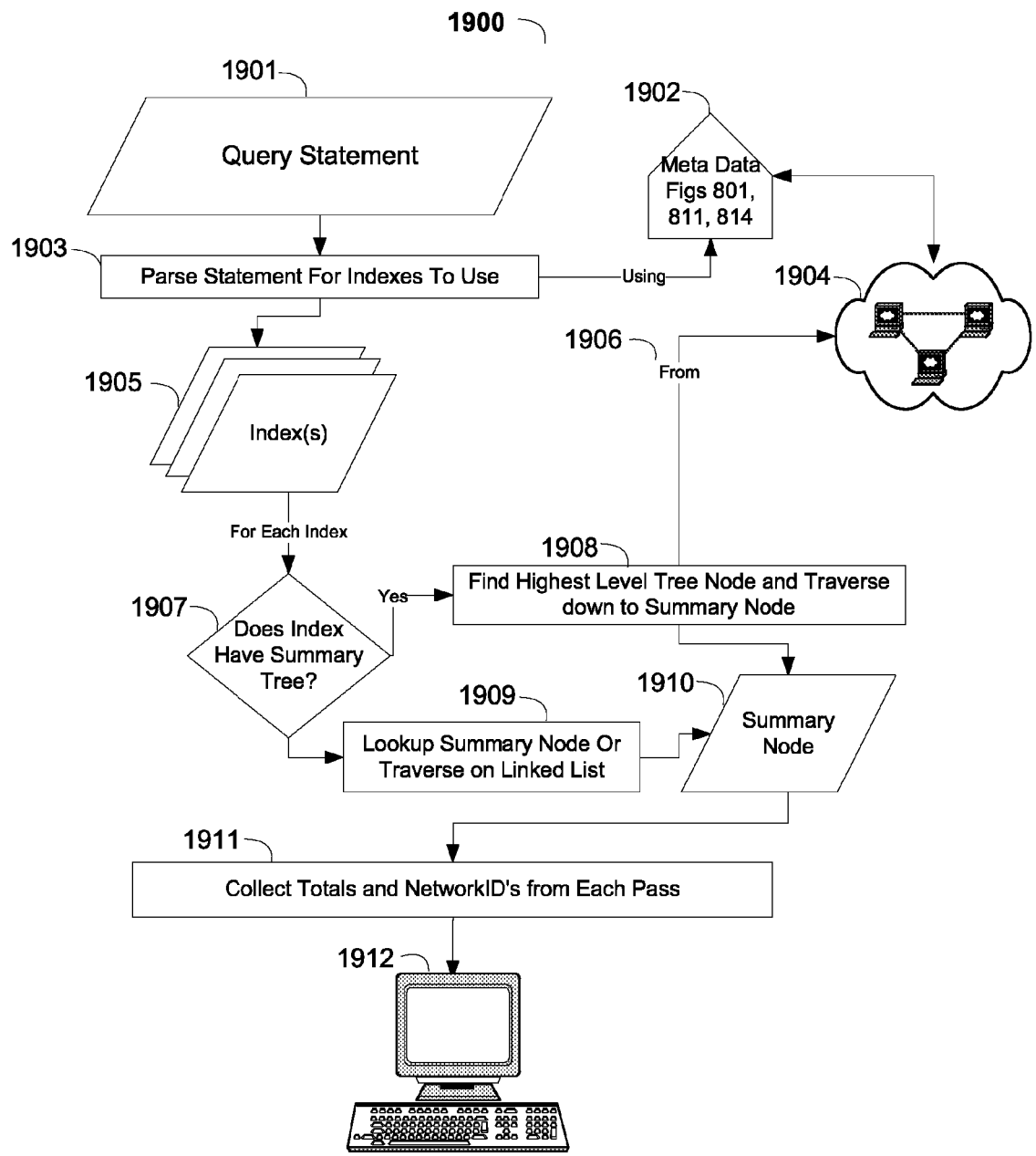
FIG. 19 is a block diagram illustrating an example of how to traverse an index tree or linked list to answer system queries on a peer-to-peer database.

FIG. 19 is a block diagram 1900 for traversing summary nodes during a query. In the example of FIG. 19, the process starts with a query statement 1901. The system parses the statement for indexes to use 1903 using the index Meta Data 1902 (see, e.g., FIG. 8—801,811,814) which is stored on the peer-to-peer database 1904. As a result of parsing the query the system returns index definitions 1905. For each index the system determines if there is a summary tree 1907, if there is the system retrieves the highest level tree node(s) from 1906 the peer-to-peer database 1904 and then traverses down 1908 the summary tree to the applicable summary nodes 1910. If the index does not define a summary tree then 1907 the system looks up the summary nodes or it traverses through the index linked list 1909 to find the applicable summary nodes 1910, then it collects all the applicable totals and values and networkID's from each pass 1911 and returns it to the requesting node 1912.

Figure 20:
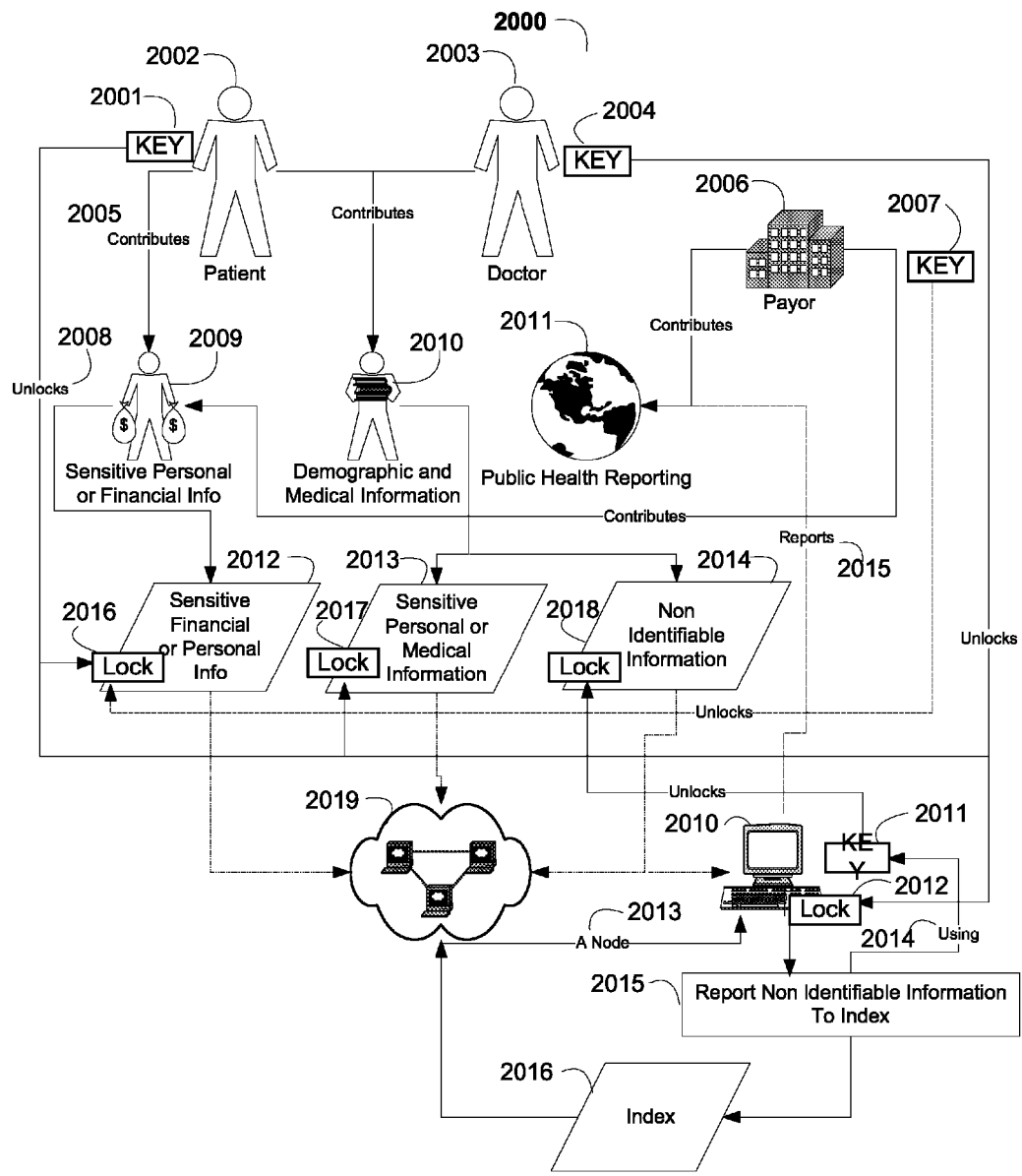
FIG. 20 is a block diagram which shows a possible implementation of a peer-to-peer medical record application.

FIG. 20 is a block diagram 2000 that shows an implementation of a database used for electronic medical records and shows both data ownership through contributions and separate encryption handling for private or sensitive data and data that is used and can contribute to indexes and reporting. In the example of FIG. 20, the top level shows the people that contribute to the data store in a medical record application, the Patient 2002 the Doctor 2003 and the Payor 2006. The information is segmented into Sensitive Personal and Financial Information 2009 and non sensitive demographic and medical information 2010. The data is stored and encrypted 2012, 2013, and 2014 on the database 2019. Non sensitive data is encrypted locally 2010 and can be used for indexing 2016 and reporting 2011.

As an example the patient and the payor could contribute to Sensitive Personal or Financial Information. In this case they both own the information that they contribute. The information provided by the patient may be used for billing the payor and so the data is shared between them. They both have a key (2001 for the patient and 2007 for the payor) to unlock 2016 the data 2012. The patient and the doctor may contribute to sensitive personal or medical information 2013. They both have a key (2001 for the patient and 2004 for the doctor) to unlock 2017 the data 2013.

The doctor and the patient may contribute to non identifiable information 2014 which is encrypted at a node 2013 that stores the information. The node 2010 has a key 2011 that it uses 2014 to unlock 2018 the data 2014 so that it can be reported to indexes 2016 on the database 2019. The node itself is locked and can only be accessed through the doctor 2004 or patient 2001 keys. The data on the nodes can be used to report 2015 information to a central source such as a public health reporting system 2011 which might also collect information from payors 2006. The index can also be used to answer queries from patients and doctors that have access to that information if they have an ownership relationship through contribution or through other general reporting queries or data rights.

Figure 21:
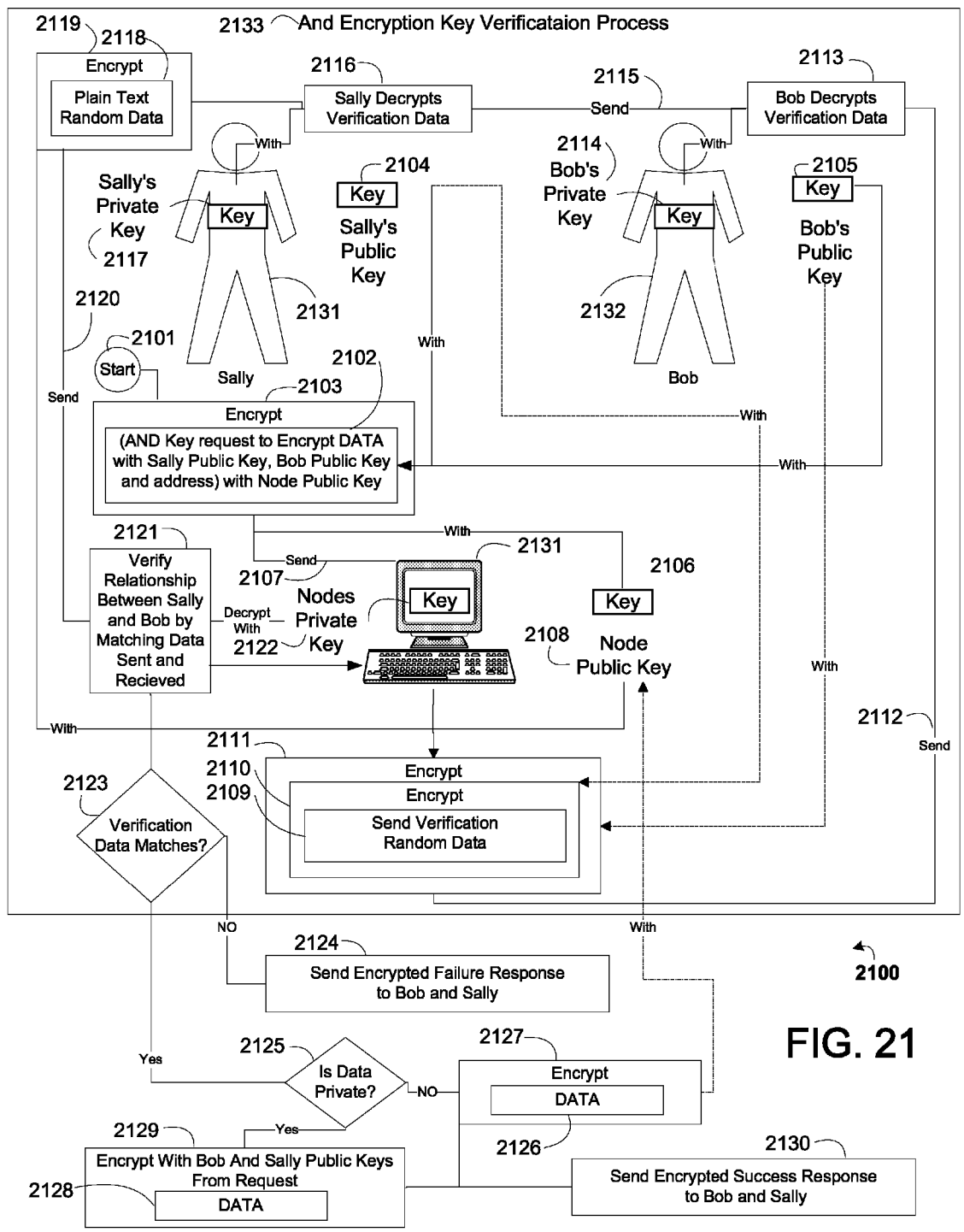
FIG. 21 is a block diagram which illustrates an "AND ENCRYPTION" verification process and a method for encrypting data using the AND ENCRYPTION.

FIG. 21 is a process diagram 2100 an "And Encryption" verification process 2133 and encryption method. An "And Encryption" creates a relationship between two resources (for example processes on a computer, computers or users or any combination) so that both of those resources are necessary to decrypt data. The process is to verify there is a relationship between parties, and then encrypt the data such that the data needs to be decrypted by both parties before either of the parties, or the parties need to again each verify their relationship before data is released.

In the example of FIG. 21, the process starts 2101 with a request. In our block diagram 2100 we use two users Sally 2131 and Bob 2132. These users are only examples of resources. Sally sends 2107 an And Key request 2102. She sends 2107 the DATA to be encrypted, her public key 2104, and bob's public key 2105 and address all encrypted 2103 with the requested 2131 nodes public key 2106.

The node 2131 then verifies the relationship 2133 by generating random data 2109 to be sent as a way to verify the relationship between Sally 2131 and Bob 2132. The node 2131 encrypts 2110 the random verification data 2109 with Sally's public key 2104, and then encrypts the result 2111 with Bob's public key 2105 and then sends 2112 the data to Bob 2132 to be decrypted 2113 with Bob's private key 2114. Bob then sends 2115 the decrypted data (which is still encrypted 2110 for Sally 2131 by the node) to Sally 2131 who decrypts the data 2116 with her private key 2117. Sally 2131 now has the plain text of the verification data 2109. Sally 2131 now encrypts 2119 the verification data 2118 using the nodes public key 2108 and sends 2120 it to the node 2131.

The node 2131 verifies the relationship between Sally and Bob by matching the data that was sent with the data that was received 2121 after the data from Sally is decrypted using the nodes private key 2122. If the And Encryption key verification process 2123 is not successful then the node sends an encrypted failure response to both Bob and Sally 2124. Failure could result, for example, from either party refusing to verify the relationship. Failure could also result from an attacker trying to gain access without having the proper public/private key to decrypt the verification data. If the verification process is successful 2133 then the data could be stored by separating private and public data 2125 and encrypting the data 2128 using both keys that were sent during the request and storing the data in that double encrypted form 2129. If the data is not private then the node 2131 could store the data 2126 encrypted 2127 using the nodes public key 2108. After either case an encrypted success response is sent to both Bob and Sally 2130.

Figure 22:
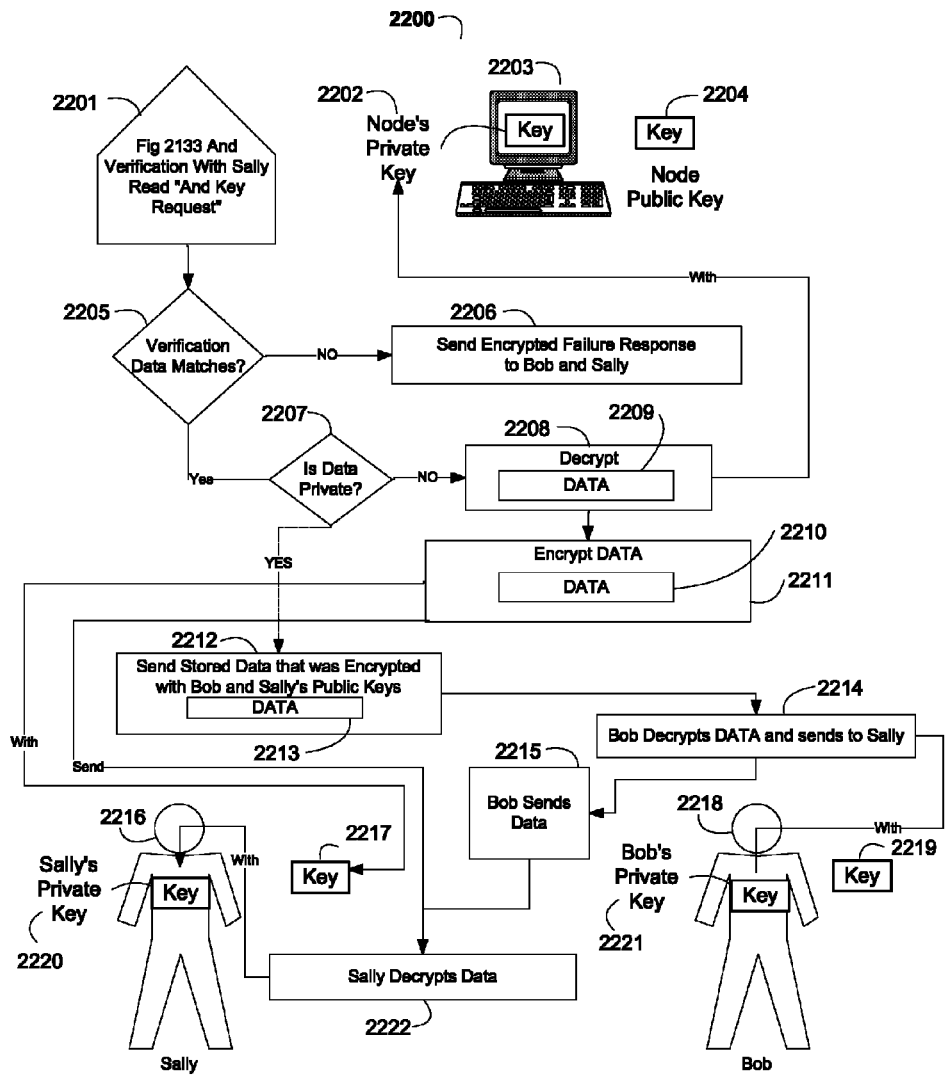
FIG. 22 is a block diagram illustrating an example of how to decrypt data that was encrypted using an "AND ENCRYPTION" method, whether or not it was encrypted as private sensitive data.

FIG. 22 is a block diagram 2200 which shows the process of retrieving and decrypting data that was encrypted using an "And Encryption key". In the example of FIG. 22, the process starts with the And Verification process 2201 (See FIG. 21—2133) initiated with a read request instead of an encrypt request. If 2205 the verification does not match then send 2206 encrypted failure response to both Bob 2218 and Sally 2216. (Bob and Sally are examples of possible resources see FIG. 21 detailed description). If the data was stored but is not considered private then the Node 2203 decrypts 2208 the data 2209 that was encrypted with the nodes public key 2204 using its private key 2202. The node then encrypts 2211 the data 2210 using Sally's public key 2217 and sends it to Sally 2216 who then decrypts the data 2222 with her private key 2220. If the data 2202 was stored in as private data then the data is encrypted 2212 using both Bob's and Sally's public keys 2219, 2217. To decrypt the data 2213 it is sent 2212 to Bob. Bob decrypts the data 2214 with his private key 2221 and sends it to Sally. Bob then sends 2219 the data to Sally (the data is already encrypted using Sally's public key 2217 when it was originally stored).

Figure 23:
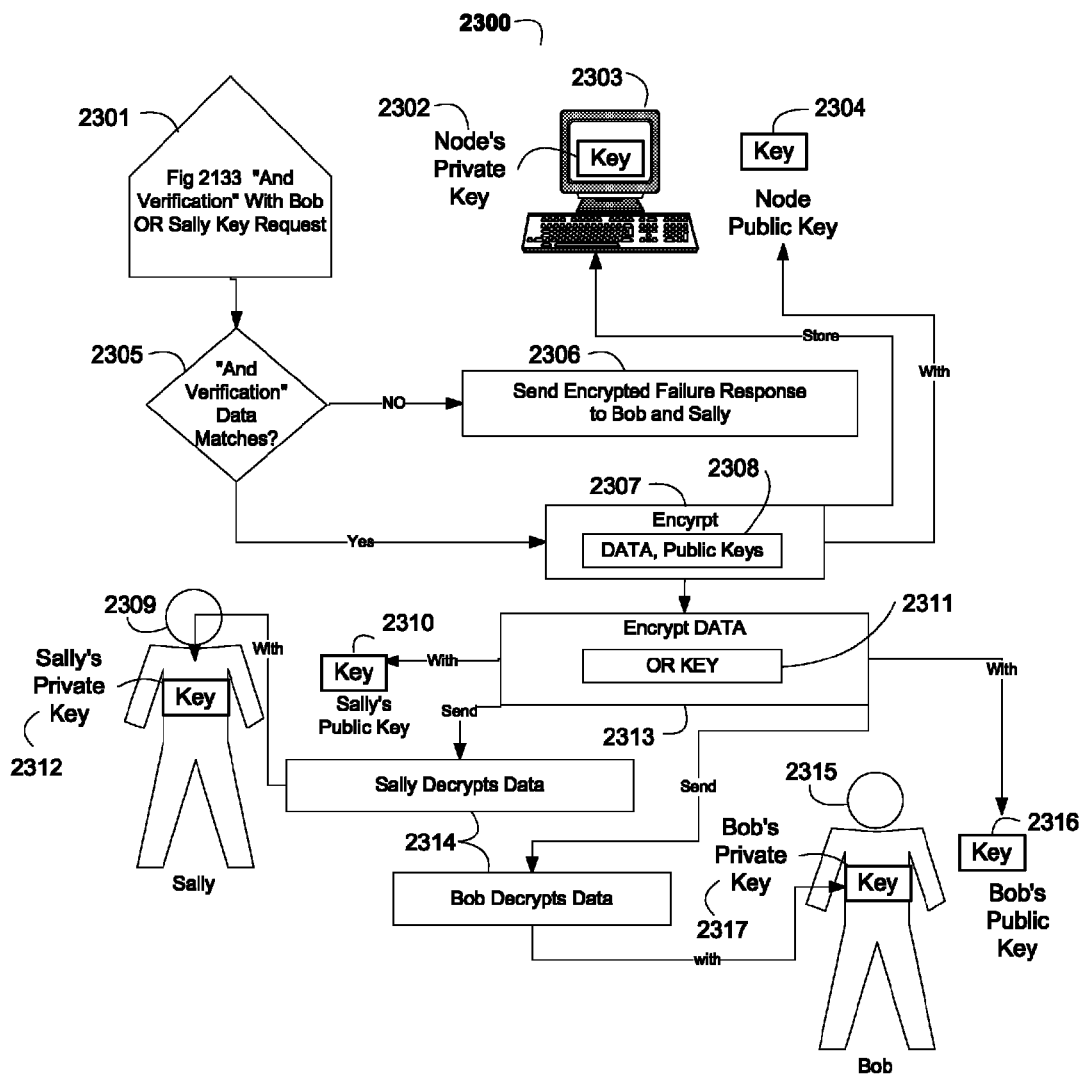
FIG. 23 is a block diagram illustrating an example of an "OR ENCRYPTION" method which allows multiple users to have access to the same encrypted data using their own key.

FIG. 23 is a block diagram 2300 showing an "Or Encryption" method. In the example of FIG. 23, the method begins with the "And Encryption Verification process" 2301 (See FIG. 2133), to establish a relationship between the parties of the "Or Request" 2301. If the "And Verification" 2305 process fails an encrypted failure response is sent to both parties 2306. If the "And Verification" 2305 matches then an "OR KEY" 2311 is generated then Encrypted 2313 for both parties Sally 2309 with public key 2310 and Bob 2315 with public key 2316 and sent. Each party then decrypts the data 2314 with their respective private keys 2312, 2317 and stores the data for future use. The data and the public keys 2308 sent with the "Or Key" are encrypted 2307 with the nodes public key 2304 and stored on the node 2303. The nodes private key 2302 is used later for decrypting.

Figure 24:
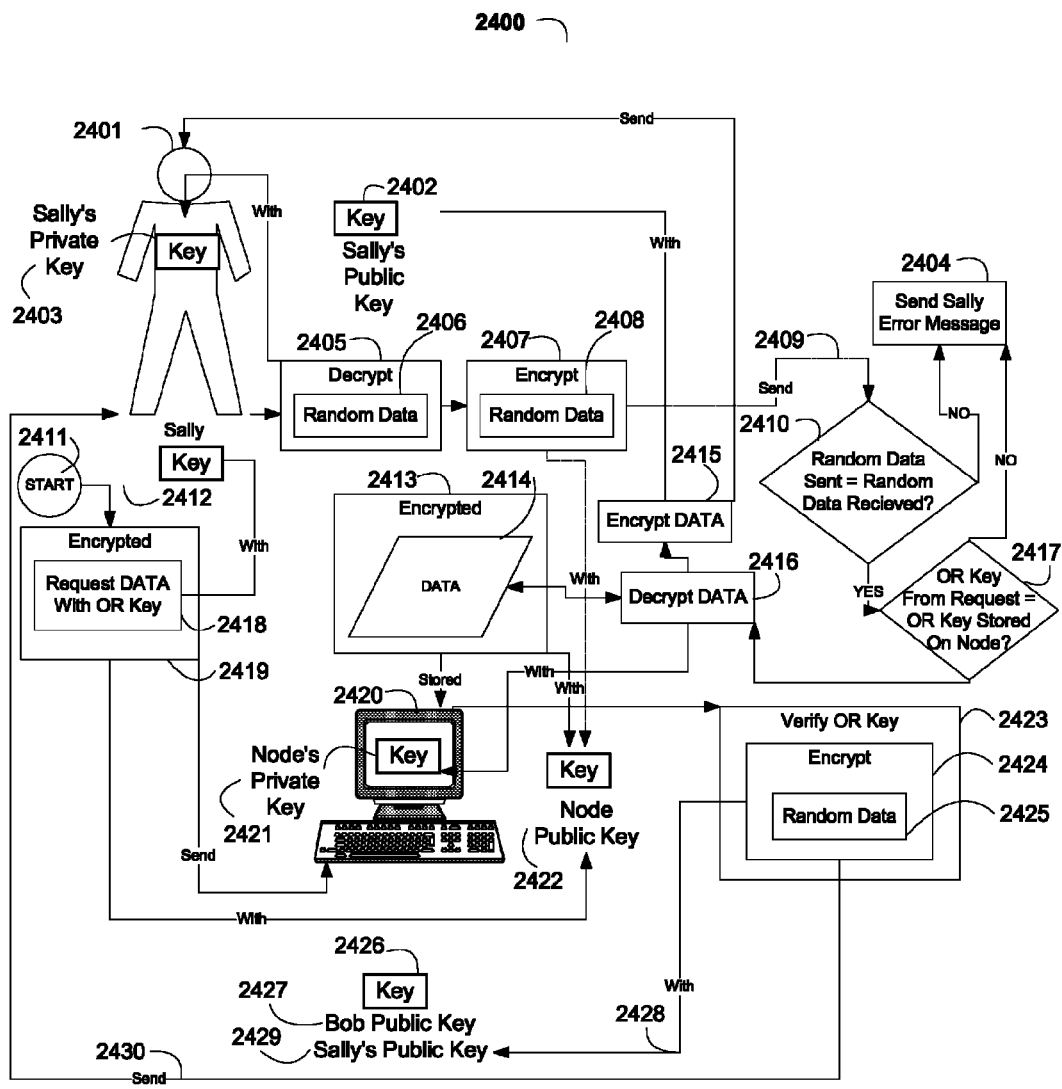
FIG. 24 is a block diagram illustrating techniques to retrieve data that was encrypted using an "OR ENCRYPTION" method.

FIG. 24 is a block diagram 2400 showing the process of requesting and decrypting data stored with an "OR Key" See FIG. 23. In the example of FIG. 24, the process starts 2411 with an encrypted 2419 request. The request is encrypted with the public key 2422 of the node 2320 that is receiving the request. The requestor sends with the request 2418 the OR KEY 2412 that it received during the OR KEY generation process see FIG. 23 to the node 2420.

The Node stores its own copy of the OR KEY 2426 which contains the public key of the parties to the OR KEY 2427, 2429 at the time the OR KEY was generated. Using the stored public key 2428 the node 2420 encrypts 2424 random data 2425 to the requestor 2430 in order to verify the OR key 2423. The requestor, in this case Sally, uses her private key 2403 to decrypt 2405 the random data 2406. This process would only be possible if Sally still has a private key that matches the public key that was used when the OR KEY was created. Sally then encrypts 2407 the now plain text random data 2408 using the nodes public key 2422 and send that data back to the node 2409. If 2410 the random data matches then the node verifies the OR Key form the request matches the OR Key stored on the node 2417.

If either the random data used to verify the OR KEY 2410, or the OR Key does not match 2417 then an error message is sent to Sally 2404. Once the verification of the person 2410 and the OR Key 2417 is successful the node decrypts the data 2416 using the nodes 2420 private key 2421. The originally stored data 2414 was encrypted 2413 using the nodes Public key 2422. The node 2420 then encrypts the data 2415 with the requestors public key 2402 and sends it to the requestor 2401. The process results in encrypted data that can be retrieved from either party of an "OR Key" as long as either party still has a private key that can decrypt the verification random data 2423.

Figure 25:
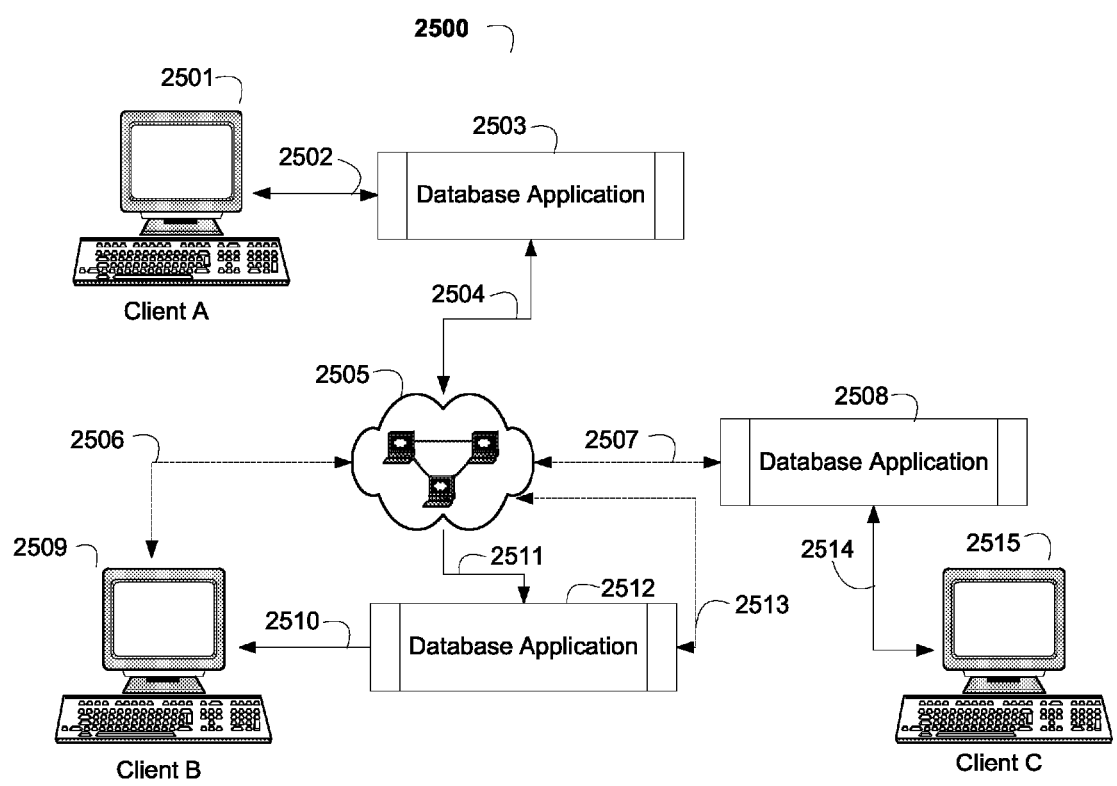
FIG. 25 is a block diagram showing a system using a peer-to-peer database, including database applications on clients that connect to the peer-to-peer database, and a client that uses the peer-to-peer database to install the application.

FIG. 25 is a block diagram 2500 that shows how a peer-to-peer database might be used to deliver data and/or applications to clients. In the example of FIG. 25, client A 2501 is an example of a client that already has 2502 an existing database application 2503. That application can be used to retrieve, store and query information 2504 stored on a peer-to-peer database 2505, in this example the application uses the peer-to-peer database directly. Client B 2509 requests a application from the peer-to-peer database 2506. The peer-to-peer database sends the application to the client 2511, which is stored on the client 2510. The application then establishes a connection for data 2513 with the peer-to-peer database. Client C 2515 has a connection 2514 to a database application 2508. That application in addition to a direct connection with the client and having its own data can request information from the peer-to-peer database and read and write its own data 2507 using an application interface. These are example configurations for using the peer-to-peer database for serving applications.

Figure 26:
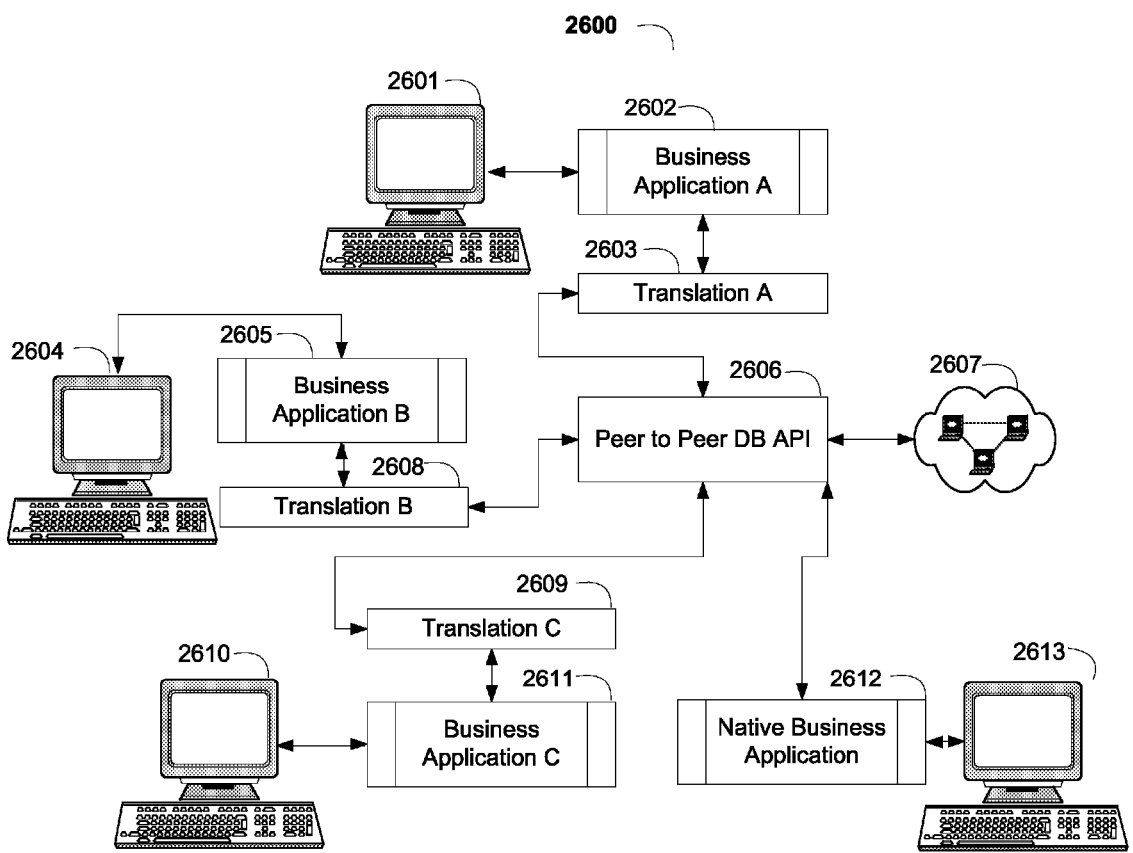
FIG. 26 is a block diagram that shows a peer-to-peer database that is used as a translation mechanism between different business applications.

FIG. 26 is a block diagram 2600 showing how a peer-to-peer database 2607 can be used as a translation mechanism between business applications that have their own implementations of data schemas. In the example of FIG. 26, each node 2601, 2604, and 2610 communicates to the business applications 2602, 2605, and 2611 through a translation layer 2603, 2608, and 2609 to a peer-to-peer database API 2606. This has the benefit of allowing each node to communicate with each other since all data is stored and retrieved through the same API 2606 attached to the peer-to-peer database 2607. This removes the need to develop n to n translations to communicate. Nodes 2613 that use native business applications 2612 developed directly to the peer-to-peer database API, 2606 do not need the translation layer.

Figure 27:
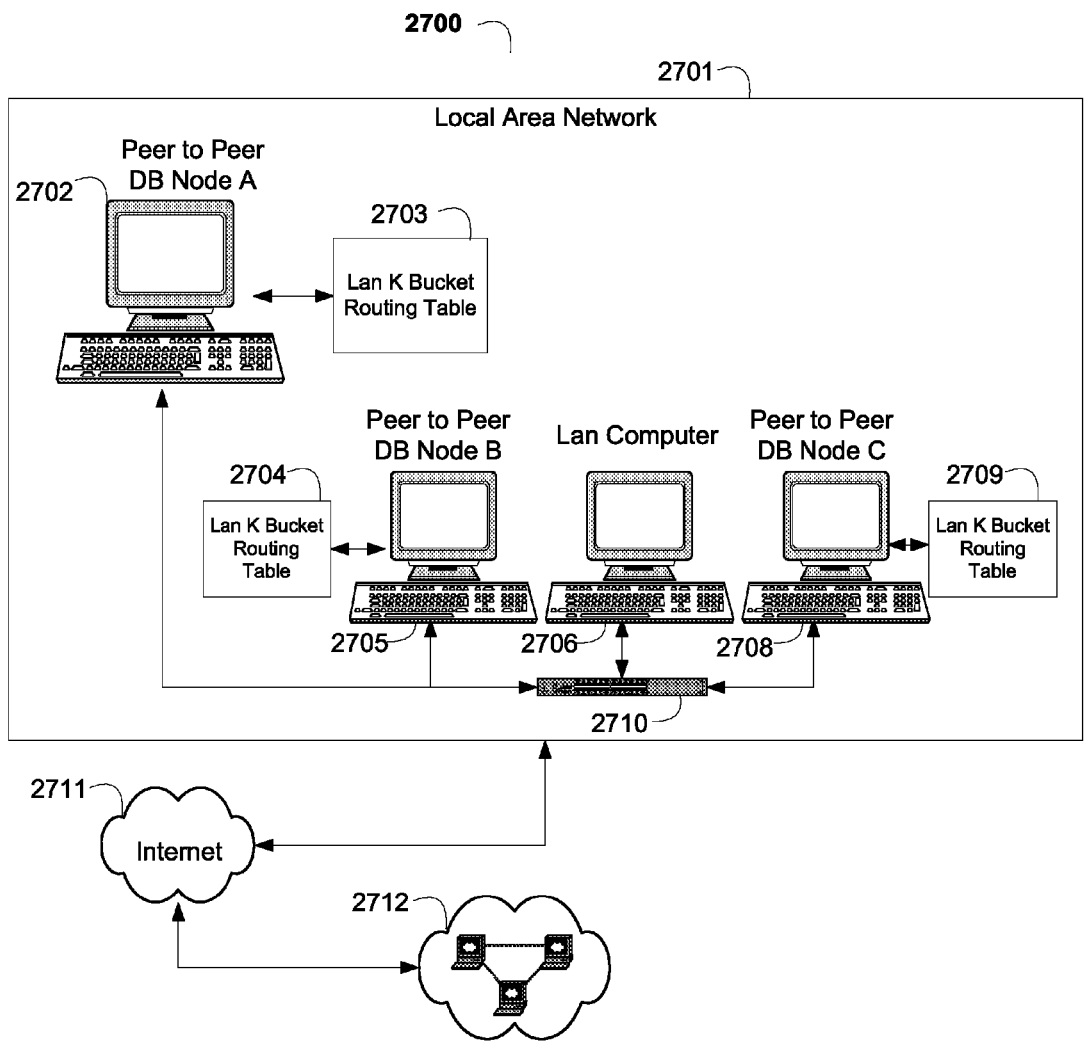
FIG. 27 is a block diagram showing the retrieval of information within a local area network that allows a node that did not publish information to benefit from node caching of information (publish and subscribe) that may result from a node that did publish information from within a local area network.

FIG. 27 is a block diagram 2700 which shows network caching for a peer-to-peer database. In the example of FIG. 27, a peer-to-peer node 2702 on a local area network 2701 might track other nodes on the same network 2703, 2704 and 2709. Since all nodes on a network are connected 2710 and are able to communicate at much higher speeds then through the internet 2711, requests for data on a local area network 2701 to other peer-to-peer nodes 2705 and 2708 would realize higher performance then calls through the internet 2711 to the peer-to-peer database 2712.

The storage of local peer-to-peer db routing information allows the system to effect only those computers on the LAN that are part of the peer-to-peer database 2702, 2705, 2708 and not 2706. The principal benefit of this type of lookup is that a node can search its local memory first, and then treating its local area network 2701 as and extension of local memory it can search for data. If the node does not find the data within its local memory or on the LAN, it searches through the internet (or other networking device) 2711 on the peer-to-peer database 2712. An example of how this might be used involves the publish and subscribe aspects of a peer-to-peer database (see FIG. 6).

In this instance a node that authors data might be subscribed to updates concerning related data. For example if a doctor updates a patient's information, other information for that patient might be published to the node that doctor used to update the patient information because of a subscription generated during the update. In this case if the patient data changes somewhere else, then that patients data is updated on the computer that was used. If the patient now goes to another location, such as, for example, check out office or during a new appointment in another office that is still on the LAN it would be useful for the new computer to be able to retrieve that data from the LAN instead of having to find the data on the peer-to-peer database.

FIG. 28 is an example of a user interface 2800 detailing possible configurations showing multiple choice and manual text entry of symptoms organized around a pictographic patient representation showing current and past complaints graphically and the resulting suggestions of the system ranked by multiple indicators for example popularity, cost, diagnostic value, positive predictive value and or risk or other possible ranking values which allows for quick ordering and organizing of for example tests, results, treatments, and history. The interface allows a provider to quickly assess pictographically the current and historical conditions of a patient. Historical and maintained chronic conditions show up pictographically as dimmed whereas current and non managed or active chronic complaints are highlighted. Data of how others users use the systems is aggregated and displayed filtered by current conditions. Other factors such as patient insurance coverage can also be used as sources of data to help with the ordering of data. Probable diagnosis based on similar complaints, diagnostic tests based on probable diagnosis or other factors, and treatments could all be ordered and offered to providers as alternatives. In this example a summary of the patient vital stats is shown on top 2801 this summary could contain different information that might be relevant to a provider. A pictographic representation of a patient 2802 is shown. This interactive user interface element might be used to indicate symptoms, to select previous symptoms or concerns, to indicate vital statistics for example clicking on the arm to enter in blood pressure or order a blood test, or clicking on the head to enter in current temperature. Previous or maintained conditions 2806 such as for example maintained chronic hypertension shows up as dimmed. Current complaints 2807 can be highlighted. Symptoms entered 2803 can also be displayed textually and other choice field or selection tools can be used to help document a symptom. For example more information about a pain scale or, a method to point to the graphic representation of the patient to indicate pain location. Suggestions about questions 2804 that might be asked based on other users questions could be displayed. Likely diagnosis based on similar patients with similar complaints and test results and vital statistics for example age and race and sex could be displayed along with suggested tests 2808 ordered by some ordering criteria 2809. Examples of ordering criteria might include popularity, cost diagnostic value, positive result predictive value, potential risk or other criteria. Notes could also be added to indicate insurance coverage or prior authorization or other misc. notes. Colors could be used to highlight problems or outliers 2810, for example the color red could be used to indicate a test that is not covered by insurance. The color yellow could be used for caution. The interactive pictographic representation might be movable or changeable through control buttons 2812.

As described above with respect to one or more of FIGS. 1-28, various systems, methods, devices, and computer program products may be used with respect to implementing a peer-to-peer database.

For example, a system may include a database platform implemented on a peer-to-peer network, and a redirection object operable to maintain connections to data while allowing data to be modified, added or removed from a peer-to-peer network.

In this context, a database may be implemented by assigning each computer on a peer-to-peer network a network address assigned within a set name space size, and assigning a network ID of similar size to data by using a deterministic algorithm such as a hashing algorithm, for example SHA256, and using that address, storing the data a "n" nodes closest to that name space. Relationships may be maintained by using the data network ID as a foreign key.

The redirection object may represent a link from one object to another. An object (or row of data) that points to another object may instead point to a redirection object. The redirection object will track where the current information is stored. It might also be used to keep track of historical versions of data. It might also be used to coordinate changes and manage conflicts from multiple changes by different users.

The redirection object may be stored redundantly at "n" nodes on a peer-to-peer database. The coordination of updates is simplified by allowing a smaller object to stand in as a proxy for already persisted data and allowing that object to manage, updates, deletions and additions.

According to another general aspect, a local data store management system of a peer-to-peer database node may be used for managing data at a peer node, which may be accomplished by using local DBMS technologies to coordinate, query, index and persist information.

According to another general aspect, a system for achieving an even distribution of addresses assigned to nodes of a peer-to-peer network or database may be accomplished by using a UUID (universal unique identifier) for seeding a hashing algorithm for example SHA256.

According to another general aspect, a composite storage system for a peer-to-peer database to store data may be accomplished by grouping and composing a collection of data elements and then storing those elements together in a composite object at a single network address. That data could then be broken up and managed locally as separate data elements.

According to another general aspect, a system for extending the storage locations of a peer-to-peer database may be implemented by allowing additional network addresses outside of the computed address of the data (e.g., using a deterministic algorithm on the data itself, for example using a hashing algorithm like sha256) to be used as target locations for storage. This publish and subscribe mechanism of a peer-to-peer database allows data to be updated at nodes where retrieval is most likely, such as at previous update, or author nodes and can help to speed up data retrieval.

According to another general aspect, a coordination process used to commit changes to a peer-to-peer network may include a schema management system for a peer-to-peer database, and a persistence framework for a peer-to-peer database.

In this context, the schema management system may include persistent modifiable metadata used to define storage objects, tables, data types, and indexes for a peer-to-peer database. The persistent class definitions also may allow for the system to maintain a full history of previous versions and to define upgrade and down grade methods to transform data from one version of a definition to another. Further, a persistence mechanism may allows for data additions, modifications and deletion which allows for the definition of a locking model for each class, or a composite structure of multiple classes.

Further, a persistence framework may allow for data modification and deletion by using a coordination object (which may be implemented by using a redirection object) which represents a number of objects. Using a shared data element to coordinate locking the system could look for and create locks based on that shared element which might contain one or more of the following; a single object, an object reference, or a composite of objects, or a reference.

This commit coordination object could include, for example, links to the current information, links to previous versions of information, a version number and network id for that version number, a last update date and time, network ID and user ID that last changed the information which could be used to coordinate the committing of persisted changes, and to handle conflicts using locking models.

Further, a persistence framework may be implemented that allows for the definition of a locking model such as optimistic locking, and that may be implemented by assigning a version number to each object or record. As the data is being written to the peer-to-peer database, each previous version may be checked as described above. When a version number for data is the same but the data is different the optimistic locking model could report back to the last update user that there is a conflict and fail the transaction rolling back the transaction (not persisting the changes to the coordination object).

Further, a persistence framework may allow for the definition of a locking model which includes a read lock, and may be accomplished by publishing read locks to commit coordination objects and maintaining a local list of coordination objects found. If a previous lock is found, an intention read lock could be published to a locking queue. When previous locks are removed the redirector object may be refreshed and updated. Then the intention read lock may be promoted to a read lock and data will be returned to the user.

Further, a persistence framework may allow for the definition of a locking model which includes a write lock, and may be accomplished by publishing write locks to coordination objects and maintaining a local list of coordinators found. If a previous lock is found an intention write lock could be published to a locking queue. When previous locks are removed the coordination object may be refreshed and updated. Then the intention write lock may be promoted to a write lock and refreshed data will be returned to the user.

Further, a persistence framework may allow for the definition of a locking model such as no lock, and may be accomplished by following the optimistic locking described above, with variations such that, for example, when conflicts are identified they may be noted by storing both versions on the coordination object and displaying them both to the next requesting user for manual reconciliation.

According to another general aspect, an indexing mechanism of a peer-to-peer database may include persistent distributed index definitions, a deterministic algorithm for near locality data aggregation, a deterministic algorithm for near locality node creation, and a querying mechanism to retrieve information from indexes.

In some implementations, the index definition on a peer-to-peer database may comprise, for example, the class (or table), the class version number (or minimum version number which is used to determine if an index can be run successfully on the data in this node which is stored in its current form or version), an algorithm for determining the index value. The definition of the index could be accessed or stored directly on each node. The nodes may periodically and/or upon change, addition or deletion execute the index value algorithm and report the index value for all local data.

The index definition may include an index type which might include: time to live (temporary indexes), "report if" definitions (data elements only have a reported value within an index if a certain condition exists), "execute at" definitions (report only if your location is asked to report, then if information is found spread to more nodes, this is a technique used in genetic algorithms or pattern matching algorithms), or other indexing types.

The near locality grouping algorithm or index persistence definition which may be attached to an index definition which creates a linked listing of summary nodes grouped and persisted at a deterministic location by generating value that can be sorted for grouping. For example, for sorting an index by the index values first letter each node would report its local data index values and then run the resulting value through a grouping algorithm (to retrieve the first letter), and then store the index values at that grouping location network ID by hashing a combination of the value and other information like the network ID of the index definition using for example SHA256 and using the message digest for a network location. The linked list may result from storing the previous and next network ID of actual index nodes and inserting new nodes in the list as new values are added. To query a particular grouped index for a particular value first run the value through the grouping algorithm then search for the grouped index at the network ID. For a range query the run the min value through the grouping algorithm and then search through the linked list, or increasing the value and re-querying if a node is not found, until the maximum value is found.

The near locality node or summary node creation system described above for consolidating index information may be accomplished by allowing each node to calculate values for its data, but then each node may report to a summary node which is determined by an algorithm that groups close nodes together.

Such summary nodes may be arranged in a tree structure for consolidating index information, which may be accomplished by having each node calculate values for its data, but then each node may report to a tree of summary nodes. The leaf nodes may be calculated as described above, but each summary node may report its network ID to its summary node and each summary node network ID to successive summary nodes to a level from $2^{n-1}$ . . . N bits where $N<2^{n-1}$. This effectively separates the index into network ID local trees, and eliminates duplicates which can be used to process information in a systematic way. Summary nodes could also be arranged in linked lists as described above, for each level.

The summary node tree just described for consolidating index information may include an ordering algorithm reported at index ordering values, which may be accomplished by grouping string values successively reduced in size, or dividing numbers into groups and using these smaller and smaller groupings to construct an index tree.

The summary node tree for consolidating index information also may include a manually defined tree structure.

The querying mechanism described above may be used to traverse nodes and/or summary nodes, which may be accomplished by using a query language or an algorithm to search summary nodes to find and report index values and network ID where the values resulted from.

According to another general aspect, a security framework on top of a peer-to-peer database may include searchable and private information separation where private information is encrypted using a private key and is stored in its encrypted state on a peer-to-peer database, and searchable (Indexable) information is encrypted by the local node that stores it so that it can calculate and publish index values for searching and data aggregation.

According to another general aspect, an AND Encryption mechanism may use the coordination of two separate keys for decryption, which may be accomplished, for example, by encrypting the data twice in order and decrypting the same data twice in reverse order.

According to another general aspect an OR Encryption mechanism may use one of two or more separate encryption keys for encryption and/or decryption, which may be accomplished by sharing an AND Encryption key between users to validate relationship between keys and then creating a new key on the storage node. Once the relationship is established either party may have access to encrypt or decrypt data stored with that "Or Key" effectively allow the sharing of encrypted information.

According to another general aspect, a system may include computers and peripheral devices that are connected via software to form a development and deployment peer-to-peer database platform that can be used to build and deploy software applications.

Disclosed systems and methods may be operable to provide wide range connectivity (e.g., national/international) without extensive networking other then the interne, and without central servers. Disclosed systems and methods may be operable to provide high availability and fault tolerance. Disclosed systems and methods may be operable to provide secure distributed transactions. Disclosed systems and methods may be operable to provide translation services between disparate conventional systems wherein translating and storing data from others systems into a peer-to-peer network, so as to reduce the translation effort to O(N) from O(N²) since each system may need only a translation written to and from the peer-to-peer database, instead of translating from each system to each other system. Further, disclosed systems and methods may be operable to provide a national medical record system.

According to another general aspect, a peer-to-peer database lookup mechanism may allow the peer-to-peer database to search a connected local area network after searching the nodes local memory but before searching the peer-to-peer database namespace for data.

According to another general aspect, a medical record/diagnostic/treatment system may be implemented in a peer-to-peer database which, e.g., tracks how doctors and/or Nurses or other health care providers treat patients given, but not limited to, a set of conditions, complaints, tests, medical history, family history, current diagnoses, and/or current medications, and makes suggestions on what the providers should do given their current patients information. The system would track what people actually do and would allow other providers to view the popularity of each suggestion. Some providers may be given higher status if their comments or suggestions are well accepted in the field, others given lower status if their comments or suggestions are rejected. Other professionals or researchers that are acknowledged leaders in their subject might be given a higher status for ranking alternate suggestion. In some implementations, systems and methods may be operable to track what people actually do, instead of what they should do, to improve actual care of patents and to allow medical advancements information dissemination.

This data can be used to provide a graphic user interface that might include a pictographic representation of a patient that can be used to indicate symptoms, to order tests to help with diagnosis. The system can also suggest other information that might be useful to help determine a proper diagnosis. It might also make suggestions about treatments or risk screening procedures that are recommended because of other factors, for example, a mammogram because of age. It may also offer education material because of other factors such as obesity. The data can be displayed in an organized way to indicate popularity, and other relevant criteria such as cost, and diagnostic value, positive result predictive value (does a positive result indicate a positive diagnosis), or risk to the patient. Other indicators could also be used for ordering tests and treatments. By allowing the system to present information based on how others are using the system the system make the process of documentation more efficient and improves on patient quality by helping to make care consistent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A method of executing instructions stored on a non-transitory computer-readable storage medium, using at least one processor, to thereby execute relationship mapping for data of a peer-to-peer database, the peer-to-peer database including a plurality of data records which are uniquely identified for querying thereof within a namespace of the peer-to-peer network and which each are related to data objects which form a corresponding data record of the plurality of data records, comprising:
   determining, using the at least one processor, a data object of the data objects to be persisted on the peer-to-peer database as part of a data record of the plurality of data records, the data object having a data network address;
   associating, using the at least one processor, a redirection object with the data object, the redirection object including a network address and the data network address;
   persisting, using the at least one processor, the redirection object on the peer to peer database; and
   maintaining a connection between the data object at the data network address and the redirection object at the network address, wherein the redirection object provides a primary reference from the data object to its associated data record of the plurality of data records of the peer-to-peer database, and connections of the associated data record are independent of the connection between the data object and the redirection object.

2. A method of executing instructions stored on a non-transitory computer-readable storage medium, using at least one processor, to thereby execute persisting data on a peer-to-peer database, the peer-to-peer database including a plurality of data records which are uniquely identified for querying thereof within a namespace of the peer-to-peer network and which each are related to data objects which form a corresponding data record of the plurality of data records, the method comprising:
   determining, using the at least one processor, at least one data object associated with a data transaction, each data object being associated with a data network address on the peer-to-peer database;
   determining, using the at least one processor, at least one storage node for each data object;
   determining, using the at least one processor, a consistency of the at least one data object on a respective at least one storage node; and
   determining, using the at least one processor, whether to write the at least one data object to the respective at least one storage node, based on the determining of the consistency.

3. A method of executing instructions stored on a non-transitory computer-readable storage medium, using at least one processor, to thereby execute persisting composite elements on a peer-to-peer database, the peer-to-peer database including a plurality of data records which are uniquely identified for querying thereof within a namespace of the peer-to-peer network and which each are related to data objects which form a corresponding data record of the plurality of data records, the method comprising:
   determining, using the at least one processor, a composite definition for at least one class on the peer-to-peer database;
   determining, using the at least one processor, a data transaction including data objects of the composite definition;
   assigning, using the at least one processor, a composite network address to the data objects; and
   storing, using the at least one processor, the data objects at the composite network address on the peer-to-peer database.

4. A method of executing instructions stored on a non-transitory computer-readable storage medium, using at least one processor, to thereby execute persisting data using segregated address spaces on a peer-to-peer database, the peer-to-peer database including a plurality of data records which are uniquely identified for querying thereof within a namespace of the peer-to-peer network and which each are related to data objects which form a corresponding data record of the plurality of data records, the method comprising:
   accessing, using the at least one processor, the data objects at a node of the peer-to-peer database;
   subscribing, using the at least one processor, a local area network (LAN) of the node to the data objects;
   committing, using the at least one processor, updates to the data objects on the LAN as a segregated address space of the namespace of the peer-to-peer network; and
   committing, using the at least one processor, the updates to the corresponding data records of the peer-to-peer database.

5. The method of claim 1 wherein the redirection object is configured to maintain a link to current data stored on the peer-to-peer database.

6. The method of claim 1 wherein the redirection object is configured to maintain a history of data network addresses that hold previous peer-to-peer data objects previously linked using the redirection object.

7. The method of claim 1 wherein the redirection object is configured to provide a primary reference from an index to an associated data record in the peer-to-peer database, and wherein the peer-to-peer database is configured to update index values of the index independently of a manner in which the index and data records are linked.

8. The method of claim 1 wherein the redirection object is configured to manage local data caching.

9. The method of claim 1 wherein the redirection object is configured to manage composite data structures.

10. The method of claim 1 wherein the redirection object is configured to manage data of the peer-to-peer database including publishing, deleting or reorganizing the data on at least one peer-to-peer database node.

11. The method of claim 1 wherein the redirection object is configured to trigger a local process to publish, delete or reorganize data of the peer-to-peer database on at least one peer-to-peer database node.

12. The method of claim 1 wherein the redirection object is configured to manage data backup to a separate peer-to-peer database.

13. The method of claim 1 wherein the redirection object is configured to manage an association of composite data records.

14. The method of claim 1 wherein the redirection object is configured to trigger code to execute locally which writes data for a composite data record.

15. The method of claim 2 wherein the storage node is a component of the peer-to-peer database that is locatable amongst other storage nodes of the peer-to-peer database as containing data being sought, based on characteristics of the data being sought.

16. The method of claim 2 wherein the peer-to-peer database nodes are configured to store relational data.

17. The method of claim 2 wherein the peer-to-peer database nodes are configured to store peer-to-peer data indexes.

18. The method of claim 2 wherein the peer-to-peer database nodes are configured to store peer-to-peer redirection objects, each redirection object associated with a corresponding data object and including a network address and the data network address of the corresponding data object, wherein a connection is maintained between the data object at the data network address and the redirection object at the network address, wherein the redirection object provides a primary reference from the data object to its associated data record of the plurality of data records of the peer-to-peer database, and connections of the associated data record are independent of the connection between the data object and the redirection object.

19. The method of claim 2 wherein the peer-to-peer database nodes are configured to store programming code.

20. The method of claim 2 wherein the peer-to-peer database nodes are configured to store database triggers that maintain data consistency.

21. The method of claim 2 wherein the peer-to-peer database nodes configured to store security information for related data security techniques.

22. The method of claim 2 wherein the peer-to-peer database nodes are configured to store database schema information 23. The method of claim 2 wherein the peer-to-peer database nodes are configured to store composite data.

24. The method of claim 2 wherein the peer-to-peer database nodes are configured to execute methods deferred or forked from other processes.

25. The method of claim 3 wherein data linked into the composite definition is addressable and stored on the peer-to-peer database at individual data element network locations, and wherein the peer-to-peer database is configured to read the linked data together when referenced from the composite definition storage location.

26. The method of claim 3 wherein a process that updates a single composite data object triggers updates to related, stored composite records on the peer-to-peer database.

27. The method of claim 3 wherein composite definition updates are deferred or forked to another process on a peer-to-peer database node.

28. The method of claim 4 wherein the updates to the data objects that are committed on the LAN include data of local data consumers on the LAN.

29. The method of claim 4 wherein the updates to the data objects that are committed on the LAN include data that is used as a persistent backup for defined peer-to-peer data.

30. The method of claim 4 wherein the updates to the data objects that are committed on the LAN include data of a process that requires data retrieval for the peer-to-peer database.

31. The method of claim 4 wherein the updates to the data objects that are committed on the LAN include data stored using different security requirements.

32. The method of claim 4 wherein the updates to the data objects that are committed on the LAN include private data that is not available on the peer-to-peer database outside of the LAN.

33. The method of claim 4 wherein the updates to the data objects that are committed on the LAN include data maintained in private by a creator thereof.

* * * * *